(12) United States Patent
Abdolell et al.

(10) Patent No.: US 12,437,390 B2
(45) Date of Patent: Oct. 7, 2025

(54) SYSTEM AND METHOD FOR ASSESSING QUALITY OF MEDICAL IMAGES

(71) Applicant: Densitas Incorporated, Halifax (CA)

(72) Inventors: Mohamed Abdolell, Halifax (CA); Ning Hu, Ancaster (CA); Desmond Chung, Thornhill (CA); Ryan Duggan, Miramichi (CA); Dan Barzilai, Hod HaSharon (IL); Nicole Paquet, Middle Sackville (CA); Amin Ghazanfari, Toronto (CA)

(73) Assignee: Densitas Incorporated, Halifax (CA)

( * ) Notice: Subject to any disclaimer, the term of this patent is extended or adjusted under 35 U.S.C. 154(b) by 733 days.

(21) Appl. No.: 17/295,408

(22) PCT Filed: Nov. 25, 2019

(86) PCT No.: PCT/CA2019/051684
§ 371 (c)(1),
(2) Date: May 19, 2021

(87) PCT Pub. No.: WO2020/102914
PCT Pub. Date: May 28, 2020

(65) Prior Publication Data
US 2023/0071400 A1    Mar. 9, 2023

Related U.S. Application Data

(60) Provisional application No. 62/771,067, filed on Nov. 24, 2018.

(51) Int. Cl.
*G16H 30/40* (2018.01)
*G06T 7/00* (2017.01)
*G16H 30/20* (2018.01)

(52) U.S. Cl.
CPC .......... *G06T 7/0012* (2013.01); *G16H 30/20* (2018.01); *G16H 30/40* (2018.01);
(Continued)

(58) Field of Classification Search
None
See application file for complete search history.

(56) References Cited

U.S. PATENT DOCUMENTS 5,133,020 A    7/1992  Giger et al.
5,452,367 A    9/1995  Bick et al.
(Continued)

FOREIGN PATENT DOCUMENTS

CA    2921786 A1    2/2015
CA    3120480 A1    5/2020
(Continued)

OTHER PUBLICATIONS

Byng, et al., "The quantitative analysis of mammographic densities", Physics in Medicine and Biology, 1994; 39:1629-1638.
(Continued)

*Primary Examiner* — Rinna Yi
(74) *Attorney, Agent, or Firm* — SMART & BIGGAR LP; Tonino Rosario Orsi; Sunil Rao

(57) ABSTRACT

A system and method for performing assessment of medical images is described herein in which various graphical user interface tools allow a user to view various scores of certain parameters that may indicate non-conformities5 in a given image or in a study that includes several images.

26 Claims, 42 Drawing Sheets

(52) U.S. Cl.
CPC .............. *G06T 2207/10088* (2013.01); *G06T 2207/30068* (2013.01); *G06T 2207/30168* (2013.01)

(56) References Cited

U.S. PATENT DOCUMENTS

| | | |
|---|---|---|
| 5,491,627 A | 2/1996 | Zhang et al. |
| 5,537,485 A | 7/1996 | Nishikawa et al. |
| 5,622,171 A | 4/1997 | Asada et al. |
| 5,657,362 A | 8/1997 | Giger et al. |
| 5,673,332 A | 9/1997 | Nishikawa et al. |
| 5,729,620 A | 3/1998 | Wang |
| 5,732,697 A | 3/1998 | Zhang et al. |
| 5,740,268 A | 4/1998 | Nishikawa et al. |
| 5,815,591 A | 9/1998 | Roehrig et al. |
| 5,828,774 A | 10/1998 | Wang |
| 5,832,103 A | 11/1998 | Giger et al. |
| 5,917,929 A | 6/1999 | Marshall et al. |
| 6,014,452 A | 1/2000 | Zhang et al. |
| 6,035,056 A | 3/2000 | Karssemeijer |
| 6,075,879 A | 6/2000 | Roehrig et al. |
| 6,078,680 A | 6/2000 | Yoshida et al. |
| 6,185,320 B1 | 2/2001 | Bick et al. |
| 6,198,838 B1 | 3/2001 | Roehrig et al. |
| 6,263,092 B1 | 7/2001 | Roehrig et al. |
| 6,266,435 B1 | 7/2001 | Wang |
| 6,301,378 B1 | 10/2001 | Karssemeijer et al. |
| 6,404,908 B1 | 6/2002 | Schneider et al. |
| 6,434,262 B2 | 8/2002 | Wang |
| 6,477,262 B2 | 11/2002 | Wang |
| 6,574,357 B2 | 6/2003 | Wang |
| 6,580,818 B2 | 6/2003 | Karssemeijer et al. |
| 6,628,815 B2 | 9/2003 | Wang |
| 6,640,001 B2 | 10/2003 | Roehrig et al. |
| 6,909,795 B2 | 6/2005 | Tecotzky et al. |
| 7,054,473 B1 | 5/2006 | Roehrig et al. |
| 7,072,498 B1 | 7/2006 | Roehrig et al. |
| 7,146,031 B1 | 12/2006 | Hartman et al. |
| 7,174,515 B1 * | 2/2007 | Marshall ............... G16Z 99/00 715/835 |
| 7,286,695 B2 | 10/2007 | Romsdahl et al. |
| 7,298,876 B1 | 11/2007 | Marshall et al. |
| 7,336,809 B2 | 2/2008 | Zeng et al. |
| 7,346,202 B1 | 3/2008 | Schneider |
| 7,359,538 B2 | 4/2008 | Zeng et al. |
| 7,397,937 B2 | 7/2008 | Schneider et al. |
| 7,477,766 B1 | 1/2009 | Roehrig et al. |
| 7,616,793 B2 | 11/2009 | Marshall et al. |
| 7,664,302 B2 | 2/2010 | Snoeren et al. |
| 7,668,352 B2 | 2/2010 | Tecotzky et al. |
| 7,668,358 B2 | 2/2010 | Snoeren et al. |
| 7,672,491 B2 | 3/2010 | Krishnan et al. |
| 7,672,494 B2 | 3/2010 | Doi et al. |
| 7,680,308 B2 | 3/2010 | Dale |
| 7,680,315 B2 | 3/2010 | Roehrig et al. |
| 7,769,216 B2 | 8/2010 | Doi et al. |
| 7,809,175 B2 | 10/2010 | Roehrig et al. |
| 7,885,443 B2 | 2/2011 | Zingaretti et al. |
| 7,889,896 B2 | 2/2011 | Roehrig et al. |
| 8,018,487 B2 | 9/2011 | Reiner |
| 8,391,572 B2 | 3/2013 | Morita et al. |
| 8,571,290 B2 | 10/2013 | Wang et al. |
| 8,634,610 B2 | 1/2014 | Kontos et al. |
| 8,675,933 B2 | 3/2014 | Wehnes et al. |
| 8,675,934 B2 | 3/2014 | Wehnes et al. |
| 9,330,454 B2 | 5/2016 | Reiner |
| 9,449,380 B2 | 9/2016 | Mehta |
| 9,895,121 B2 | 2/2018 | Abdolell et al. |
| 10,123,758 B2 | 11/2018 | Abdolell et al. |
| 10,452,813 B2 | 10/2019 | Sorenson et al. |
| 2003/0174873 A1 | 9/2003 | Giger et al. |
| 2005/0256743 A1 | 11/2005 | Dale |
| 2006/0274145 A1 | 12/2006 | Reiner |
| 2007/0179811 A1 | 8/2007 | Reiner |
| 2007/0248210 A1 | 10/2007 | Selse et al. |
| 2008/0144896 A1 | 6/2008 | Burke |
| 2009/0171236 A1 | 7/2009 | Davies |
| 2009/0279672 A1 | 11/2009 | Reiner |
| 2009/0324049 A1 | 12/2009 | Kontos et al. |
| 2010/0226475 A1 | 9/2010 | Smith et al. |
| 2011/0052025 A1 | 3/2011 | Highnam et al. |
| 2011/0206261 A1 | 8/2011 | Huo et al. |
| 2011/0246521 A1 | 10/2011 | Luo et al. |
| 2011/0257919 A1 | 10/2011 | Reiner |
| 2012/0189175 A1 | 7/2012 | Highnam et al. |
| 2014/0010429 A1 | 1/2014 | Highnam et al. |
| 2014/0275945 A1 * | 9/2014 | Fonte ................... A61B 5/0261 382/128 |
| 2016/0133033 A1 | 5/2016 | Highnam et al. |
| 2016/0203600 A1 | 7/2016 | Abdolell et al. |
| 2017/0372155 A1 | 12/2017 | Odry et al. |
| 2018/0060512 A1 | 3/2018 | Sorenson et al. |
| 2018/0197288 A1 | 7/2018 | Nunes et al. |
| 2019/0125298 A1 * | 5/2019 | Abolmaesumi ...... A61B 8/4405 |
| 2019/0287241 A1 * | 9/2019 | Hill ...................... A61B 6/5282 |
| 2019/0313992 A1 | 10/2019 | Buelow et al. |
| 2020/0222023 A1 | 7/2020 | Wong et al. |
| 2021/0015560 A1 * | 1/2021 | Boddington ........... G16H 50/70 |

FOREIGN PATENT DOCUMENTS

| | | |
|---|---|---|
| CN | 102549618 B | 11/2015 |
| CN | 106780482 A | 5/2017 |
| EP | 2462561 A1 | 6/2012 |
| EP | 2646980 A2 | 10/2013 |
| EP | 3035850 A1 | 6/2016 |
| EP | 3703071 A1 | 9/2020 |
| GB | 2474319 A | 4/2011 |
| GB | 2516366 A | 1/2015 |
| WO | 2010051036 A1 | 5/2010 |
| WO | 2011015818 A1 | 2/2011 |
| WO | 2012072974 A2 | 6/2012 |
| WO | 2012082994 A2 | 6/2012 |
| WO | 2013027120 A3 | 6/2013 |
| WO | 2014195669 A1 | 12/2014 |
| WO | 2015011280 A1 | 1/2015 |
| WO | 2015024099 A1 | 2/2015 |
| WO | 2015077076 A1 | 5/2015 |
| WO | 2017181288 A1 | 10/2017 |
| WO | 2018015911 A1 | 1/2018 |
| WO | 2018095792 A1 | 5/2018 |
| WO | 2018109178 A1 | 6/2018 |
| WO | 2022051867 A1 | 3/2022 |

OTHER PUBLICATIONS

Byng, et al., "Automated analysis of mammographic densities", Physics in Medicine and Biology, 1996; 41 (5):909-923.

Mason et al., Assessment of multivariate process control techniques, J. Qual. Technol. 29 (2). (1997). 140143.

Zhou, et al., "Computerized image analysis: Estimation of breast density on mammograms", Med. Phys., 2001; 28 (6):1056-1069.

Taplin, S., et al. (2002). Screening Mammography: Clinical Image Quality and the Risk of Interval Breast Cancer. American Journal of Roentgenology, 178(4), pp. 797-803.

Moreira, C., et al. (2005). Comparison of the validity and reliability of two image classification systems for the assessment of mammogram quality. Journal of Medical Screening, 12(1), 38-42.

Jeffreys, et al., "Initial experiences of using an automated volumetric measure of breast density: the standard mammogram form", The British Journal of Radiology, 2006; 79(941):378-382.

Li, et al., "Computerized analysis of tissue density effect on missed cancer detection in digital mammography", Computerized Medical Imaging and Graphics, 2006; 30(5):291-297.

Palomares, et al., "Mammographic density correlation with Gail model breast cancer risk estimates and component risk factors", Cancer Epidemiology, Biomarkers and Prevention, 2006; 15(7):1324-1330.

Teyrachaku et al., European Journal of Operational Research 178 (2007) 472481.

(56) References Cited

OTHER PUBLICATIONS

Yaffe, "Review—Mammographic density. Measurement of mammographic density", Breast Cancer Research, 2008; 10(3): 209.
Mustra, et al., "Breast border extraction and pectoral muscle detection using wavelet decomposition", EUROCON 2009, IEEE, St. Petersburg, Russia; pp. 1426-1433.
Tagliafico, et al., "Mammographic density estimation: Comparison among BI-RADS categories, a semi-automated software and a fully automated one", The Breast, 2009; 18(1):35-40.
Ducote, et al., "Quantification of breast density with dual energy mammography: An experimental feasibility study", Medical Physics, 2010; 37(2):793-801.
Highnam, et al., "Robust Breast Composition Measurement—VOLPARA", Digital Mammography (Lecture Notes in Computer Science), 2010; 6136(2010):342-349.
Matakina Technology Limited, "510(k) Summary", VOLPARA Imaging Software, prepared Sep. 30, 2010.
Anonymous "Receiver Operating Characteristics", May 11, 2011 (May 11, 2011), Retrieved from the Internet: URL: http://www0.cs.ucl.ac.uk/staff/ucacbbl/roc/.
O'Leary, D. and Rainford, L. (2011). Can radiation dose in mammography be further reduced by increasing the image quality?. Breast Cancer Research, 13(S1).
Hologic, Inc., "B. Administrative Information", QUANTRA software application, prepared Feb. 15, 2012.
Rauscher, G., et al. (2013). Mammogram image quality as a potential contributor to disparities in breast cancer stage at diagnosis: an observational study. BMC Cancer, 13(208).
Ekpo EU., et al. (2014). Optimisation of direct digital chest radiography using Cu filtration. Radiography, 20, 346-50.
Ekpo, et al., "Breast composition: Measurement and clinical use", Radiography, 2015; 21(4):1-10.
Keller, et al., "Preliminary evaluation of the publicly available Laboratory for Breast Radiodensity Assessment (LIBRA) software tool: comparison of fully automated area and volumetric density measures in a casecontrol study with digital mammography", Breast Cancer Research, 2015; 17:117.
Chen, et al., "Improving Mammographic Density Estimation in the Breast Periphery", In: Tingberg, et al., eds., Breast Imaging. Cham: Springer International Publishing; 2016, pp. 469-477. (Lecture Notes in Computer Science; vol. 9699).
Anonymous "ROC Curves", Nov. 7, 2018 (Nov. 7, 2018), Retrieved from the Internet: URL:https://medium.com/@shivangisareen/roc-curves-80ad099915b9.
Guertin, MH., et al. (2018) Mammography Clinical Image Quality and the False Positive Rate in a Canadian Breast Cancer Screening Program. Canadian Association of Radiologists Journal, vol. 69, Issue 2, 169 175.
Yala et al. A Deep Learning Mammography-based Model for Improved Breast Cancer Risk Prediction. Radiology. 2019; 292(1):60-66. doi:10.1148/radiol.2019182716.
Abdolell et al. (2020). Assessing breast cancer risk within the general screening population. Developing a breast cancer risk model to identify higher risk women at mammographic screening. Eur Radiol. May 2020. https://doi.org/10.1007/s00330-020-06901-x.
Hologic, Inc., QUANTRA—510(k) Submission, prepared Aug. 15, 2008.
Kang and Park, Decision Support Systems 29 (2000) 59-72.
Kourti and MacGregor, Multivariate SPC methods for process and product monitoring, J. Qual. Technol. 28 (4). (1996). 409-428.
Montgomery, 2005. Introduction to statistical quality control. Hoboken, N.J.: John Wiley.
Oakland, 2007. Statistical process control. Amsterdam: Elsevier Butterworth-Heinemann.

\* cited by examiner

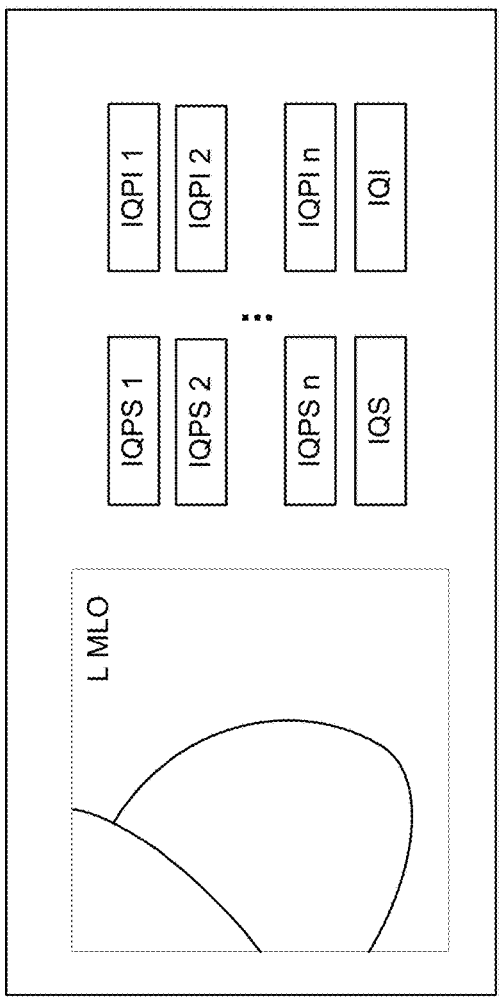
FIG. 10
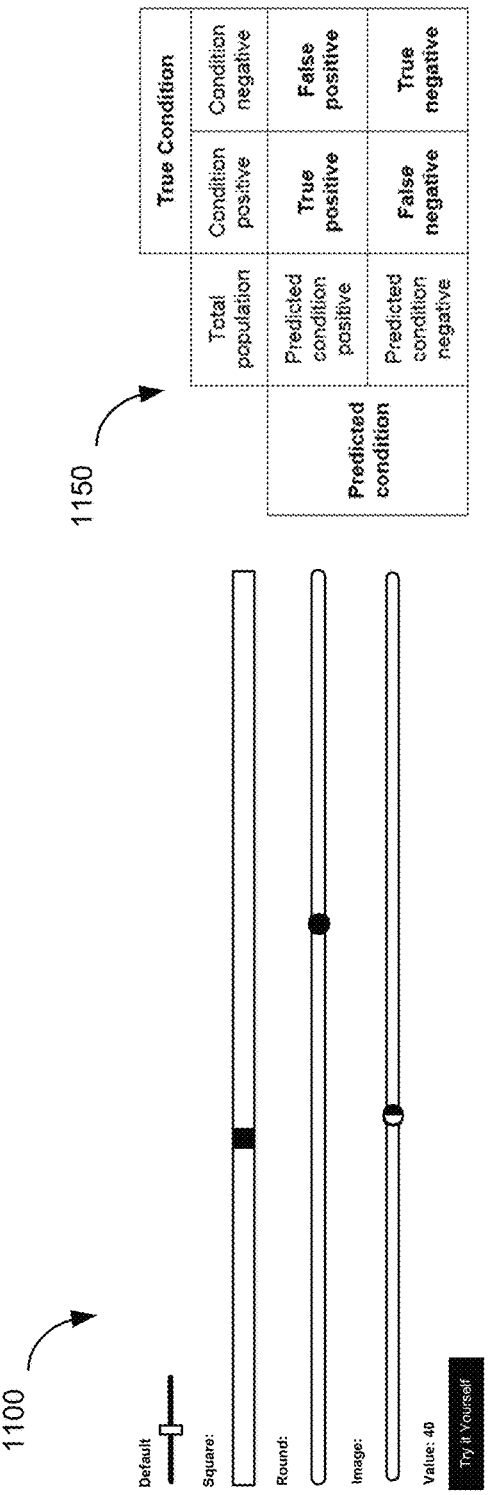
FIG. 11A
FIG. 11B

FIG. 14

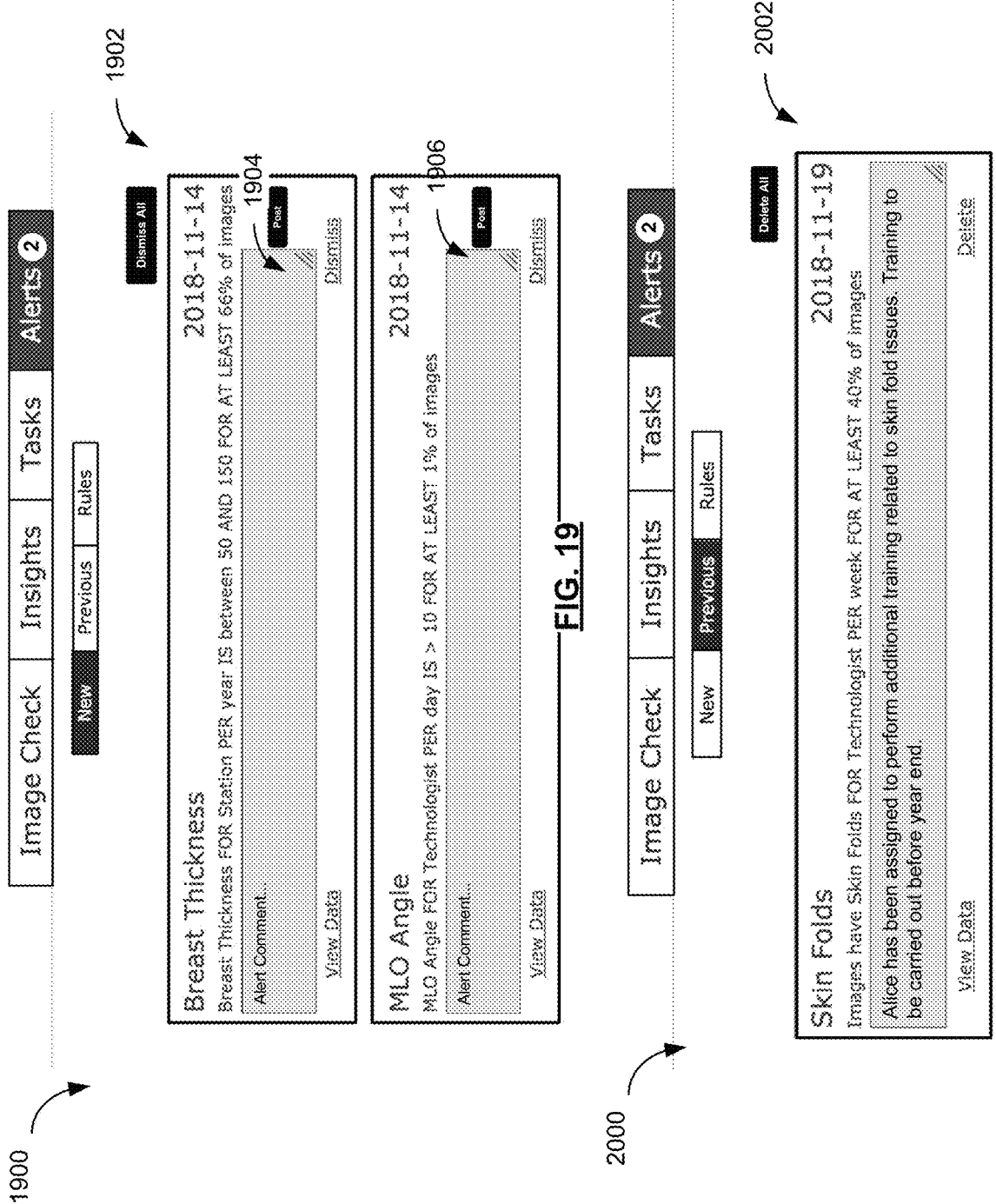

Image Quality Feedback Tool

Reviewers are to assess each image and determine if they have found errors with the image quality. Reviewers can select from a drop down list of errors for each image.

Reviewers are required to draw the Posterior Nipple Line (PNL) line for every image.

Reviewers are also required to provide an overall study assessment of either Perfect, Good, Moderate, or Inadequate.

Overall Study Assessment — 2408

| P | G | M | I |
|---|---|---|---|
| Perfect | Good | Moderate | Inadequate |

User: densitas (Logout)
1 (✓) / 672
664 unassessed
▲ ▼
Save & Next
Next Unassessed

2404

LCC  Collapse all
▼ CC Exaggeration
  ○ Minimal or no exaggeration
  ● Excessive exaggeration
▼ Nipple Position
  ○ Nipple in profile and retroareolar tissue well separated
  ● Nipple not in profile but clearly distinguishable from breast tissue
  ○ Nipple not in profile and overlapping breast tissue
▼ Skin Folds
  ○ No skin folds
  ● Skin folds do not obscure breast tissue
  ● Skin folds obscure breast tissue
▼ Portion Cut-off
  ○ Breast tissue is not cut off by medial, lateral or nipple edges
  ● Breast tissue is cut off by medial, lateral or nipple edges
▼ Patient Related Artifacts
  ● No patient related artifacts visible
  ○ Patient related artifacts visible but not covering breast tissue
  ● Patient related artifacts covering breast tissue
▼ Posterior Tissues
  ○ No posterior tissue missing
  ● Significant posterior tissue missing from image Draw Posterior Nipple Line (PNL) — 137mm  |  Hide all symbols  |  2 Error(s) Found LCC
2402
All criteria classified Accession #: QCSET72-132-10
Date Acquired: 2018-07-10 12:56
Machine: HOLOGIC, Inc.

Draw Posterior Nipple Line (PNL) — 156mm  |  Hide all symbols  |  1 Error(s) Found LMLO
2406
All criteria classified

Technologist Report Card
3800
Progress Charts
3802 — Inadequate IMF, 2019Q2 - 2019Q3
3804 — Pec Muscle Concave, 2019Q2 - 2019Q3
3806 — CC Exaggeration, 2019Q2 - 2019Q3
3808 — MLO Sagging, 2019Q2 - 2019Q3
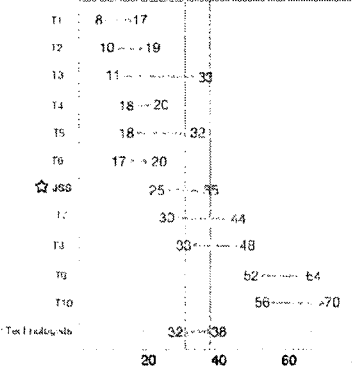
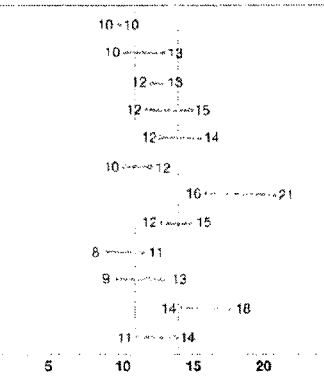
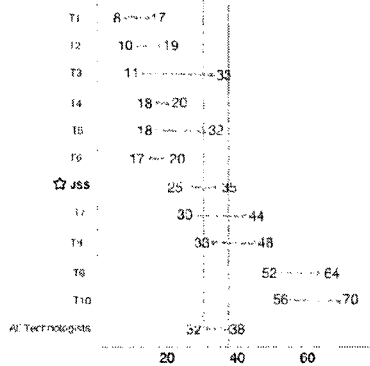
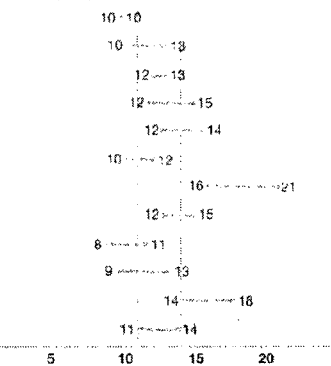
Technologist: JSS
Image Set: 2019-02 QC Study Set (50 Studies)
Date: 2019-11-04
FIG. 38

3900

Technologist Report Card

Image Review    76%   Agreement level with quality algorithms. Result displayed on following pages.

JSS reviewed image set 2019-02 QC Study Set (50 Studies) and identified the following percentages of positioning issues. Results are compared to the group consensus and the algorithm assessments.

| 3902 | 3904 You (%) | 3906 Group (%) | 3908 Algorithm (%) |
|---|---|---|---|
| CC Exaggeration | 12 | 8 | 10 |
| Skin Folds | 14 | 14 | 18 |
| Portion Cut-off | 10 | 8 | 6 |
| Patient Artefacts | 6 | 4 | 2 |
| Posterior Tissue Missing | 26 | 18 | 20 |
| Pec Muscle Concave | 8 | 13 | 18 |
| Thin Pec Muscle | 16 | 22 | 30 |
| IMF Closed | 22 | 21 | 22 |
| Pec Muscle to PNL short | 18 | 20 | 28 |
| Sagging | 10 | 10 | 12 |
| Nipple not in profile | 30 | 24 | 42 |

Technologist: JSS     Date: 2019-11-04
Image Set: 2019-02 QC Study Set (50 Studies)

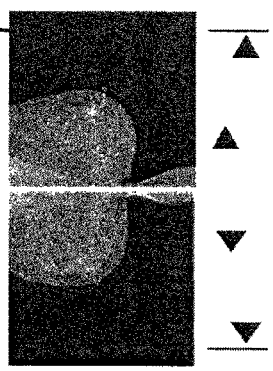

|  |  |  |  |
|---|---|---|---|
| Inadequate IMF |  | X | X |
| MLO Sagging |  | — | — |
| MLO Angle |  | 50 | 50 |
| Compression Pressure (kPa) | 8.4 | 7.0 | 6.1 | 8.7 |
| Breast Thickness (mm) | 58 | 52 | 61 | 55 |
| Breast Volume (cm³) | 969 | 960 | 1,006 | 882 |
| Dose (mGy) | 1.23 | 1.03 | 1.17 | 1.17 |

Institution: I1
Accession #: 2663778DENSITAS
Acquisition Time: 2018-12-18 11:20:30
Technologist: T1

Study Review

Overall Positioning Quality

[ Excellent ] [ Diagnostic ] [ Unacceptable ]

Assess Reported Error(s)

|  | RCC | LCC | RMLO | LMLO |
|---|---|---|---|---|
| Post. Tissue Missing |  |  |  |  |
| Portion Cut-off |  |  |  |  |
| Skin Folds |  |  |  |  |
| CC Exaggeration |  |  |  |  |
| Inadequate Pec. Muscle Length |  |  | X |  |
| Pec. Muscle Concave |  |  |  |  |
| Inadequate IMF |  |  | X | X |
| MLO Sagging |  |  |  |  |

Comments

DICOM Comment  JVL 2019-11-17 13:41:22
Fell off bike this weekend, unable to lift left shoulder.

Jason Smith
It's because I reviewed it and here's what I saw.

Judy Smith [LMLO] This image is the issue

Tina McMurray
Interesting

FIG. 44

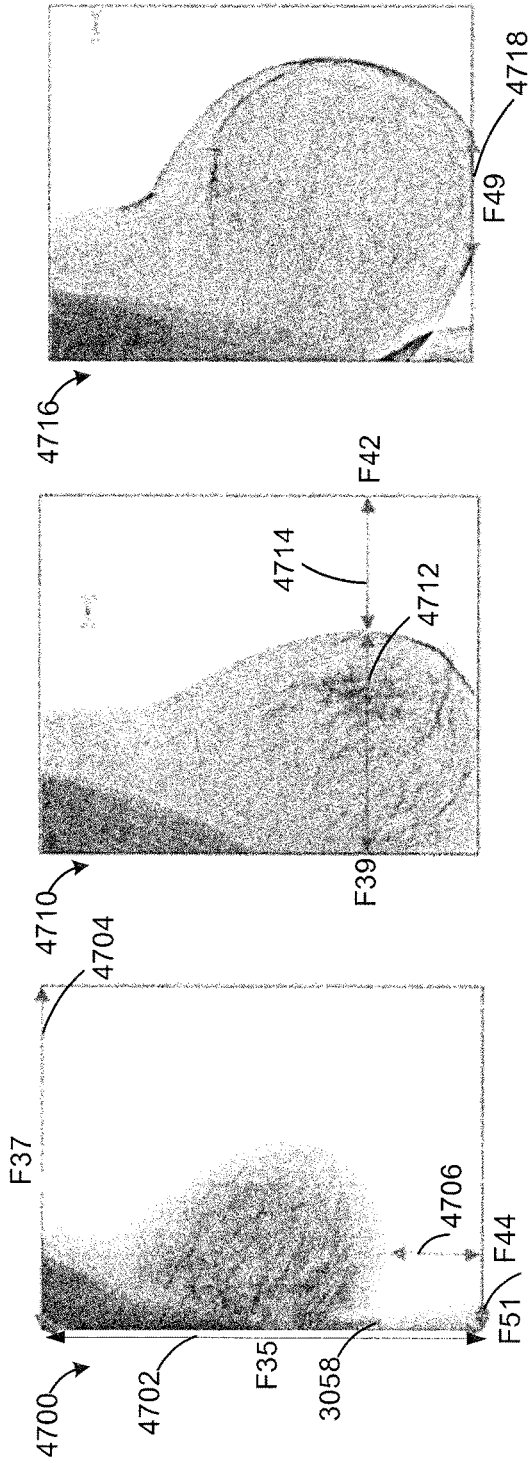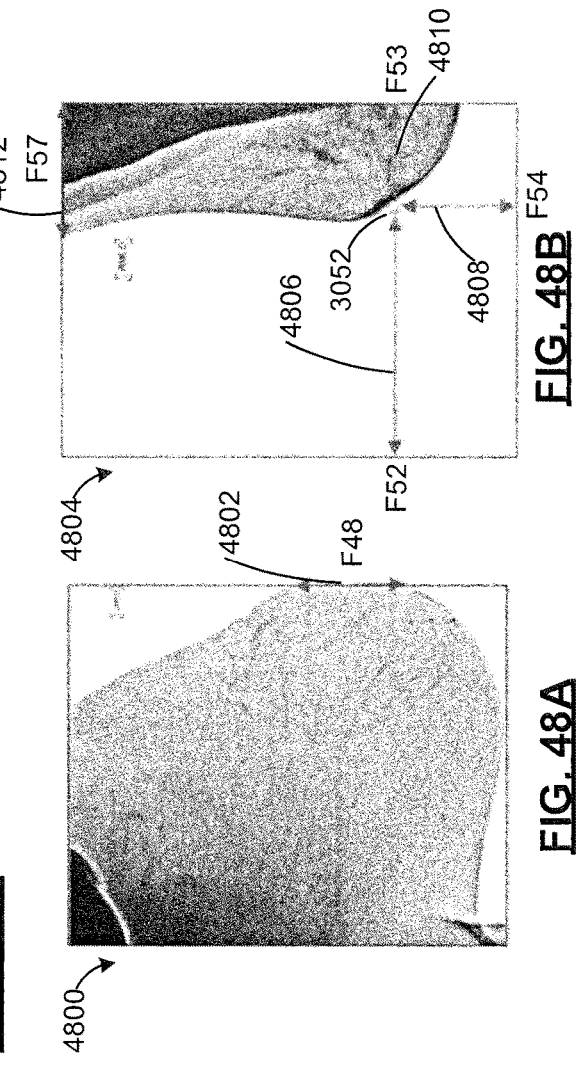
FIG. 47A
FIG. 47B
FIG. 47C
FIG. 48A
FIG. 48B

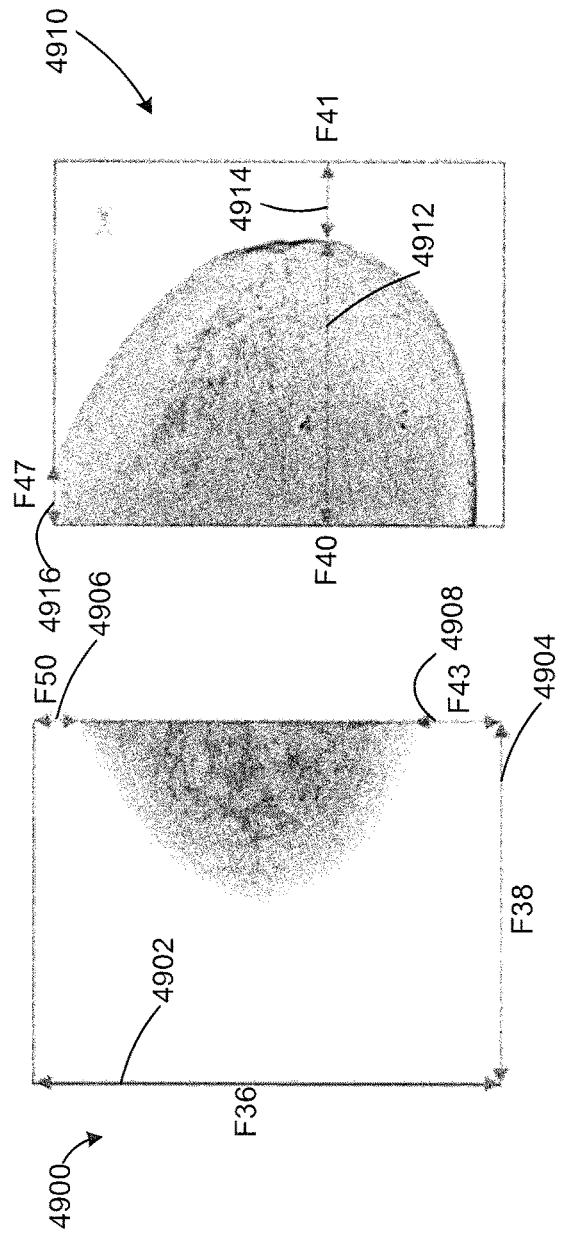
FIG. 49A
FIG. 49B
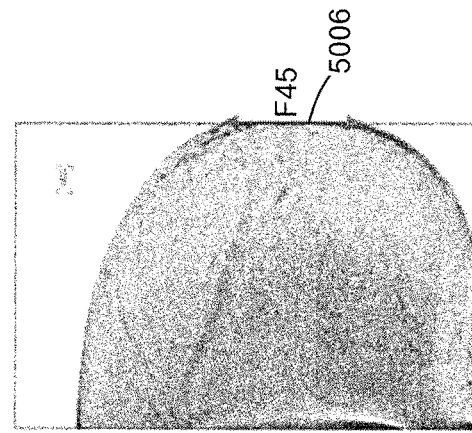
FIG. 50B
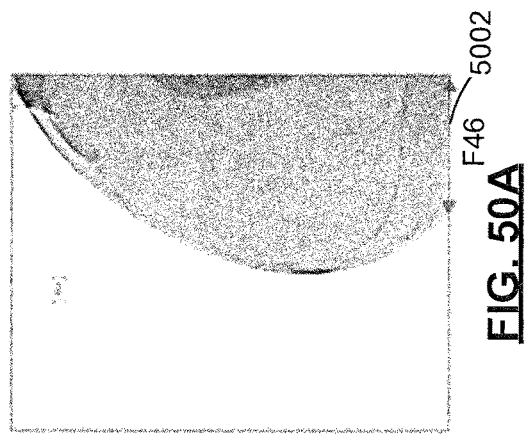
FIG. 50A

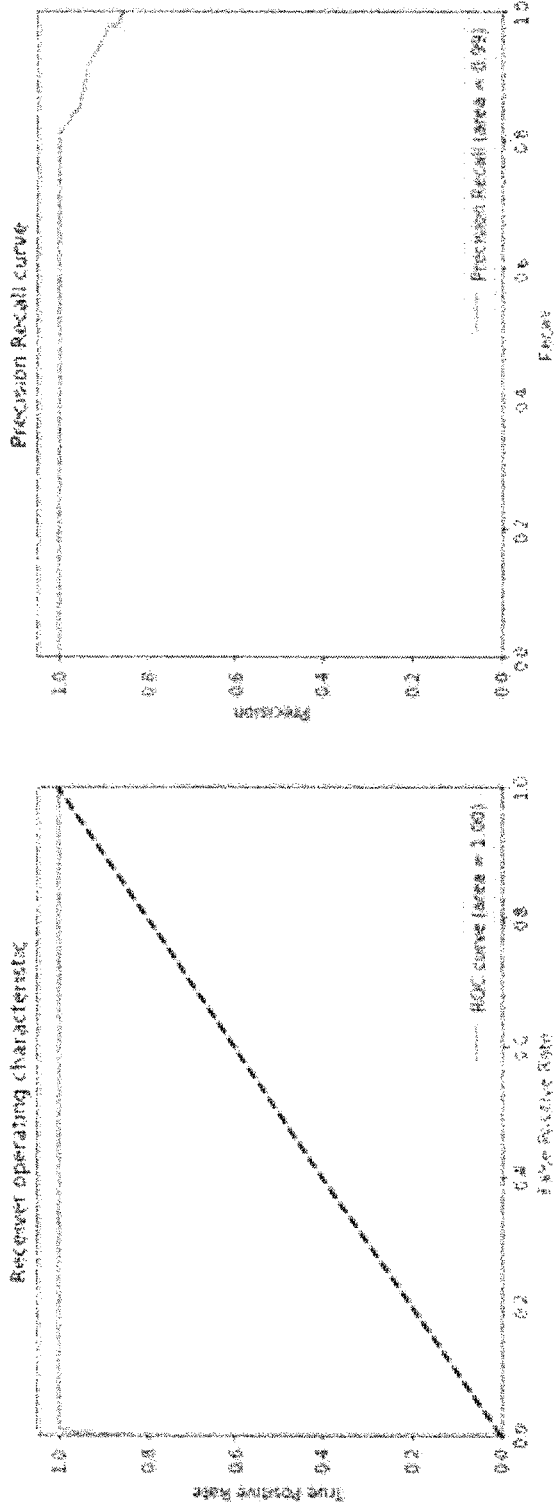
FIG. 52B
FIG. 52A
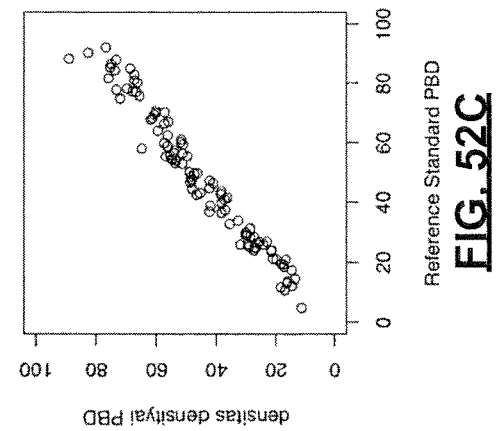
FIG. 52C

SYSTEM AND METHOD FOR ASSESSING QUALITY OF MEDICAL IMAGES

CROSS-REFERENCE TO RELATED PATENT APPLICATION

This application is a 35 USC § 371 national stage entry of International Patent Application No. PCT/CA2019/051684, filed Nov. 25, 2019, which claims the benefit of U.S. Provisional Patent Application No. 62/771,067, filed Nov. 24, 2018, and the entire contents of each of which are hereby incorporated by reference.

FIELD

Various embodiments are described herein that generally relate to systems and methods for assessing mammography images.

BACKGROUND

The lack of systematic processes related to clinical image quality assessment has been identified as a challenge in the medical imaging community. For example, the lack of standardized and systematic processes related to mammographic image quality in breast cancer screening practice is a challenge and a focus of national mammography accreditation programs, particularly as it relates to conformity or non-conformity of mammograms acquired during mammographic exams with established mammography quality criteria. Various initiatives have been undertaken to identify and emphasize the need for ongoing mammography facility review of clinical image quality.

SUMMARY OF VARIOUS EMBODIMENTS

In accordance with one aspect of the teachings herein, there is provided a computer-implemented method for determining digital medical image quality, wherein the method comprises: receiving a first medical image at a processor, the first medical image associated with a plurality of image metadata; determining a predicted image quality score based on the first medical image and a first predictive model at the processor, wherein the first predictive model is a multivariate model; and providing an output in a graphical user interface on a display where the output indicates the predicted image quality score.

In at least one embodiment, the method further comprises determining a plurality of image quality parameter features based on the first medical image and optionally the plurality of metadata associated with the medical image; determining a predicted plurality of image quality parameter scores by applying at least some of the plurality of image quality parameter features as inputs to a plurality of predictive models where each predictive model corresponds to one of the plurality of predicted image quality parameter scores; determining a predicted image quality score by applying the predicted plurality of image quality parameter scores, and optionally the plurality of image quality parameter features, as inputs to an overall predictive model; and providing the output in the graphical user interface on the display device to indicate at least one of the predicted image quality score and the predicted plurality of image quality parameter scores to the graphical user interface on the display.

In at least one embodiment, the method further comprises determining a plurality of image quality parameter features based on the first medical image and optionally the plurality of image metadata associated with the medical image; determining a predicted image quality score by applying the predicted plurality of image quality parameter scores as inputs to an overall predictive model; and providing the output in the graphical user interface on the display device to indicate at least one of the predicted image quality score and the predicted plurality of image quality parameter scores.

In at least one embodiment, the method further comprises determining a plurality of image quality parameter features based on the first medical image and optionally the plurality of image metadata associated with the medical image; determining a predicted image quality parameter score by applying at least some of the predicted image quality parameter features as inputs to a second predictive model that corresponds with the image quality parameter score; and providing the output in the graphical user interface on the display device to indicate the predicted image quality parameter score.

In at least one embodiment, the plurality of image metadata comprises at least one of acquisition settings data, patient data, device data, institution data, and MRT data.

In at least one embodiment, the method further comprises receiving a second medical image at the processor, the second medical image associated with a second plurality of image metadata; determining a second plurality of image quality parameter features based on the second medical image and optionally the second plurality of image metadata associated with the second medical image; determining a second plurality of image quality parameter scores by applying at least some of the second plurality of image quality parameter features as inputs to the plurality of predictive models where each predictive model corresponds to one of the image quality parameter scores; determining a second predicted image quality score by applying the second predicted plurality of image quality parameter scores, and optionally the second plurality of image quality parameter features, as second inputs to the overall predictive model; providing a second output in the graphical user interface on the display device to indicate at least one of the second predicted image quality score and the second predicted plurality of predicted image quality parameter scores to the graphical user interface on the display device; and providing a combined output in the graphical user interface on the display device based on at least one of the predicted image quality score, the predicted plurality of predicted image quality parameter scores, the second predicted image quality score, and the second predicted plurality of predicted image quality parameter scores.

In at least one embodiment, the first medical image and the second medical image are based on a same view of a patient.

In at least one embodiment, the method further comprises displaying a report card interface on the display device based on the combined output.

In at least one embodiment, the report card in the graphical user interface further comprises a graph comparing one of the image qualities of the first medical image and the second medical image to an average image quality.

In at least one embodiment, the method further comprises mapping a given predicted image quality parameter score to a predicted image parameter index based on applying a threshold to the given image quality parameter score, where the threshold is based on an operating point on a Receiver Operator Characteristic curve for the predictive model that was used to generate the given predicted image quality parameter score; and providing the output to the graphical user interface on the display device to indicate the indexed image quality parameter score.

In at least one embodiment, the method further comprises mapping a predicted image quality score to a predicted image quality index by applying a threshold to the given image quality score, where the threshold is based on an operating point on a Receiver Operator Characteristic curve for the predictive model that was used to generate the predicted image quality score; and providing the output to the graphical user interface on the device display to indicate the indexed image quality score.

In at least one embodiment, the method further comprises displaying a user configurable operating point on the graphical user interface for a Receiver Operating Characteristic (ROC) curve corresponding to the predictive model; receiving a first user input for the user configurable operating point to adjust the location of an operating point on the ROC curve; and adjusting the operating point of the ROC curve according to the first user input to alter prediction accuracy for the predictive model.

In at least one embodiment, the method further comprises displaying a user configurable predicted image quality parameter feature threshold on the graphical user interface; receiving a second user input to adjust the user configurable predicted image quality parameter feature threshold; adjusting the user configurable predicted image quality parameter feature threshold according to the second user input; and updating the mapping of the predicted image quality score to the predicted image quality index due to the adjusted user configurable predicted image quality parameter feature threshold.

In at least one embodiment, the method further comprises initially displaying a set of first medical images and a set of second medical images in first and second display areas on the graphical user interface; identifying any of the first medical images that need to be moved from the first display area to the second display area and any of the second medical images that need to be moved from the second display area to the first display area based on changes in at least one of the operating point on the ROC curve and the user configurable predicted image quality parameter feature threshold due to the first and second user inputs; and moving the identified first medical images from the first display area to the second display area and moving the identified second medical images from the second display area to the first display area.

In at least one embodiment, the method further comprises implementing a given predictive model using machine learning and statistical learning models.

In at least one embodiment, the method further comprises implementing a given predictive model using a deep learning model including a Convolutional Neural Network (CNN).

In at least one embodiment, the method further comprises implementing a given predictive models using a generalized linear model with a logit or a generalized additive model with a logit link.

In another aspect, in accordance with the teachings herein there is provided a system of determining medical image quality, wherein the system comprises a memory unit, the memory unit storing a plurality of predictive models that are multivariate models; a display device; a processing unit in communication with the memory unit and the display device, the processor unit having a processor being configured to: receive the first medical image and an associated plurality of image metadata; determine a predicted image quality score based on the first medical image and one of the predictive models; generate a graphical user interface; and provide an output to the display device, the output including the graphical user interface and the predicted image quality score.

In at least one embodiment, the processor is further configured to determine a plurality of image quality parameter features based on the first medical image and optionally the plurality of metadata associated with the medical image; determine a predicted plurality of image quality parameter scores by applying at least some of the plurality of image quality parameter features as inputs to a plurality of predictive models where each predictive model corresponds to one of the plurality of predicted image quality parameter scores; determine a predicted image quality score by applying the predicted plurality of image quality parameter scores, and optionally the plurality of image quality parameter features, as inputs to an overall predictive model; and provide the output to the display device, the output including the graphical user interface and at least one of the predicted image quality score and the predicted plurality of image quality parameter scores.

In at least one embodiment, the processing unit is further configured to: receive a second medical image at the processor, the second medical image associated with a second plurality of image metadata; determine a second plurality of image quality parameter features based on the second medical image and optionally the second plurality of image metadata associated with the second medical image; determine a second plurality of image quality parameter scores by applying at least some of the second plurality of image quality parameter features as inputs to the plurality of predictive models where each predictive model corresponds to one of the image quality parameter scores; determine a second predicted image quality score by applying the second predicted plurality of image quality parameter scores, and optionally the second plurality of image quality parameter features, as second inputs to the overall predictive model; provide the second output in the graphical user interface on the display device to indicate at least one of the second predicted image quality score and the second predicted plurality of predicted image quality parameter scores to the graphical user interface on the display device; and provide a combined output in the graphical user interface on the display device based on at least one of the predicted image quality score, the predicted plurality of predicted image quality parameter scores, the second predicted image quality score, and the second predicted plurality of predicted image quality parameter scores.

In at least one embodiment, the processing unit is further configured to display a report card in the graphical user interface on the display device based on the combined output.

In at least one embodiment, the report card further comprises a graph comparing one of the image qualities of the first medical image and the second medical image to an average image quality.

In at least one embodiment, the processor is further configured to: determine a plurality of image quality parameter features based on the first medical image and optionally the plurality of metadata associated with the first medical image; determine a predicted image quality score by applying the predicted plurality of image quality parameter scores as inputs to an overall predictive model; and provide the output to the display device, the output including the graphical user interface and at least one of the predicted image quality score and the predicted plurality of image quality parameter scores.

In at least one embodiment, the processor is further configured to determine a plurality of image quality parameter features based on the first medical image and optionally the plurality of metadata associated with the first medical image; determine a predicted image quality parameter score by applying at least some of the predicted image quality parameter features as inputs to a predictive model that corresponds with the image quality parameter score; and provide the output to the display device, the output including the graphical user interface on the display device to indicate the predicted image quality parameter score.

In at least one embodiment, the plurality of image metadata stored at the memory unit comprises at least one of: acquisition settings data, patient data, device data, institution data, and MRT data.

In at least one embodiment, the processor is further configured to: map a given predicted image quality parameter score to a predicted image parameter index based on applying a threshold to the given image quality parameter score, where the threshold is based on an operating point on a receiver operator characteristic curve for the predictive model that was used to generate the given predicted image quality parameter score; and provide the output to the display device, the output including the graphical user interface and the indexed image quality parameter score.

In at least one embodiment, the processor is further configured to: map a predicted image quality score to a predicted image quality index by applying a threshold to the given image quality score, where the threshold is based on an operating point on a Receiver Operator Characteristic curve for the predictive model that was used to generate the predicted image quality score; and provide the output to the display device, the output including graphical user interface and the indexed image quality score.

In at least one embodiment, the processor is further configured to display a user configurable operating point on the graphical user interface for a Receiver Operating Characteristic (ROC) curve corresponding to the predictive model; receive a first user input for the user configurable operating point to adjust the location of an operating point on the ROC curve; and adjust the operating point of the ROC curve according to the first user input to alter prediction accuracy for the predictive model.

In at least one embodiment, the processor is further configured to display a user configurable predicted image quality parameter feature threshold on the display device; receive a second user input to adjust the user configurable predicted image quality parameter feature threshold; adjust the user configurable predicted image quality parameter feature threshold according to the second user input; and update the mapping of the predicted image quality score to the predicted image quality index due to the adjusted user configurable predicted image quality parameter feature threshold.

In at least one embodiment, the processor is further configured to initially display a set of first medical images and a set of second medical images in first and second display areas on the graphical user interface; identify any of the first medical images that need to be moved from the first display area to the second display area and any of the second medical images that need to be moved from the second display area to the first display area based on changes in at least one of the operating point on the ROC curve and the user configurable predicted image quality parameter feature threshold due to the first and second user inputs; and moving the identified first medical images from the first display area to the second display area and moving the identified second medical images from the second display area to the first display area.

In another aspect, in accordance with the teachings herein, there is provided a computer-implemented method of determining a predictive model at a processor for a given quality parameter score for use in assessing digital medical image quality, wherein the method comprises: receiving, at the processor, a plurality of medical images each having an associated plurality of image metadata; determining, using the processor, a plurality of quality parameter features from the plurality of medical images and optionally the associated plurality of image metadata; receiving, at the processor, a plurality of quality parameter labels and overall quality labels for the medical images from user input from at least one user; determining, using the processor, consensus quality label values from the plurality of image quality parameter labels and overall quality labels; and generating, using the processor, the predictive model as a function of at least some of the plurality of quality parameter features to provide the given quality parameter score by training the predictive model using the consensus quality label values.

In at least one embodiment, the quality parameter features, the quality parameter scores, the quality parameter labels and the overall quality labels comprise image quality parameter features, image quality parameter scores, image quality parameter labels and overall image quality labels and the predictive model is generated to provide an image quality parameter score or an image quality score.

In at least one embodiment, the quality parameter features, the quality parameter scores, the quality parameter labels and the overall quality labels comprise study quality parameter features, study quality parameter scores, study quality parameter labels and overall study quality labels and the predictive model is generated to provide a study quality parameter score or a study quality score.

In at least one embodiment, the plurality of medical images and the associated plurality of image metadata are user selected.

In at least one embodiment, the plurality of associated image metadata comprises at least one of: acquisition settings data, patient data, device data, institution data, and MRT data.

In at least one embodiment, generating the predictive model using the processor comprises iteratively selecting a unique subset of the plurality of image quality parameter features to form an intermediate predictive model, determining a receiver operating characteristic curve area for each intermediate predictive model, and selecting the subset of image quality parameter features that are associated with the intermediate predictive model having the highest receiver operating characteristic curve area as inputs for the predictive model.

In at least one embodiment, the plurality of medical images, the plurality of quality parameter labels and the overall quality labels are received continuously to form new training data and the method further comprises, at future time points, performing each of the receiving, determining and generating using updated training data.

In another aspect, in accordance with the teachings herein, there is provided a system for determining a predictive model for a given image quality parameter score or a given study quality parameter score for use in assessing digital medical image quality, wherein the system comprises: a memory unit that is adapted to store a plurality of medical images each having an associated plurality of image metadata; a display device; a processor unit in communication with the memory unit and the display device, the processor unit having a processor configured to: determine a plurality of image quality parameter features from the plurality of medical images and optionally the associated plurality of image metadata; receive a plurality of quality parameter labels and overall quality labels for the medical images from user input from at least one user; determine consensus quality label values from the plurality of image quality parameter inputs; and generate the predictive model as a function of at least some of the plurality of quality parameter features to provide the given quality parameter score by training the predictive model using the consensus quality label values.

In at least one embodiment of this system, the quality parameter features, the quality parameter scores, the quality parameter labels and the overall quality labels comprise image quality parameter features, image quality parameter scores, image quality parameter labels and overall image quality labels and the predictive model is generated to provide an image quality parameter score or an image quality score.

In at least one embodiment of this system, the quality parameter features, the quality parameter scores, the quality parameter labels and the overall quality labels comprise study quality parameter features, study quality parameter scores, study quality parameter labels and overall study quality labels and the predictive model is generated to provide a study quality parameter score or a study quality score.

In at least one embodiment of this system, the processor is further configured to generate the predictive model by iteratively selecting a unique subset of the plurality of image quality parameter features to form an intermediate predictive model, determine a receiver operating characteristic curve area for each intermediate predictive model, and select the subset of image quality parameter features that are associated with the intermediate predictive model having the highest receiver operating characteristic curve area as inputs for the predictive model.

In at least one embodiment, the plurality of medical images, the plurality of quality parameter labels and the overall quality labels are received continuously to form new training data; and each of the determining, receiving and generating are performed at future time points on the new training data.

In another aspect, in accordance with the teachings herein, there is provided a computer implemented method for determining digital medical image quality for a medical image study including several medical images, wherein the method comprises: receiving the medical images at a processor, the medical images each being associated with a plurality of image metadata; determining a predicted study quality score based on the medical images and a predictive model at the processor, wherein the predictive model is a multivariate model; and providing an output in a graphical user interface on a display device where the output shows the predicted study quality score.

In at least one embodiment, the method further comprises: determining a plurality of study quality parameter features based on the medical images and optionally the pluralities of metadata associated with each of the medical images; determining a predicted plurality of study quality parameter scores by applying at least some of the study quality parameter features as inputs to a plurality of predictive models where each predictive model corresponds to one of the study quality parameter scores; determining a predicted study quality score by applying the predicted plurality of study quality parameter scores, and optionally the study quality parameter features, as inputs to an overall study level predictive model; and providing the output in the graphical user interface on the display device to show at least one of the predicted study quality score and the predicted plurality of study quality parameter scores.

In at least one embodiment, the method further comprises determining a plurality of study quality parameter features based on the medical images and optionally the pluralities of metadata associated with the medical images; determining a predicted study quality score by applying the predicted plurality of study quality parameter scores as inputs to an overall predictive model; and providing the output in the graphical user interface on the display device to show at least one of the predicted study quality score and the predicted plurality of study quality parameter scores.

In at least one embodiment, the method further comprises determining a plurality of study quality parameter features based on the medical images and optionally the pluralities of metadata associated with the medical images; determining a predicted study quality parameter score by applying at least some of the predicted study quality parameter features as inputs to a predictive model that corresponds with the study quality parameter score; and providing the output in the graphical user interface on the display device to show the predicted study quality parameter score.

In at least one embodiment, the method further comprises: mapping a given predicted study quality parameter score to a predicted study parameter index based on applying a threshold to the given study quality parameter score, where the threshold is based on an operating point on a Receiver Operator Characteristic curve for the predictive model that was used to generate the given predicted study quality parameter score; and providing the output to the graphical user interface on the display device to show the indexed study quality parameter score.

In at least one embodiment, the method further comprises mapping a predicted study quality score to a predicted study quality index by applying a threshold to the given study quality score, where the threshold is based on an operating point on a Receiver Operator Characteristic curve for the predictive model that was used to generate the predicted study quality score; and providing the output to the graphical user interface on the display device to show the indexed study quality score.

In at least one embodiment, the method further comprises displaying a user configurable operating point on the graphical user interface for a Receiver Operating Characteristic (ROC) curve corresponding to the predictive model; receiving a first user input for the user configurable operating point to adjust the location of an operating point on the ROC curve; and adjusting the operating point of the ROC curve according to the first user input to alter prediction accuracy for the predictive model.

In at least one embodiment, the method further comprises displaying a user configurable predicted study quality parameter feature threshold on the graphical user interface; receiving a second user input to adjust the user configurable predicted study quality parameter feature threshold; adjusting the user configurable predicted study quality parameter feature threshold according to the second user input; and updating the mapping of the predicted study quality score to the predicted study quality index due to the adjusted user configurable predicted study quality parameter feature threshold.

In at least one embodiment, the method further comprises initially displaying a set of first medical images and a set of second medical images in first and second display areas on the graphical user interface; identifying any of the first medical images that need to be moved from the first display area to the second display area and any of the second medical images that need to be moved from the second display area to the first display area based on changes in at least one of the operating point on the ROC curve and the user configurable predicted study quality parameter feature threshold due to the first and second user inputs; and moving the identified first medical images from the first display area to the second display area and moving the identified second medical images from the second display area to the first display area.

In another aspect, in accordance with the teachings herein, there is provided a system for determining digital medical image quality for a medical image study including several medical images, wherein the system comprises: a memory unit, the memory unit storing the medical images, and a plurality of predictive models that are multivariate models; a display device; a processing unit in communication with the display device and the memory unit, the processor unit having a processor being configured to: receive the medical images and associated pluralities of image metadata; determine a predicted study quality score based on the medical images and one of the predictive models; generate a graphical user interface; and provide an output to the display device, the output including the graphical user interface and the predicted study quality score.

In at least one embodiment, the processor is further configured to: determine a plurality of study quality parameter features based on the medical images and optionally the pluralities of metadata associated with the medical images; determine a predicted plurality of study quality parameter scores by applying at least some of the study quality parameter features as inputs to a plurality of predictive models where each predictive model corresponds to one of the image study parameter scores; determine a predicted study quality score by applying the predicted plurality of study quality parameter scores, and optionally the study quality parameter features, as inputs to an overall predictive model; and provide the output to the display device, the output including the graphical user interface and at least one of the predicted study quality score and the predicted plurality of study quality parameter scores.

In at least one embodiment, the processor is further configured to: determine a plurality of study quality parameter features based on the medical images and optionally the pluralities of metadata associated with the medical images; determine a predicted study quality score by applying the predicted plurality of study quality parameter scores as inputs to an overall predictive model; and provide the output to the display device, the output including the graphical user interface and at least one of the predicted study quality score and the predicted plurality of study quality parameter scores.

In at least one embodiment, the processor is further configured to determine a plurality of study quality parameter features based on the medical images and optionally the pluralities of metadata associated with the medical images; determine a predicted study quality parameter score by applying at least some of the predicted study quality parameter features as inputs to a predictive model that corresponds with the study quality parameter score; and provide the output to the display device, the output including the graphical user interface on the display device to show the predicted study quality parameter score.

In at least one embodiment, the processor is further configured to: map a given predicted study quality parameter score to a predicted study parameter index based on applying a threshold to the given study quality parameter score, where the threshold is based on an operating point on a receiver operator characteristic curve for the predictive model that was used to generate the given predicted study quality parameter score; and provide the output to the display device, the output including the graphical user interface and the indexed study quality parameter score.

In at least one embodiment, the processor is further configured to: map a predicted study quality score to a predicted study quality index by applying a threshold to the given study quality score, where the threshold is based on an operating point on a Receiver Operator Characteristic curve for the predictive model that was used to generate the predicted study quality score; and provide the output to the display device, the output including graphical user interface and the indexed study quality score.

In at least one embodiment, the processor is further configured to display a user configurable operating point on the graphical user interface for a Receiver Operating Characteristic (ROC) curve corresponding to the predictive model, receive a first user input for the user configurable operating point for a Receiver Operating Characteristic (ROC) curve corresponding to the predictive model and adjust the operating point of the ROC curve according to the first user input to alter prediction accuracy for the predictive model.

In at least one embodiment, the processor is further configured to: display a user configurable predicted study quality parameter feature threshold on the graphical user interface; receive a second user input to adjust the user configurable predicted study quality parameter feature threshold; adjust the user configurable predicted study quality parameter feature threshold according to the second user input; and updating the mapping of the predicted study quality score to the predicted study quality index due to the adjusted user configurable predicted study quality parameter feature threshold.

In at least one embodiment, the processor is further configured to: initially display a set of first medical images and a set of second medical images in first and second display areas on the graphical user interface; identify any of the first medical images that need to be moved from the first display area to the second display area and any of the second medical images that need to be moved from the second display area to the first display area based on changes in at least one of the operating point on the ROC curve and the user configurable predicted study quality parameter feature threshold due to the first and second user inputs; and move the identified first medical images from the first display area to the second display area and moving the identified second medical images from the second display area to the first display area.

In another aspect, in accordance with the teachings herein, there is provided a computer-implemented method for allowing for visual assessment of medical images, wherein the method is implemented by a processor and the method comprises: generating a graphical user interface including a plurality of filter fields; outputting the graphical user interface on a display device for viewing by a user; receiving at least one filter input from the user; accessing a database to retrieve a plurality of medical images that satisfy the at least one filter input, the medical images being grouped into studies; outputting thumbnails of the studies on the graphical user interface on the display device; receiving a study input indicating the study selected by the user; accessing the database to retrieve image parameter feature scores and an overall image quality score for each image of the selected study; and displaying images of the selected study along with the image parameter feature scores and the overall image quality score for each image of the study, and an overall study quality score for the selected study on the graphical user interface on the display device.

In another aspect, in accordance with the teachings herein, there is provided a system for allowing for visual assessment of medical images, the system comprising: a memory, the memory comprising a database; a display device; a user input device; a processor in communication with the memory, the display device, and the user input device, the processor being configured to: generate a graphical user interface including a plurality of filter fields; output the graphical user interface to the display device for viewing by a user; receive from the user input device at least one filter input from the user; access the database to retrieve a plurality of medical images that satisfy the at least one filter input, the medical images being grouped into studies; output thumbnails of the studies on the graphical user interface on the display device; receive from the user input device a study input indicating the study selected by the user; access the database to retrieve image parameter feature scores and an overall image quality score for each image of the selected study; and display images of the selected study along with the image parameter feature scores and the overall image quality score for each image of the study, and an overall study quality score for the selected study on the graphical user interface on the display device.

In another aspect, in accordance with the teachings herein, there is provided a computer-implemented method for allowing for visual assessment of medical images, wherein the method is implemented by a processor and the method comprises: generating a graphical user interface including a plurality of filter fields; outputting the graphical user interface on a display device for viewing by a user; receiving at least one filter input from the user; accessing a database to retrieve a study that satisfies the at least one filter input, the study including several images and a plurality of image parameter feature scores for each image of the selected study; outputting thumbnails of the images of the selected study on the graphical user interface on the display device; receiving an image selection input from the user indicating the selected image by the user; displaying a large version of the selected image and the image parameter feature scores that correspond to the selected image on the graphical user interface on the display device; and displaying an indication on the graphical user interface on the display device of the image parameter feature scores that are non-conforming with a corresponding standard score.

In another aspect, in accordance with the teachings herein, there is provided a system for allowing for visual assessment of medical images, the system comprising: a memory, the memory comprising a database; a display device; a user input device; a processor in communication with the memory, the display device, and the user input device, the processor being configured to: generate a graphical user interface including a plurality of filter fields; output the graphical user interface on the display device for viewing by a user; receive at the user input device at least one filter input from the user; access the database to retrieve a study that satisfies the at least one filter input, the study including several images and a plurality of image parameter feature scores for each image of the selected study; output thumbnails of the images of the selected study on the graphical user interface on the display device; receive at the user input device an image selection input from the user indicating the selected image by the user; display a large version of the selected image and the image parameter feature scores that correspond to the selected image on the graphical user interface on the display device; and display an indication on the graphical user interface on the display device of the image parameter feature scores that are non-conforming with a corresponding standard score.

In another aspect, in accordance with the teachings herein, there is provided a computer-implemented method for allowing for visual assessment of medical images, wherein the method is implemented by a processor and the method comprises: generating a graphical user interface including a plurality of filter fields; outputting the graphical user interface on a display device for viewing by a user; receiving at least one filter input from the user; accessing a database to retrieve images and a plurality of image parameter feature scores for each image, where the retrieved images satisfy the at least one filter input; displaying a given icon for a given image parameter feature that corresponds to the image parameter feature score on the graphical user interface on the display device; comparing the given image parameter feature score for the retrieved images to a threshold associated with the given image parameter feature to determine a given number of the retrieved images that satisfy the threshold; displaying the number of retrieved images on the graphical user interface on the display device; displaying the percentage of retrieved images whose image parameter feature scores exceed the threshold on the graphical user interface on the display device; and outputting the given number with the given icon on the graphical user interface on the display device.

In at least some embodiments, the method further comprises repeating the displaying, comparing and outputting steps for other image parameter features.

In at least some embodiments, the method further comprises receiving a user input from the user of a selected image parameter; accessing the database to retrieve a plurality of medical images that satisfy the threshold for the image parameter, the medical images being grouped into studies; outputting thumbnails of the studies on the graphical user interface on the display device; receiving a study input indicating the study selected by the user; accessing the database to retrieve image parameter feature scores and an overall image quality score for each image of the selected study; and displaying images of the selected study along with the image parameter feature scores and the overall image quality score for each image of the study, and an overall study quality score for the selected study on the graphical user interface on the display device.

In another aspect, in accordance with the teachings herein, there is provided a system for allowing for visual assessment of medical images, the system comprising: a memory, the memory comprising a database; a display device; a user input device; a processor in communication with the memory, the display device, and the user input device, the processor being configured to: generate a graphical user interface including a plurality of filter fields; output the graphical user interface on the display device for viewing by a user; receive at the user input device at least one filter input from the user; access the database to retrieve images and a plurality of image parameter feature scores for each image, where the retrieved images satisfy the at least one filter input; display a given icon for a given image parameter feature that corresponds to the image parameter feature score on the graphical user interface on the display device; compare the given image parameter feature score for the retrieved images to a threshold associated with the given image parameter feature to determine a given number of the retrieved images that satisfy the threshold; display the number of retrieved images on the graphical user interface of the display device; display the percentage of retrieved images whose image parameter feature scores exceed the threshold on the graphical user interface of the display device; and output the given number with the given icon the graphical user interface of the display device.

In at least one embodiment, the processor is further configured to repeat the displaying, comparing and outputting steps for other image parameter features.

In at least one embodiment, the processor is further configured to: receive at the user input device a user input from the user of a selected image parameter; access the database to retrieve a plurality of medical images that satisfy the threshold for the image parameter, the medical images being grouped into studies; output thumbnails of the studies on the graphical user interface on the display device; receive at the user input device a study input indicating the study selected by the user; access the database to retrieve image parameter feature scores and an overall image quality score for each image of the selected study; and display on the graphical user interface of the display device images of the selected study along with the image parameter feature scores and the overall image quality score for each image of the study, and an overall study quality score for the selected study.

In another aspect, in accordance with the teachings herein, there is provided a system for allowing for visual assessment of medical images, wherein the system comprises a processing unit coupled to the memory unit, the processor unit having a processor being configured to perform a visual assessment method as defined in according with any of the embodiments described herein.

It should be noted that in these various system embodiments, the images may not be stored on the memory unit but may rather be stored in another memory store associated with another system such as a PACS system.

In another aspect, in accordance with the teachings herein, there is provided a method for determining a breast density classification from a digital mammogram, the method comprising: receiving an input image corresponding to the digital mammogram; preprocessing the input image to obtain a preprocessed image; performing measurements on the preprocessed image to obtain values forfeitures; providing the input image to a first convolutional layer of a first Convolutional Neural Network (CNN) that generates a percent breast density value; providing the percent breast density value and values of the features to an input layer that is before a final fully connected layer of a second CNN for generating a breast density classification.

In at least one embodiment, the values for the features are determined from indicators of at least one of a dispersion pattern of dense breast tissue in the input image, texture indicators for the input image, pattern indicators for the input image and pixel intensities for the input image.

In at least one embodiment, the method comprises determining mean blob size, compactness, and a smallest convex hull that encompasses all dense tissue in the digital mammogram as the values of the features that are provided to the input layer.

In another aspect, in accordance with the teachings herein, there is provided a system for determining a breast density value classification from a mammogram image, wherein the system comprises: a memory unit; and a processing unit coupled to the memory unit, the processor unit being configured to perform a breast density classification method using a CNN in accordance with the teachings herein.

Other features and advantages of the present application will become apparent from the following detailed description taken together with the accompanying drawings. It should be understood, however, that the detailed description and the specific examples, while indicating preferred embodiments of the application, are given by way of illustration only, since changes and modifications within the spirit and scope of the application will become apparent to those skilled in the art from this detailed description.

BRIEF DESCRIPTION OF THE DRAWINGS

For a better understanding of the various embodiments described herein, and to show more clearly how these various embodiments may be carried into effect, reference will be made, by way of example, to the accompanying drawings which show at least one example embodiment, and which are now described. The drawings are not intended to limit the scope of the teachings described herein.

FIG. 10 shows an example embodiment of another user interface diagram for a medical image that may be used by the medical image quality system of FIGS. 1 and 43.

FIG. 11A shows an example embodiment of another user interface that may be used by the medical image quality system of FIGS. 1 and 43.

FIG. 11B shows a truth table diagram that may be used by the medical image quality system of FIGS. 1 and 43.

FIGS. 14-25 show example embodiments of various user interfaces that may be used by the medical image quality system of FIGS. 1 and 43.

FIGS. 36-41 show example embodiments of various user interfaces that may be used by the medical image quality system of FIGS. 1 and 43.

FIGS. 44 and 45 show example embodiments of various user interfaces that may be used by the medical image quality systems of FIGS. 1 and 43.

FIGS. 47A to 50B show medical images that illustrate various image quality parameter features that may be used by a medical image quality system.

FIGS. 52A and 52B show examples of ROC and precision-recall curves, respectively, for a CC exaggeration metric obtained using a CNN based predictive model.

FIG. 52C shows a scatterplot example results for the percent mammographic density metric determined using a CNN based predictive model.

Figure 1:
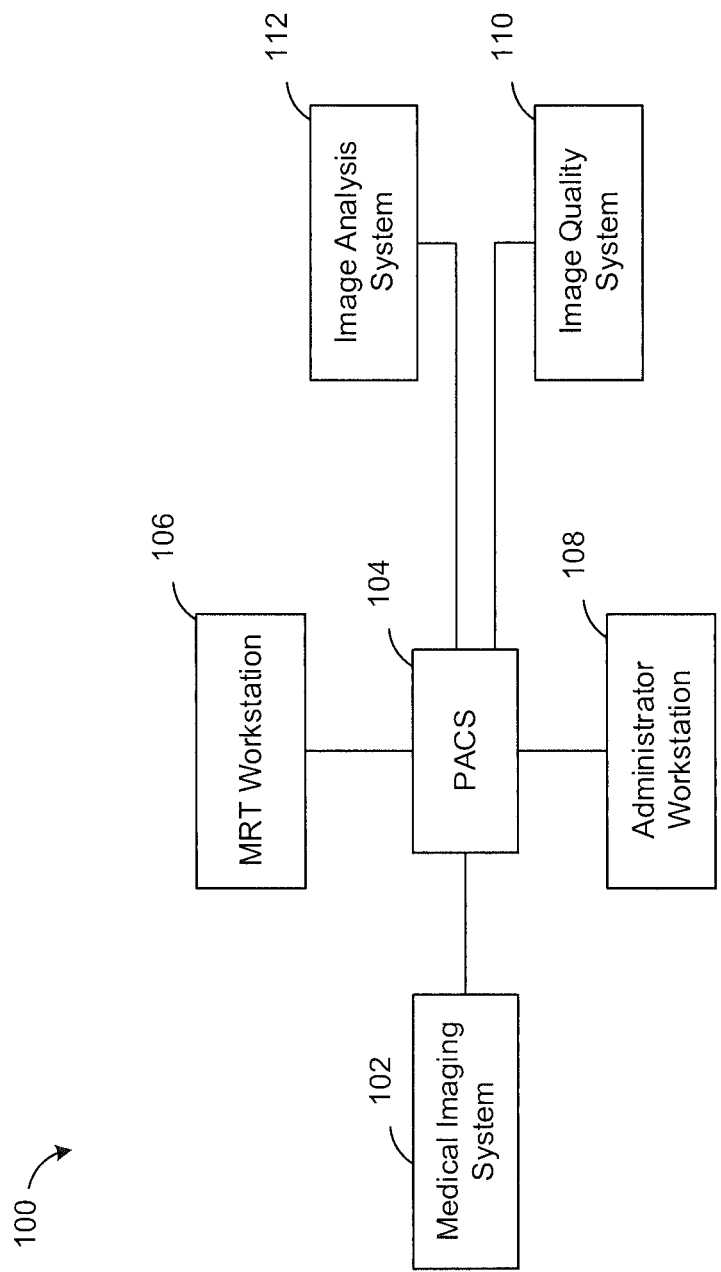
FIG. 1 is a block diagram for an example embodiment of a system for assessment of medical images.

Further aspects and features of the example embodiments described herein will appear from the following description taken together with the accompanying drawings.

DETAILED DESCRIPTION OF THE EMBODIMENTS

Various embodiments in accordance with the teachings herein will be described below to provide an example of at least one embodiment of the claimed subject matter. No embodiment described herein limits any claimed subject matter. The claimed subject matter is not limited to devices, systems or methods having all of the features of any one of the devices, systems or methods described below or to features common to multiple or all of the devices, systems or methods described herein. It is possible that there may be a device, system or method described herein that is not an embodiment of any claimed subject matter. Any subject matter that is described herein that is not claimed in this document may be the subject matter of another protective instrument, for example, a continuing patent application, and the applicants, inventors or owners do not intend to abandon, disclaim or dedicate to the public any such subject matter by its disclosure in this document.

It will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

It should also be noted that the terms "coupled" or "coupling" as used herein can have several different meanings depending in the context in which these terms are used. For example, the terms coupled or coupling can have an electrical connotation. For example, as used herein, the terms coupled or coupling can indicate that two elements or devices can be directly connected to one another or connected to one another through one or more intermediate elements or devices via an electrical signal, electrical connection, or communication pathway depending on the particular context.

It should also be noted that, as used herein, the wording "and/or" is intended to represent an inclusive-or. That is, "X and/or Y" is intended to mean X or Y or both, for example. As a further example, "X, Y, and/or Z" is intended to mean X or Y or Z or any combination thereof.

It should be noted that terms of degree such as "substantially", "about" and "approximately" as used herein mean a reasonable amount of deviation of the modified term such that the end result is not significantly changed. These terms of degree may also be construed as including a deviation of the modified term, such as by 1%, 2%, 5% or 10%, for example, if this deviation does not negate the meaning of the term it modifies.

Furthermore, the recitation of numerical ranges by endpoints herein includes all numbers and fractions subsumed within that range (e.g. 1 to 5 includes 1, 1.5, 2, 2.75, 3, 3.90, 4, and 5). It is also to be understood that all numbers and fractions thereof are presumed to be modified by the term "about" which means a variation of up to a certain amount of the number to which reference is being made if the end result is not significantly changed, such as 1%, 2%, 5%, or 10%, for example.

The embodiments of the systems and methods described herein may be implemented in hardware or software, or a combination of both. These embodiments may be implemented with computer programs executing on programmable devices, each programmable device including at least one processor, a data storage system (including volatile memory or non-volatile memory or other data storage elements or a combination thereof), and at least one communication interface. For example and without limitation, the programmable devices may be a server, network appliance, embedded device, computer expansion module, a personal computer, laptop, personal data assistant, cellular telephone, smart-phone device, tablet computer, a wireless device or any other computing device capable of being configured to carry out the methods described herein.

In some embodiments, a communication interface is included which may be a network communication interface. In embodiments in which elements are combined, the communication interface may be a software communication interface, such as those for inter-process communication (IPC). In still other embodiments, there may be a combination of communication interfaces implemented as hardware, software, and combination thereof.

Program code may be applied to input data to perform the functions described herein and to generate output information. The output information may be applied to one or more output devices. Each program may be implemented in a high level procedural or object oriented programming and/or scripting language, or both, to communicate with a computer system. However, the programs may be implemented in assembly or machine language, if desired. In any case, the language may be a compiled or interpreted language. Each such computer program may be stored on a storage media or a device (e.g. ROM, magnetic disk, optical disc) readable by a general or special purpose programmable computer, for configuring and operating the computer when the storage media or device is read by the computer to perform the procedures described herein. Embodiments of the system may also be considered to be implemented as a non-transitory computer-readable storage medium that stores various computer programs, that when executed by a computing device, causes the computing device to operate in a specific and predefined manner to perform at least one of the functions described in accordance with the teachings herein.

Furthermore, the functionality of the system, processes and methods of the described embodiments are capable of being distributed in one or more computer program products comprising a computer readable medium that bears computer usable instructions for one or more processors. The medium may be provided in various forms, including non-transitory forms such as, but not limited to, one or more diskettes, compact disks, tapes, chips, and magnetic and electronic storage media as well as transitory forms such as, but not limited to, wireline transmissions, satellite transmissions, internet transmission or downloads, digital and analog signals, and the like. The computer useable instructions may also be in various forms, including compiled and non-compiled code.

The current practice for medical image quality assessment is a manual, resource-intensive process performed by Medical Radiation Therapists (MRTs) that is time-consuming and non-standardized. It is estimated to take an experienced MRT over 10 minutes to perform a manual image quality assessment. The resources required to perform these assessments across the board are simply not available, nor is it economically viable. For example, for mammographic imaging, each year, millions of mammograms are performed and manual image quality assessments are only performed on a very small random sample of studies, and not done on the full population of women who have had a mammogram because of the associated time requirements.

Three important questions relating to clinical image quality include:

(1) Does the clinical image quality include positioning data?
(2) Are there corrective procedures in the event of non-conformities? A non-conformity is a feature in the image that does not conform with established standards.
(3) What is the procedure for oversight of Quality Assurance (QA)/Quality Control (QC) records including overseeing frequency and performance of required tests and determining the need for corrective action?

Two challenges in clinical image quality review include evaluating medical images transactionally and generally in real-time as they are collected, and evaluating large samples of medical images or entire population data sets for resource allocation, service delivery, training, and continuing education.

Referring to the challenge of evaluating medical images generally in real-time, there are several technical challenges: (1) there are no mechanisms for providing ongoing radiologist feedback on image quality; (2) there are no systems in place that include mechanisms for documenting any needed corrective action nor the effectiveness of any corrective action taken; (3) there are no mechanisms in place for regular reviews of image quality attributes of a sample of mammograms performed by each active MRT and a sample of mammograms accepted for interpretation by each active Interpreting Physician (IP); (4) there is no documentation of clinical image quality review since the last inspection; and (5) there is no system in place for IP oversight, including review of the frequency of performance of all MRTs and determining whether appropriate corrective actions were performed when needed.

Another technical challenge is evaluating large samples of medical images or entire health system wide image stores for resource allocation, service delivery, training, and continuing education. The inability to navigate between views of individual mammograms and views of aggregated statistical summaries (i.e. key performance indices) of large health system wide mammography image stores, as well as the inability to simply identify outliers in these large data stores and then easily view the corresponding images, and the inability to simply benchmark, report and audit mammography processes is a technical barrier to achieving these benefits in a scalable way.

Another issue is that mammography facility accreditation audits are designed to evaluate if a clinic can demonstrate their knowledge of what a properly acquired image should look like. Some accreditation audits have yielded as high as 10% rates of non-conformity. However, audits using random samples of digital images provide an estimate of the magnitude of image quality conformities or non-conformities at the population level and have yielded as high as 50% rates of non-conformity. Prohibitively high costs and shortage of resources are a challenge facing healthcare systems globally, and it is not feasible for MRTs or IPs to perform mammography image quality reviews on every single digital mammogram that is acquired, nor to implement continual quality control processes. Benchmarking and monitoring performance of MRTs and mammography imaging centers, implementing comprehensive mammography quality audits and rapidly identifying and resolving root-causes of non-conformities with image quality standards cannot be achieved based on evaluation of small random samples of mammograms.

Another issue is that healthcare systems are under extreme financial pressures to deliver value-based care, balancing between quality, outcomes and cost. Effective management of the quality of mammography screening services to maintain/improve clinical outcomes while controlling costs of service delivery requires striking a balance between under-calling and over-calling non-conformities.

In accordance with the teachings herein, the inventors have determined a technical solution to this challenge by allowing a user, who is reviewing image quality, the ability to select an operating point for a given image quality parameter or a given study quality parameter which allows the user to control the sensitivity, i.e. the True Positive Rate (TPR), and the specificity, i.e. 1—the False Positive Rate (FPR) to control the amount of under-calling and over-calling of non-conformities, and hence the number of digital images to review, for a given image quality parameter feature. The operating point is determined in relation to a Receiver Operator Characteristic (ROC) curve for the given image quality parameter feature, which is described in further detail herein.

The MRT positioning technique employed by the MRT when acquiring images of patients is an important factor affecting image quality. Without a standardized tool to evaluate mammography image quality, quality cannot be consistently reported nor applied to every mammogram for every woman screened. As such, with current computer-based systems, only a very small number of mammograms are being audited, leaving the vast majority of women with unaudited mammograms. The ability for even a large, well-staffed mammography department to conduct random audits is challenging. Limited department image audits (via manual visual assessments by an individual) of very few cases can take weeks to perform and does not allow for simple access to digital mammograms for further evaluation or investigation of root causes of variation in processes without considerable additional manual effort.

As referred to herein, the terms medical image and medical image assessment are used. However, it should be understood that the medical image assessment, that is described in the various digital mammography embodiments discussed herein, may be applied to other medical imaging technologies including, but not limited to, X-ray images, computed tomography (CT) scan, magnetic resonance imaging (MRI) images, ultrasound images, or nuclear medicine image such as positron-emission tomography (PET).

As referred to herein, the term "Image Quality Parameter (IQP)" is used to refer to a feature or metric that is developed to identify a particular non-conformity that may be found in a type of medical image, such as a digital mammogram including "for processing" and "for presentation" mammograms. A list of example IQPs is provided in Table 1. It is understood that there may be many other IQPs used by the example embodiments described herein, and variations thereof, and Table 1 is provided as an example and is not necessarily exhaustive. As referred to herein, the term "Image Quality Parameter Score"(IQPS) may be used to refer to a predicted probability of the presence of an error for a given IQP in a medical image. In addition, an Image Quality Parameter Index (IQPI) and/or a distinct predicted class, which may also include a corresponding confidence for the class may both be generated based on one or more Image Quality Parameter Features (IQPFs) and IQPSs. As used herein, an IQPF represents a measurement of some aspect of the image that is directly or indirectly related to an IQP. This same terminology can be expanded to image quality score, image quality index, study quality parameter score, study quality parameter, study quality parameter index, study quality score and study quality index. In the various embodiments described herein, the medical image is a mammogram. However, the teachings herein can be applied to other types of medical images.

Furthermore, although the various example embodiments described herein are with respect to mammographic images, it should be understood that the various teachings herein can be applied to retrieving and/or assessing image quality for medical images of other body parts of a patient's anatomy where the patient may be a person or an animal. For example, the teachings herein may be applied to chest images, cardiac images, bone images (e.g. including images of the hand, hip, knee, and spine), musculoskeletal (MSK) images, neurological images, oncology images, pediatric images, kidney images, orthopedic images and gastrointestinal images, for example, that may be obtained using a variety of imaging modalities such as X-ray, CT and MRI. For example, the medical system may be applied to (a) x-ray images of the chest, ribs, abdomen, cervical spine, thoracic spine, lumbar spine, sacrum, coccyx, pelvis, hip, femur, knee, tibia/fibula, ankle, foot, finger, hand, forearm, elbow, humerus, shoulder, sternum, AC joints, SC joints, mandible, facial bones, and skull; (b) CT images of the head, neck, chest, abdomen, pelvis, breast and extremities and (c) MRI images of the head, neck, chest, abdomen, pelvis, breast and extremities. Therefore, the mammographic studies described herein are an example of a medical study that can be performed using the teachings described herein.

Reference is first made to FIG. 1, which shows an example embodiment of a system diagram 100 for a medical image quality system 110. Image quality system 100 has medical imaging system 102, MRT Workstation 106, Administrator Workstation 108, Image Quality System 110 and Image Analysis System 112. The image quality system 110 and the image analysis system 112 as well as certain assessment tools and graphical user interfaces used at the MRT workstation 106 and the administrator workstation 108 may be provided by a central server (not shown).

The image quality system 100 may access a Picture Archiving and Communication System (PACS) 104 to obtain digital images and perform image quality assessment. The medical imaging system 102 may be a digital mammography machine in network communication with PACS 104. The medical imaging system 102 uses a digital mammographic machine to take mammographic images from patients, by using a parallel plate compression means to even the thickness and spread out a patient's breast tissue, delivering X-rays from an X-ray source to the compressed breast tissue, and then recording the image with a digital detector. These digital images that are obtained by medical imaging system 102 may be sent to the PACS 104 and may be in the DICOM data format. The DICOM data format includes both image data and image metadata. Alternatively, the medical imaging system 102 may record the mammographic image on film, and the film image may be separately digitized and transmitted to the PACS 104. The digital mammographic images may then be processed in accordance with the teachings herein to determine one or more of IQPs, IQPFs, IQPSs, Study Quality Parameters (SQPs), SQP score (SQPSs) and related indices and these determined values can also be stored with the corresponding images by the PACS 104.

The medical imaging system 102 may associate a plurality of image metadata with the medical image. This plurality of metadata may be associated with the image automatically at the time the image is collected, or may be associated manually with the image after the image is collected. The plurality of metadata associated with the medical image is discussed in more detail in FIG. 6.

A patient may have a study done that includes several different images taken by the medical imaging system 102 during the same visit. The different images in a study may include images that are taken are of a region of interest or body part at different angles, or images that are taken of different positions of a portion of the target body part or a region of interest. For example, for mammographic studies, one image in the study may be a craniocaudal (CC) view, and another image in the study may be the mediolateral oblique (MLO) view. There may be multiple images for each of the CC view and the MLO view, such as one image for each breast in each view.

The MRT workstation 106 and the medical imaging system 102 may be co-located at a physical location. The MRT workstation 106 may be a desktop computer, mobile device, laptop computer, or an embedded system associated with the medical imaging system itself.

The MRT workstation 106 may display an output of a medical image that was just obtained (i.e. acquired) for a particular patient. In addition, the MRT workstation 106 may also display a plurality of image quality parameters for at least one image in a study, and a plurality of predicted image quality parameter scores. The scores are predicted in the sense that a predictive model is used to determine the score and whereby covariates are input into the predictive model and the predictive model predicts the probability of the event (which is the presence of an image quality error amongst the plurality of image quality errors). The MRT workstation 106 may also display an overall predicted image quality score. This data may be displayed generally in real-time with the acquisition of the medical image. This near real-time display of the plurality of predicted image quality parameter scores and the predicted overall image quality score may inform the MRT that a recently acquired medical image is of low quality and may need to be performed again. Similarly, if the study itself has non-conformities as indicated by predicted image quality scores this may be used to inform the MRT to perform the study again. In addition, an Image Quality Index (IQI) can be generated from the IQPS. Advantageously, this near real-time image quality assessment may avoid the situation of having a patient return to the imaging clinic on a second occasion to perform the image acquisition a second time if the imaging was not performed properly the first time.

The MRT workstation 106 may also display an output of the images of a mammographic study for the particular patient, a plurality of predicted study quality parameters and a corresponding plurality of predicted study quality parameter scores. The MRT workstation 106 may also display an overall predicted study quality score. This information may be displayed generally in real-time with the collection of the mammographic study. This near real-time display of the plurality of predicted study quality parameter scores and the predicted overall study quality score may inform the MRT that a recently collected mammographic study is of low quality and the imaging may need to be performed again. Advantageously, this may be used to avoid having the patient return to the imaging clinic on a second occasion to perform the image study acquisition a second time if the image study obtained during in the first visit had inadequate study quality parameter scores.

Alternatively, or in addition thereto, for either the overall image quality assessment or the overall study quality assessment, the image analysis system 112 may provide a predicted class that is generated by a classifier model based on the predicted image/study quality parameter scores.

The MRT workstation 106 may be in network communication with the image quality system 110. The access to image quality system 110 may be performed using a web browser where the image quality system 110 is a web-based application, or by any other remote access means.

The PACS 104 may be in network communication with the medical imaging system 102, the MRT workstation 106, the administrator workstation 108, and the image quality system 110. The PACS 104 may receive the medical image and the plurality of image metadata and store them in a database from the medical imaging system 102. The received medical image and metadata is typically in a standardized format such as the DICOM format. The image metadata includes data from the DICOM header which includes scanner device data and some patient data such as age. Alternatively, other formats may be used in other embodiments. With this system arrangement, the image analysis system 112 and the image quality system 110 receives the images and associated image metadata from the PACS 104. Alternatively, the image analysis system 112 and the image quality system 110 may receive images and corresponding image metadata from the scanner (not shown) of the medical imaging system. In this case, the image quality system 110 then generates the plurality of image quality parameter feature values, scores and indices (and potentially classifications) as well as study quality parameter feature values, scores and indices (and potentially classifications) when the images and image metadata for a study are available for assessment. In this case, the PACS 104 receives the medical image and the image metadata from and various parameters, scores, indices and classifications (if performed) from one the image quality system 110. In both of the above embodiments, the image quality system 110 may receive data from other sources such as an Electrical Medical Records (EMR) system for data related to the patient and study before performing any image assessment. For example, data on height and weight and whether there are any other known conditions (e.g. existing masses) might be used in image assessment.

The administrator workstation 108 may allow a health administrator to access the PACS 104 and the image quality system 110 in order to perform assessments of various factors including performance of a particular MRT. The administrator workstation 108 may be a desktop computer, mobile device, or laptop computer. The administrator workstation 108 may be in network communication with the image quality system 110. The access to image quality system 110 may be performed using a web browser where the image quality system 110 is a web-based application, or by any other remote access means.

The image quality system 110 may function to determine a plurality of predicted image quality parameter scores corresponding to a plurality of image quality parameters. Additionally, the image quality system 110 may function to determine an overall predicted image quality score. The image quality system 110 may also function to determine a plurality of study quality parameters and predicted study quality parameter scores. The predicted image quality parameter scores may then be combined to determine an image quality index and/or image level classification. Likewise the predicted study quality parameter scores can be combined to determine a study quality index and/or study quality classification. While the image quality system 110 is described herein as operating on standard "for presentation" mammographic images as recorded by the medical imaging system 102, it should be understood that the methodology described herein for using various image and study parameters, determining scores comprising predicted probabilities for those parameters, and generating an index and/or a classification, may be done on medical images that are collected/acquired on film and then digitized as well as raw medical images also known as "for processing" mammographic images.

In some embodiments, the image quality system 110 may receive one or more medical images and the associated plurality of image metadata, for each image, directly from the MRT workstation 106. Alternatively, or in addition thereto, the image quality system 110 may receive the one or more medical images and the associated plurality of image metadata from the PACS 104 and/or the medical imaging system 102. Alternatively, the image quality system 110 may receive the one or more medical images and the associated plurality of image metadata from a study from the MRT workstation 106, the PACS 104 or the medical imaging system 102.

The image analysis system 112 may function to allow an administrative user to query the predicted image quality parameter scores across a selected medical organization or healthcare system. The different dimensions of analysis include, but are not limited to, per patient, per machine, per MRT, per institution, per image type (e.g. CC, MLO, etc.), or per image quality parameter. The image analysis system is explained in more detail in FIGS. 14-26. The image analysis system 112 may provide an administrator with data that can be used to create an alert to be triggered generally in real-time as medical images are being collected. This alert is described in more detail in FIGS. 8, and 18-20.

Figure 2:
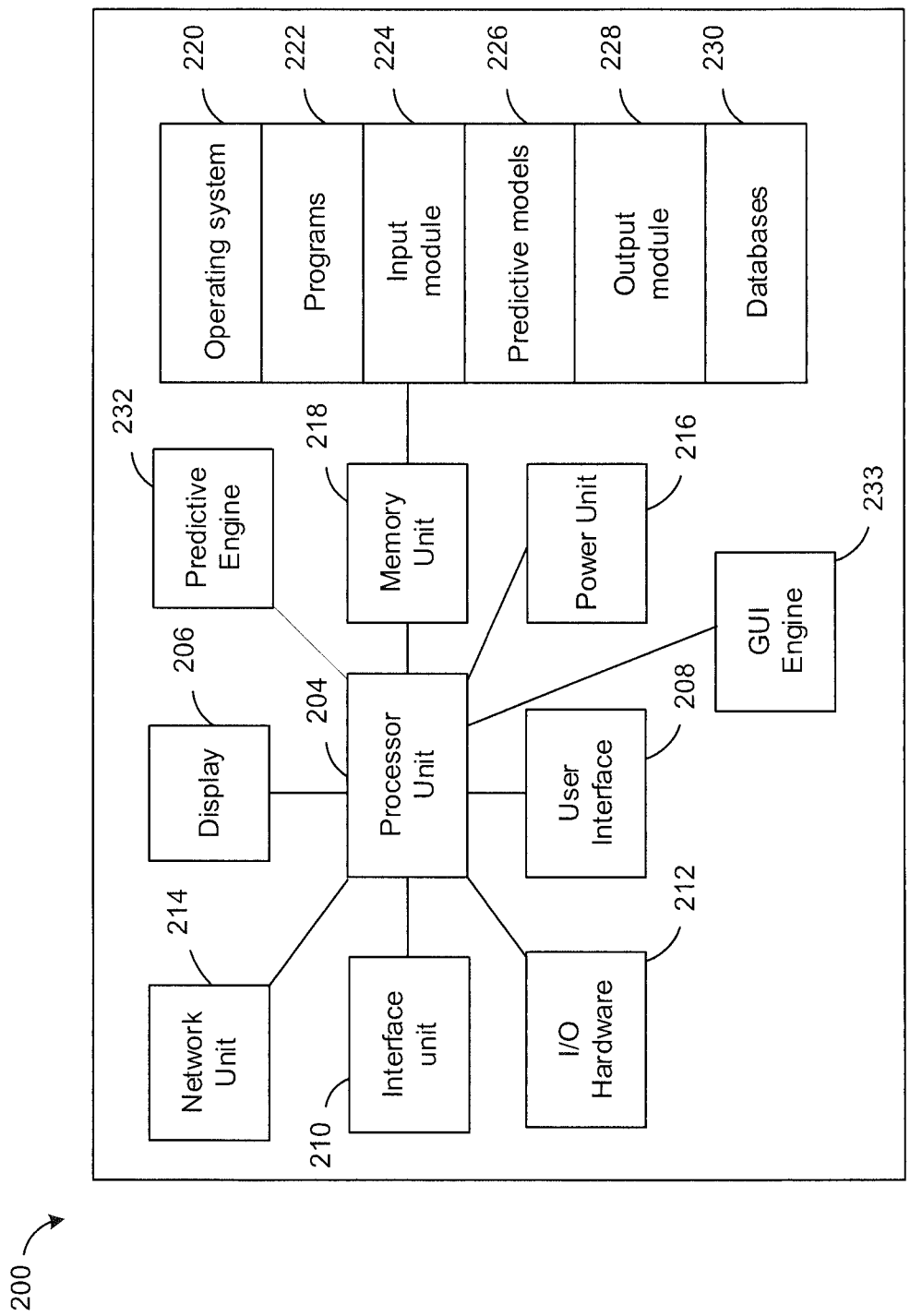
FIG. 2 is a block diagram of a medical image quality system of FIG. 1.

Referring now to FIG. 2, shown therein is a block diagram of an example embodiment of a medical image quality system 200. The medical image quality system 200 shows a computer system configured to determine a plurality of image quality parameter scores, an overall image quality, and a corresponding image quality score for individual medical images or medical images that form part of a study. Each of the plurality of predicted image quality parameter scores corresponds to a probability of a particular non-conforming condition being present in the image. It should be understood that a similar system can be used to implement the image quality system 110, the MRT workstation 106 and the administrator workstation 108 by, in part, executing programs that implement the functionality of each of those components.

The medical image quality system 200 may run on a computer or server, and includes a display device 206, a network unit 214, a processor unit 204, a memory unit 218, a power unit 216, a user interface 208, i/o hardware 212, and an interface unit 210. The display device 206 may be used to view a standard video output such as VGA or HDMI. The network unit 214 may be a standard network adapter such as an Ethernet or 802.11x adapter. The processor unit 204 may include a standard processor, such as the Intel Xeon processor, for example. Alternatively, there may be a plurality of processors that are used by the processor unit 204 and may function in parallel. User interface 208 may be an Application Programming Interface or a Web-based application that is accessible via the network unit 218.

The processor unit 204 executes a predictive engine 232 that may function to provide predictions by using the predictive models 226 in the memory unit 218. The processor unit 204 can also execute a graphical user interface (GUI) engine 233 that is used to generate various GUIs, some examples of which are shown and described herein, such as in FIGS. 14-25, 36-41, and 44-45. The GUI engine 233 is used to provide a visual display of data, messages and/or reports to a user according to a certain layout for each user interface and also to receive inputs from the user. The GUI engine 233 may then change the data that is shown on the current user interface or shows a different user interface depending on the user inputs.

The predictive engine 232 may be operated to determine a predicted image/study quality parameter score for a given image/study quality parameter based on image data, the plurality of image metadata, and a predictive model that is selected from the plurality of predictive models 226 and corresponds to the particular parameter that is being assessed. The predictive engine 232 may further use an overall predictive model in the plurality of predictive models 226 to determine an overall predicted image/study quality score.

It should be understood that the text "image/study" is a short form version to cover a score, parameter or index that can be used for either image quality or study quality. For example, the text "predicted image/study quality parameter score" is meant to be understood as being "predicted image quality parameter score or study quality parameter score".

In some cases, the predictive engine 232 may use predictive models to generate predicted probabilities of an event (i.e. non-conformity) that may be mapped using an operating point to create different classes. Alternatively, the predictive engine 232 can generate predicted classes directly without determining a predicted probability, such as by the use of a classifier model, for example.

It should be noted that each predictive model implements a multivariate model in which at least two inputs based on certain parameters or parameter features are used to determine a score for a given parameter as the inventors have realized that there can be other parameter features or metrics which have a bearing on determining a score for the given parameter since these other parameters features and the given parameter are in some way related to each other.

The different predictive models may be implemented using different structures or topologies including, but not limited to, a linear regression model, a binary logistic regression model, a multivariate regression model, a classifier, an artificial neural network, a convolutional neural network, classification trees, regression trees, support vector machines, random forests, ensemble learning algorithms (i.e. bagging and AdaBoost) and generalized boosted models. Some of the predictive models may also use adaptive regression splines, or alternatively a nonparametric regression that does not make assumptions about the underlying functional relationship between dependent and independent variables. Some of the predictive models may also be implemented using a generalized linear model with a logit or a generalized additive model with a logit link.

Machine or statistical learning algorithms can also be used to develop and implement the predictive models. Examples of machine learning or statistical learning algorithms that may be used include, but are not limited to, supervised learning, unsupervised learning and semi-supervised learning techniques.

The predictive engine 232 may combine predictive models into composite models. Ensembles of predictive models may be combined for a given learning algorithm amongst a plurality of learning algorithms in order to improve generalizability and robustness over a single estimator. In one embodiment, the predicted probability may be referred to as a composite quality score. Two such ensemble methods amongst a plurality of ensemble methods include Random Forests and Stochastic Gradient Boosting Trees.

In at least one embodiment, a deep learning model may be used to assemble a deep learning computational pipeline for mammography image processing that may incorporate both original medical image data, as well as determined features such as IQPFs to support continuous training, validation and refinement iterations. The deep learning computational pipeline may be a self-taught learning pipeline that exploits deep learning techniques to learn medical image quality parameter features, for mammography studies that do not have expert markings, and use the resulting features to enrich the training data used to build the deep neural network that models image quality.

Figure 51:
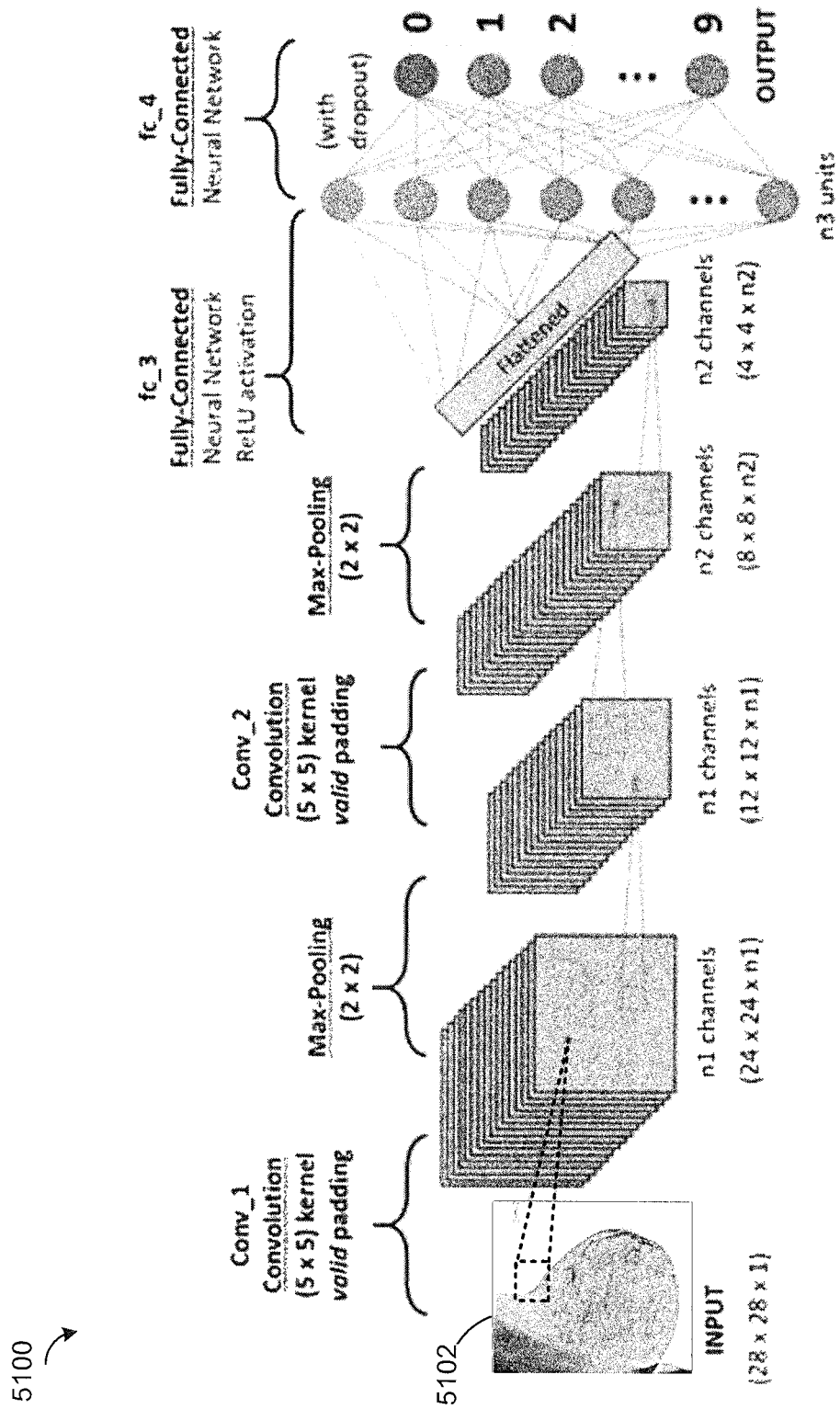
FIG. 51 shows an example predictive model that may be used by the medical image quality systems of FIGS. 1 and 43.

As another example, referring next to FIG. 51, there is shown an example embodiment of a predictive model 5100 which employs a Convolutional Neural Network (CNN). The CNN predictive model 5100 employs a Deep Learning algorithm which can take in an input image 5102, assign importance (learnable weights and biases) to various aspects/objects in the image and differentiate one from the other. The pre-processing required in the CNN predictive model 5100 may be lower as compared to other classification algorithms. For example, in some cases, filters are hand-engineered, whereas the CNN predictive model 5100, with sufficient training, may learn these filters/characteristics.

The architecture of the CNN predictive model 5100 may be analogous to that of the connectivity pattern of neurons in the human brain and inspired by the organization of the visual cortex. Individual neurons may respond to stimuli in a restricted region of the visual field known as the receptive field. A collection of such fields may overlap to cover the entire visual area.

The CNN predictive model 5100 may have several types of different layers, including a convolutional layer, a pooling layer, a ReLU layer, and/or a Fully connected layer. The CNN predictive model 5100 may have a plurality of e particular type of layer, or any combination of different types of layers.

A first convolutional layer (Conv_1) has parameters consisting of a set of learnable filters (or kernels), which have a small receptive field, but extend through the full depth of the input volume. During a forward pass, each filter in the convolutional layer is convolved across the width and height of the input volume (e.g. mammogram image) 5102, such that each of these filters compute the dot product between the entries of the filter and the input 5102 and produce a 2-dimensional activation map. As a result, the network learns weights for the filters that activate when it detects some specific type of feature at some spatial position in the input 5102. Although a 5×5 kernel size is shown in FIG. 51, other kernel sizes may be used for the filters in the first convolutional layer.

Stacking the activation maps for all of the filters along the depth dimension forms the full output volume of the first convolution layer (Conv_1). Every entry in the output volume can thus also be interpreted as an output of a neuron that looks at a small region in the input and shares parameters with neurons in the same activation map.

A pooling layer is a layer that is used for nonlinear down-sampling. There are several nonlinear functions that may be used to implement pooling among which max pooling (as shown in FIG. 51) is the most common. The max pooling function partitions its input into a set of non-overlapping rectangles (i.e. sub-regions) and, for each such sub-region, outputs the maximum.

Intuitively, the exact location of a feature is less important than its rough location relative to other features. This is the idea behind the use of pooling in convolutional neural networks. The pooling layer serves to progressively reduce the spatial size of the representation, to reduce the number of parameters, memory footprint and amount of computation in the network, and hence to also control overfitting. It is common to periodically insert a pooling layer between successive convolutional layers in a CNN architecture. The pooling operation provides another form of translation invariance.

A ReLU layer is a layer of rectified linear units, which may apply a non-saturating activation function $f(x)=\max(0, x)$. A ReLU effectively removes negative values from an activation map by setting them to zero. Accordingly, a ReLU increases the nonlinear properties of the decision function and of the overall network without affecting the receptive fields of the convolution layer.

Other functions may also be used instead of the ReLU to increase nonlinearity, for example the saturating hyperbolic tangent $f(x)=\tanh(x)$, and the sigmoid function $\sigma(x)=(1+e^{(-x)})^{(-1)}$. The ReLU may be preferred to other functions because it trains the neural network several times faster without a significant penalty to generalization accuracy. The ReLU may be added as an activation function for convolutional or fully connected layers.

A fully connected layer is layer that can be used for high-level reasoning in the CNN and may be implemented using fully connected layers. Neurons in a fully connected layer have connections to all activations in the previous layer, as seen in regular (e.g. non-convolutional) artificial neural networks. Their activations can thus be computed as an affine transformation, with matrix multiplication followed by a bias offset (e.g. vector addition of a learned or fixed bias term).

In one example embodiment, the CNN predictive model 5100 has the layers shown in Table 4 and incorporates one or more IQPFs that can be based on DICOM metadata (e.g. age, breast thickness, etc.—See Table 3), anatomical measurements (e.g. breast area, breast volume, exaggeration ratio etc.—See Table 3) and values from other IQPFs (see Table 3) as another input layer just before the fully connected layer of the network. Table 4 (below) shows the network structure that incorporates IQPFs as well as images. Accordingly, the example CNN predictive model includes in successive fashion a first convolutional layer, a Max Pooling layer, a second convolutional layer, a second Max Pooling layer, a third convolutional layer, a third Max Pooling layer, a flatten layer, two fully connected layers, an input layer and a final fully connected layer. The flatten layer is used to transform a two-dimensional matrix of features into a vector that can passed forward to the fully connected layer. The mammographic images are fed to the network's first convolutional layer, and one or more IQFs and/or metadata are provided to the input layer. The features that are provided to the input layer minimally include acquisition parameters that play a role in how effectively a technologist is able to position a patient for imaging. For example, in the context of a mammography exam, these image acquisition parameters may include patient age, breast volume, compression pressure and breast thickness, as a set of parameters from the plurality of parameters that relate to factors affecting the ability to acquire a good quality image. Other features that may be provided to the input layer may include anatomical measurements from the image that relate directly to positioning of the organ being imaged, for example the breast. The measures presented in Table 3 and in FIGS. 28-35 and 47A to 50B represent a set of anatomical measures and features from a plurality of such features that individually and in combination characterize poor patient positioning may be provided as features to the input layer. The actual features that may be used by the CNN predictive model 5100 may be determined through training.

The probability of at least one of the Image Quality Score (IQS), SQS, IQPS and SQPSs may be calculated from the last fully connected layer. The network structure of the CNN predictive model 5100 allows for features to be extracted from the images and used (e.g. combined with hand crafted features) to learn different quality metrics from the dataset. The particular network structure shown in Table 4 is just one of many different structures that can be used for this purpose. Every single parameter of the CNN network such as the number of layers, the filter sizes, the number of filters, and the activation functions can be varied in different embodiments as well as hyperparameters such as learning rate, optimization algorithms, and batch size, for example in order to achieve an acceptable prediction accuracy.

TABLE 4

Example CNN embodiment for image quality prediction

| Layer type | Num Filters | Filter size | Activation | Input shape |
|---|---|---|---|---|
| Convolutional | 16 | (3, 3) | ReLU | (256, 256, 1) |
| MaxPooling |  | (2, 2) |  | (256, 256, 16) |
| Convolutional | 32 | (3, 3) | ReLU | (128, 128, 16) |
| MaxPooling |  | (2, 2) |  | (128, 128, 32) |
| Convolutional | 64 | (3, 3) | ReLU | (64, 64, 32) |
| MaxPooling |  | (2, 2) |  | (64, 64, 64) |
| Flatten |  |  |  | (32, 32, 64) |
| Fully connected |  | 256 | ReLU | (65536, 1) |
| Fully connected |  | 10 | ReLU | (256, 1) |
| Input Layer Features |  |  |  | (4, 1) |
| Fully connected |  | 1 | sigmoid | (14, 1) |

The CNN predictive model 5100, using the topology specified in Table 4, may be trained for different quality metrics such as at least one of CC exaggeration, CC and MLO portion cut off, sagging, skin folds, as well as the remaining quality metrics that are described herein. For example, in one test, training was performed on ECR 2019 data which included about 750 images that were marked by 15 reviewers for each quality metric described herein. The majority consensus of those markings were considered as the training data. The training was done such that various parameters for the CNN predictive model 5100 were found so that the prediction accuracy resulted in ROC curves with an Area Under the Curve (AUC) as close as possible to 100%. For example, FIGS. 52A and 52B show the ROC and precision-recall curves, respectively, for the CC exaggeration metric. The AUC shown for the model indicates that the model is able to almost perfectly predict the CC exaggeration error.

Breast density is a factor that affects image quality, particular in very dense breasts and can cause a lack of sharpness of the image. Using a topology presented in Table 6, a CNN-based breast density classifier may be trained to predict breast density categories aligned with the ACR BI-RADS® 5$^{th}$ ed. Atlas density scale, which is one example of a density scale that can be used amongst a plurality of density scales. For this example embodiment, the final input layer to the breast density CNN includes percent mammographic density, mean blob size, compactness, and the smallest convex hull that encompasses all the dense tissue. These features are chosen as inputs to the final input layer since the inventors have determined that they reflect aspects of the appearance of the mammographic density that impact on the way that radiologists apply the ACR BI-RADS® 5$^{th}$ ed. Atlas density scale to evaluate mammograms. These parameters, other than the image itself and the density value, are indicators of the dispersion pattern of dense breast tissue. These features can be determined from a thresholded binary image, e.g. a bright dense tissue objects on a dark background, by using the density value. The compactness may be defined as the area of all a polygon to enclose all dense breast tissue. The mean blob size is the average size in pixels of all of the dense tissue objects. However, it should be noted that in alternative embodiments, there will be other parameters that can be fed into the CNN that also reflect aspects of the appearance of the mammographic density that impact on the way that radiologists apply the ACR BI-RADS® 5$^{th}$ ed. Atlas density scale to evaluate mammograms. For example, texture indicators for the input image, pattern indicators for the input image and/or pixel intensities for the input image may be used.

However, a two-stage process may be used to develop the CNN breast density classifier with the first stage depending on using a percent mammographic density CNN, which generates a percent mammographic density value that is then included in the final input layer of the breast density CNN classifier.

TABLE 5

Example Percent breast density CNN embodiment

| Layer type | Num Filters | Filter size | Activation | Input shape |
|---|---|---|---|---|
| Convolutional | 16 | (3, 3) | ReLU | (256, 256, 1) |
| MaxPooling |  | (2, 2) |  |  |
| Convolutional | 32 | (3, 3) | ReLU | (128, 128, 16) |
| MaxPooling |  | (2, 2) |  |  |
| Convolutional | 64 | (3, 3) | ReLU | (64, 64, 32) |
| Convolutional | 128 | (3, 3) | ReLU | (64, 64, 64) |
| Flatten |  |  |  | (64, 64, 128) |
| Fully connected |  | 256 | ReLU | (524288, 1) |
| Fully connected |  | 10 | ReLU | (256, 1) |
| Fully connected |  | 1 | output | (10, 1) |

TABLE 6

Example breast density CNN classifier embodiment

| Layer type | Num Filters | Filter size | Activation | Input shape |
|---|---|---|---|---|
| Convolutional | 16 | (3, 3) | ReLU | (256, 256, 1) |
| MaxPooling |  | (2, 2) |  | (256, 256, 16) |
| Convolutional | 32 | (3, 3) | ReLU | (128, 128, 16) |
| MaxPooling |  | (2, 2) |  | (128, 128, 32) |
| Convolutional | 64 | (3, 3) | ReLU | (64, 64, 32) |
| MaxPooling |  | (2, 2) |  | (64, 64, 64) |
| Convolutional | 128 | (3, 3) | ReLU | (32, 32, 64) |
| MaxPooling |  | (2, 2) |  | (32, 32, 128) |
| Flatten |  |  |  | (16, 16, 128) |
| Fully connected |  | 256 | ReLU | (32768, 1) |
| Fully connected |  | 100 | ReLU | (256, 1) |
| Fully connected |  | 10 | ReLU | (10, 1) |
| Input Layer Features |  |  |  | (4, 1) |
| Fully connected |  | 10 | ReLU | (14, 1) |
| Fully connected |  | 4 | Softmax | Output class |

Accordingly, in one aspect, a method for determining a breast density classification from a digital mammogram may be performed by: receiving an input image corresponding to the digital mammogram; preprocessing the input image to obtain a preprocessed image; performing measurements on the preprocessed image to obtain values for features; providing the input image to a first convolutional layer of a first Convolutional Neural Network (CNN) that generates a percent breast density value; providing the percent breast density value and values of the features to an input layer that is before a final fully connected layer of a second CNN for generating a breast density classification.

The values for the features may be determined from indicators of at least one of a dispersion pattern of dense breast tissue in the input image, texture indicators for the input image, pattern indicators for the input image and pixel intensities for the input image. For example, the method may comprise determining mean blob size, compactness, and a smallest convex hull that encompasses all dense tissue in the digital mammogram as the values of the features that are provided to the input layer.

As an example, in one test, training was performed on data which included more than 5,000 images that were labelled by as many as 15 reviewers for percent mammographic density and according to the ACR BI-RADS® $5^{th}$ ed. Atlas density scale categories of A, B, C, D (described in U.S. Pat. No. 9,895,121 which is hereby incorporated in its entirety). The mean of the percent mammographic density markings on each image was used as the consensus assessment and considered as the training data for a percent breast density CNN (e.g. having a similar structure as shown in Table 5), and the majority consensus of the ACR BI-RADS® $5^{th}$ ed. Atlas density scale markings were considered as the training data for a density grade CNN classifier (e.g. having a similar structure as shown in Table 6). The training was done such that various parameters for the percent breast density CNN predictive model and the density grade CNN classifier were identified such that the prediction accuracy measured by the Intraclass Correlation Coefficient (ICC) (for the percent mammographic density CNN) and by the Kappa Statistic (for the CNN classifier) was as near to the maximum value of 1.0 as achievable for the area under the curve for an ROC. For example, FIG. 52C shows the scatterplot, for the percent mammographic density metric. The ICC of 0.956 for the percent breast density CNN indicates almost perfect agreement with the consensus of expert radiologists. The Kappa Statistic of 0.86 shows that the density scale CNN classifier has excellent agreement with the consensus of expert radiologists.

As was explained for the image quality CNN predictive model 5100, different CNN structures may be used as every single parameter of the percent breast density CNN and the density scale CNN classifier may be varied such as the number of layers, the filter sizes, the number of filters, and the activation functions in different embodiments as well as hyperparameters such as learning rate, optimization algorithms, and batch size, for example in order to achieve an acceptable prediction accuracy.

For both the image quality and breast density CNN predictive models, data augmentation may be used to improve the CNN's ability to differentiate signal from noise in the image. Data augmentation includes the creation of altered copies of each instance within a training dataset. For example when image data is provided to a neural network, there are some features of the images that the neural network may condense or summarize into a set of numbers or weights. In the case of image classification, these features or signals are the pixels which make up the object in the picture. On the other hand, there are features of the images that the neural network should not incorporate in its summary of the images (i.e. the summary is the set of weights). In the case of image classification, these features or noise are the pixels which form the background in the picture. One way of ensuring that the neural network can differentiate signal from noise is to create multiple alterations of each image, where the signal or the object in the picture is kept invariant, whilst the noise or the background is distorted. These distortions include cropping, scaling, translating, flipping and rotating the image, and elastic deformation, among others to improve the learning of the CNN. For example, images may be randomly flipped horizontally. They are also randomly translated by shifting images 10 percent of the image width and height. As another example, images may be rotated randomly between zero degrees to 90 degrees.

In addition, in order to reduce over-fitting in the training of the CNN, regularization may be applied. Overfitting happens when a CNN model is biased to one type of dataset. Accordingly, regularization may be done to improve the generalizability of the CNN beyond the data that it was trained on, and is achieved by generating a simpler less complex neural network which has the effect of reducing over-fitting of the CNN. Regularization techniques may include, but are not limited to, the L2 and dropout methods. Both the L2 and dropout methods are designed to reduce the size of, and simplify the CNN, with the result that the CNN is smaller, less complex and more generalizable.

It should be recalled that in deep learning, it is desired to minimize the following cost function:

$$J(w, b) = \frac{1}{m}\sum_{i=1}^{m} L(\hat{y}_i, y_i) \quad (1)$$

where L can be any loss function (such as the cross-entropy loss function). Now, for L2 regularization a component can be added that will penalize large weights. Therefore, the equation (1) becomes equation (2):

$$J(w, b) = \frac{1}{m}\sum_{i=1}^{m} L(\hat{y}_i, y_i) + \lambda\|w\|_2^2 \quad (2)$$

where lambda is the regularization parameter. Now, $\lambda$ is a parameter than can be tuned. Larger weight values will be more penalized if the value of $\lambda$ is large. Similarly, for a smaller value of $\lambda$, the regularization effect is smaller. This makes sense, because the cost function must be minimized. By adding the squared norm of the weight matrix and multiplying it by the regularization parameters, large weights will be driven down in order to minimize the cost function.

Regularization works because, as aforementioned, adding the regularization component will drive the values of the weight matrix down. This will effectively decorrelate the neural network. Recall that the activation function with may be provided with the following weighted sum: z=wx+b. By reducing the values in the weight matrix, z will also be reduced, which in turn decreases the effect of the activation function. Therefore, a less complex function will be fit to the data, effectively reducing overfitting.

Dropout involves iterating over all the layers in a neural network and setting the probability of retaining certain nodes or not. The input layer and the output layer are kept the same. The probability of keeping each node is set at random and only a threshold value is determined which is used to determine if a node is kept or not. For example, if the threshold is set to 0.7, then there is a probability of 30% that a node will be removed from the network. Therefore, this will result in a much smaller and simpler neural network.

Dropout means that the neural network cannot rely on any input node, since each have a random probability of being removed. Therefore, the neural network will be reluctant to give high weights to certain features, because certain nodes may disappear when dropout is performed. Consequently, the weights are spread across all features, making them smaller. This effectively shrinks the CNN model and regularizes it.

Figure 12:
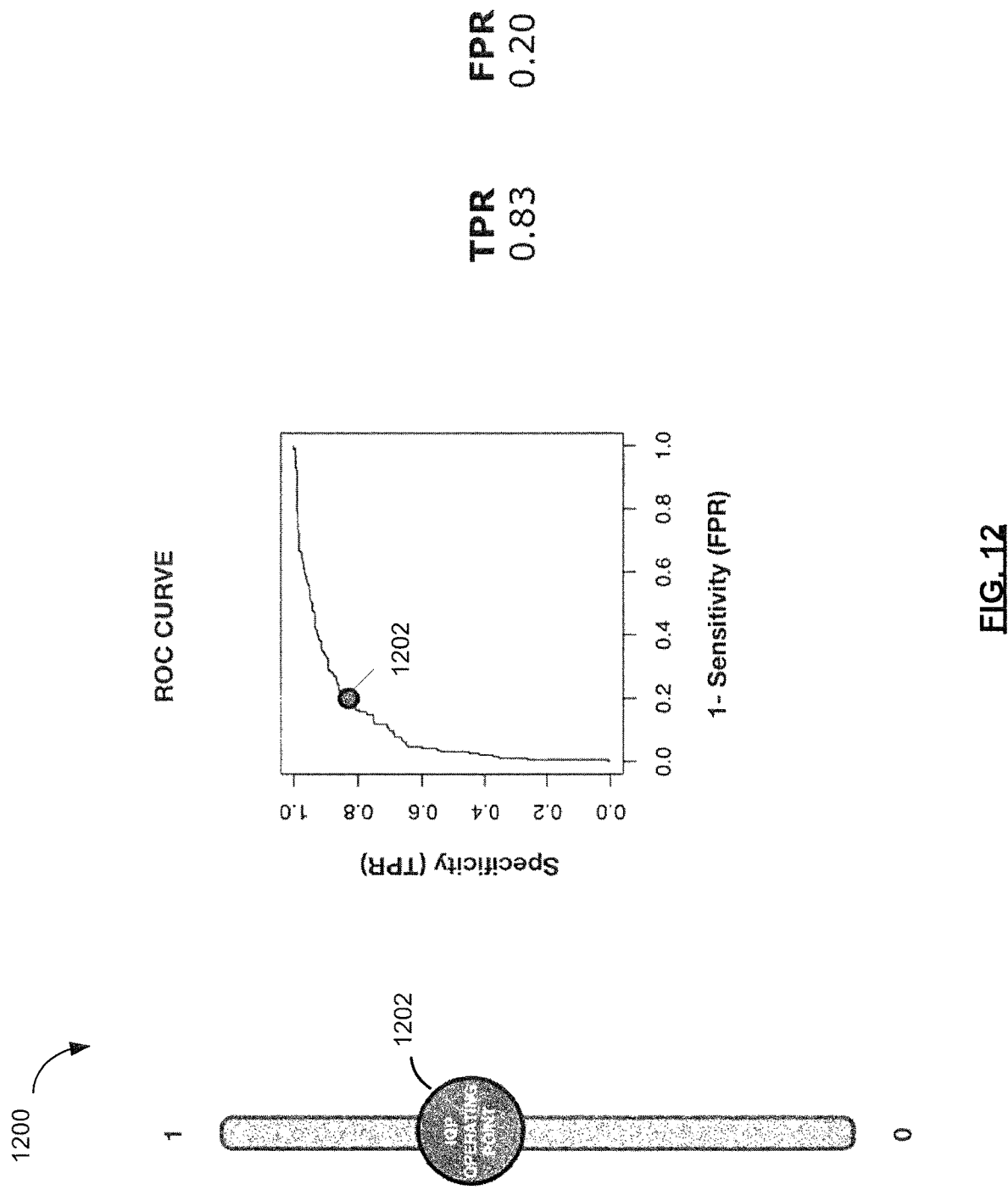
FIG. 12 shows an example embodiment of another user interface that may be used by the medical image quality system of FIGS. 1 and 43.

Referring back to FIG. 2, the memory unit 218 stores software instructions for an operating system 220, program code 222, an input module 224, a plurality of predictive models 226, output module 228 and databases 230. In addition for each predictive model 226, the corresponding ROC curves that shows the prediction accuracy of the predictive model 226 is stored. This may be done by storing lookup tables that includes data for each ROC curve where each row of the look up table includes 3 values: an operating point, a corresponding True Positive Rate (TPR) and a corresponding False Positive Rate (FPR). The operating point is a point on the ROC curve, the corresponding TPR is the y coordinate of the operating point and the FPR is the x coordinate of the operating point. An example of this is shown in FIG. 12 where for the particular ROC curve that is shown, the operating point 1202 and the corresponding TPR of 0.83 and FPR of 0.2 is shown. Therefore, each lookup table includes a plurality of rows that each have a different operating point and the corresponding TPR and FPR for the predictive model 226 that the lookup table is associated with.

The programs 222 comprise program code that, when executed, configures the processor unit 204 to operate in a particular manner to implement various functions and tools for the medical image quality system 200.

The input module 224 may provide functionality integrating the medical image quality system 200 with the PACS via network unit 214. The input module 224 may provide for the parsing of the medical image and the parsing of the plurality of image metadata. The input module 224 may provide an API for image data and image metadata to be acquired for assessment. Such an assessment includes determining a plurality of predicted image/study quality parameter scores, an overall image/study score, and/or an image/study index. The input module 224 may prepare data inputs for the predictive engine 232 that are then applied to one or more of the plurality of predictive models 226. The input module 224 may store input in a database 230. The pre-processing performed by the input module 224 may generate various IQPFs, examples of which are listed in Table 3. It is understood that the IQPFs in Table 3 are examples, and there may be many more than the ones listed. The input module 224 may perform pre-processing of medical image data, as further described in relation to FIG. 13. The pre-processing performed by the input module 224 may generate various study quality parameter features (SQPFs), examples of which are listed in Table 2. It is understood that the SQPFs in Table 2 are examples, and there may be many more than the ones listed.

The plurality of predictive models 226 that are used to generate predictive scores for IQPs may each operate on a plurality of image quality parameter scores, and a plurality of image quality parameter features. As mentioned previously IQPF represents a measurement of some aspect of the image that is directly or indirectly related to an IQP. Likewise, some of the plurality of predictive models 226 that are used to generate predictive scores for SQPs may each operate on a plurality of study quality parameter scores, and a plurality of study quality parameter features. A study quality parameter feature (SQPF) represents a measurement of some aspect of the images in a study which affects the overall study quality. The IQPFs and SQPFs may be determined and stored in a database, or in another data structure. IQPFs and SQPFs generally do not encode any patient identifying information, and in most instances may be collected and used to develop improvements without the risk of compromising patient information.

Each predictive model has been generated to provide a predictive score for a particular IQP or a particular Study Quality Parameter (SQP) based on a plurality of parameter features, parameter scores, possibly image metadata (which may be optional for certain models), and possibly patient non-image data (which may be optional for certain models) represented by input data x1, x2, . . . , xn, that have been found to be related to the particular IQP/SQP according to some function f(x1, x2, . . . , xn). This process is described in further detail below with respect to FIG. 5. The predictive score(s) are then used as inputs by one of the predictive models which employs a multivariate structure to model f(x1, x2, . . . , xn) and determines the predicted probability for that particular IQPS or SQPS. An IQPS/SQPS represents the probability of a non-compliant condition existing in an image/study that is being assessed. For example, the IQP "CC exaggeration" can be determined by the function y=f (x1, x2, . . . , xk) where y is the predicted probability of the presence of "CC exaggeration" in an image that is being assessed. An example of image quality parameters and study quality parameters are listed in Table 1.

The plurality of the IQPSs or SQPs that are determined for an image or a study can then be used as inputs into another selected predictive model 226 that determines an overall IQS or overall Study quality score (SQS).

TABLE 1

Some Example Image/Study Quality Parameters (IQPs/SQPs)

| IQP | Description | Apply to |
|---|---|---|
| CC Exaggeration | Nipple is not in midline of the imaged breast | Image |
| Portion Cut-off | Parts of the breast cut off by the edge of the image | Image |
| Portion Cut-off overall | Parts of the breast cut off by the edge of the image not visible in any of multiple repeated views. | Study |
| Skin Folds | Skin folds visible | Image |
| Posterior Nipple Line | Distance from nipple to pec. muscle along a line perpendicular to pec muscle, are not < 1 cm of each other, when measured in CC and MLO views | Study |
| Posterior Tissues Missing | Posterior breast tissue is not imaged | Image |
| Posterior Tissues Missing Overall | Posterior breast tissue not visible in either CC or MLO view of the breast | Study |
| Inadequate IMF | Inframammary fold not clearly seen or not imaged | Image |
| Pectoralis Muscle Concave | Shape of the pectoralis muscle in the MLO view is not straight or convex | Image |
| MLO Sagging | Breast orientation exhibits sagging in MLO view | Image |
| MLO too high on IR | Breast is positioned too high on Image Receptor | Image |

Output module 228 may parse the result of the predictive engine 232, and may output at least one of the IQPs, SQPs, overall image quality score, overall study quality score, a Study Quality Parameter index (SQPI), a Study Quality index (SQI) and a predicted image or study class via an API. The output module 228 may store the outputs in the database 230.

The output module 228 may further be used to index the image quality parameter scores, and index the image quality scores into a discrete, continuous, or ordinal scale based on applying an operating point to the ROC curve that corresponds to the model used to determine the predicted value. It is understood that indexing may also be referred to herein as mapping or thresholding.

The indexed image quality parameter scores may be used as inputs by the predictive engine 232 to determine the image quality score using an overall predictive model that is selected from the plurality of predictive models 226. The image quality parameter indices (IQPs) may be mappings from image quality parameter scores to discrete, categorical or ordinal scales. This may function by comparing the predicted probability score to a known operating point. Generally, the known operating point will define an operating point that selects a value of the predicted probability forming a threshold between two different indexed outcomes.

The overall image quality score may be indexed by the output module 228 using the IQI. The overall predicted image quality score may be a gestalt measure, and may use as inputs the IQPFs and the IQPSs. This IQI is a mapping from the overall predicted image quality score to a discrete, categorical or ordinal scale. The indexing may be performed based on statistical regression or machine learning using supervised or unsupervised approaches. The indexed image quality parameter scores and image quality scores may provide concrete decision points for a user. For example, the MRT may decide to perform a mammographic image collection a second time to resolve non-conforming conditions based on indexed image quality parameter scores. The indexed output may be expressed, for example, as pass/fail classifications of the image quality for an image. Similarly, the indexing may be for non-binary classifications, such as "perfect", "good", "moderate" and "inadequate". A user may affect the way that these classifications are determined by selecting an operating point that yields an acceptable true positive rate (TPR) and an acceptable false positive rate (FPR) from the ROC curve (as explained in FIGS. 11-12) that is associated with the predictive model that was used to generate the score which was indexed.

There may be two approaches to indexing (or mapping). The first such approach may be, as described above, determining an operating point for the predicted image quality parameter score and then indexing or mapping based on the predicted probability and the operating point. The second such approach may be through the use of regression models, statistical learning or machine learning to develop a classifier. The predictive engine may provide the IQPFs as input to a classifier, and instead of generating a predicted probability, the classifier may determine the classification directly.

An overall study quality score can be derived from a model that takes as inputs, IQPFs, IQPFs, IQPs, SQPFs, SQPSs, and SQPFs. The gestalt (or overall) study quality score may be indexed to provide a study quality index. The study quality score may reflect the predicted probability of non-conformity for the plurality of images in the study, a minimum of the IQPs for the plurality of images in the study, a maximum of the IQPs for the plurality of images in the study, or another statistical summary measure of the underlying IQPs of the images that are part of the study.

The databases 230 may store a plurality of historical medical images, a plurality of image metadata, the plurality of predictive models 226, each predictive model defined to use a plurality of image quality parameter features, and inputs from the input module 224 and outputs from the output module 228. The determined features can later be provided if a user is visually assessing a medical image and they want to see a particular feature, such as the PNL length measurement, for example. The databases 230 may also store the various scores and indices that may be generated during assessment of at least one medical image and/or at least one study. All of this data can be used for continuous training. Also, if features are stored, then updated predictive models (from continuous or periodic training activities) may be applied to existing features without the need to recompute the features themselves, which is advantageous since feature computation is typically the most computationally intensive component.

Figure 3:
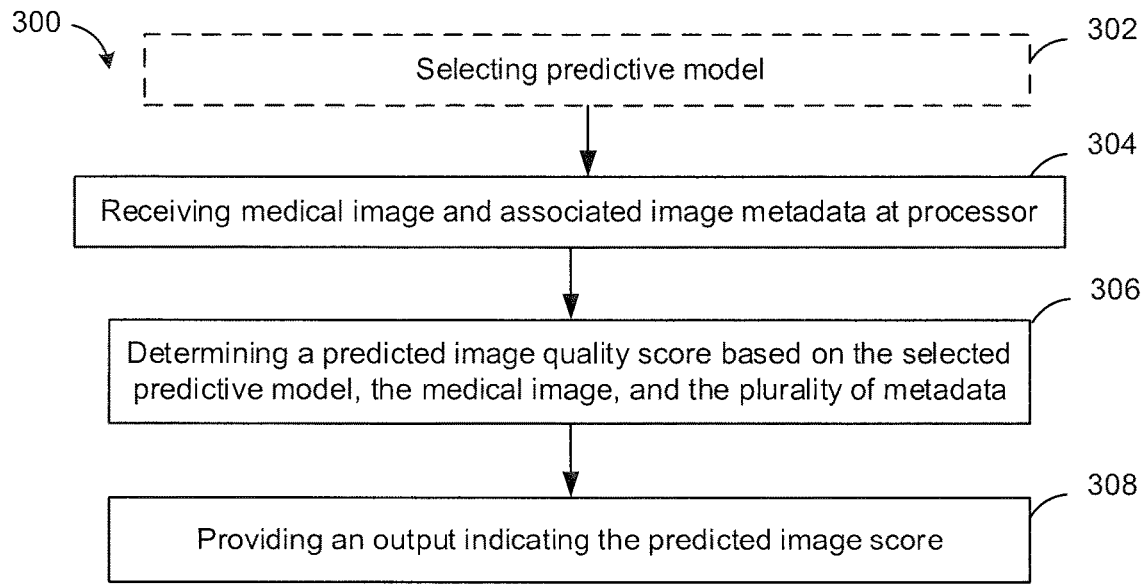
FIG. 3 is an example embodiment of a medical image quality determination method that may be used by a medical image quality system of FIG. 1.

Referring now to FIG. 3, shown therein is an example embodiment of a method 300 of determining medical image quality. The method 300 may be performed by a processor of the processor unit 204 in FIG. 2. Referring back to FIG. 3, at act 302, a predictive model is selected from one or more of the predictive models stored on the database 230 where the predictive model has been created to provide the image quality score that is to be predicted to indicate medical image quality.

At act 304, the processor receives the medical image along with an associated plurality of image metadata. The input module 224 parses the medical image and associated plurality of image metadata to determine a plurality of image quality parameter features. In the various examples shown herein, the medical image is a "for presentation" digital mammographic image. However, it should be understand that the teachings herein, including the other methods described below, may be applied to "raw" or "for processing" digital mammographic images.

At act 306, a predicted image quality score is determined by providing the selected predictive model with inputs based on: (a) one or more of the medical image, (b) one or more image quality parameter features that are derived from the medical image, (c) possibly (i.e. optionally) one or more data values from the plurality of metadata and (d) possibly (i.e. optionally) one or more patient-specific clinical factors, where the word optionally means that the predictive model that predicts the image quality score may or may not use these inputs as it depends on the variables used for the particular image quality score that is being predicted. The image quality score may be a numeric value. For example, the image quality score may be a decimal number between 0 and 1. Alternatively, the image quality score may be mapped to a scale that is ordinal, continuous or discrete. For example, the image quality score may be represented as "Perfect", "Good", "Moderate", or "Inadequate". In another alternative, the image quality score may be a predicted probability corresponding to a predicted overall image quality evaluation. In yet another alternative, the image quality score may be mapped to an indexed value determined based on an operating point of an ROC curve for the selected predictive model.

At act 308, an output is produced indicating the predicted image quality score. The output can be displayed on a graphical user interface which is used to view the image. Examples of such graphical user interfaces are provided below.

Figure 4:
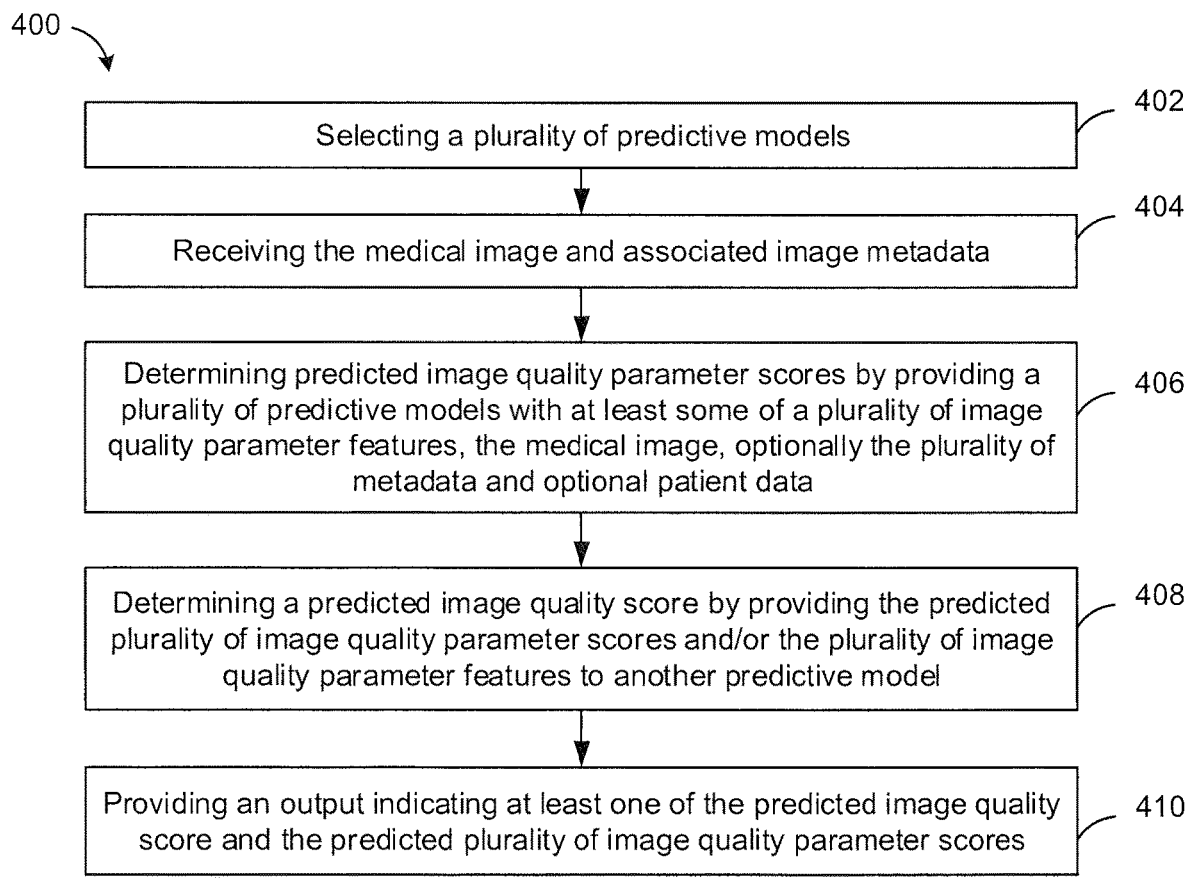
FIG. 4 is another example embodiment of a medical image quality determination method that may be used by a medical image quality system of FIGS. 1 and 43.

Referring now to FIG. 4, shown therein is an example embodiment of a method 400 for determining a predicted image quality score corresponding to an image quality. The method 400 may be performed by a processor of the processor unit 204 in FIG. 2.

At act 402, several predictive models are selected from the plurality of predictive models and the selected predictive models use at least one image quality parameter feature as an input to determine corresponding image quality parameter scores. Another predictive model is selected to determine the image quality score using the image quality parameter scores and/or the image quality parameter features. The selected predictive models are obtained from the database 230, or may be obtained from another memory device A given selected predictive model is created using input variables that were found to provide sufficiently accurate predictions for the output variables during model development. Alternatively, there may be cases in which the image quality score is determined directly using a plurality of image quality parameter features as inputs. In this case, a single predictive model is used.

At act 404, a medical image is received at the processor and the medical image is associated with a plurality of image metadata. The plurality of image metadata may be DICOM metadata, or other data in other formats as explained previously. The medical image may be preprocessed to determine a plurality of image quality parameter features. For example, the image quality parameter features may be one or more of the features listed in Table 3. The study may be preprocessed to determine a plurality of study quality parameter features. For example, the study quality parameter features may be one or more of the features listed in Table 2.

At act 406, at least one predicted image quality parameter score may be determined from the medical image. Each image quality parameter score may correspond to a predicted probability of the presence of the condition identified by the corresponding image quality parameter. A given image quality parameter score is determined using a predictive model that corresponds to the given image quality parameter score and uses certain image quality parameter features determined from the medical image and optionally, the plurality of metadata associated with the medical image and optionally patient data for the patient from which the medical image was acquired.

The predicted image quality parameter score may be indexed (or mapped) according to an image quality parameter index. This index may be continuous, categorical, or ordinal. For example, a particular parameter 'posterior tissues missing cc' may have a predicted numerical value that is between 0 and 100. Indexing of the score for the parameter 'posterior tissues missing cc' may produce an indexed prediction of "Bad" for a range 90-100, "Acceptable" for a range of 50-90, "Good" for the range of 20-50 and "Great" for the range of 0 to 20. This is just one example of the indexing that may be done. Alternatively, the indexing of a binary parameter, for example, "pass" and "fail" may be accomplished using an operating point. The operating point may be user configurable, as is discussed with respect to FIG. 12.

At act 408, the predicted image quality score may be determined from one or more predicted image quality parameter scores, and one or more image quality parameter features that are provided as inputs to another predictive model, which is referred to as an "overall predictive model" or an "image quality predictive model", that was selected from the plurality of predictive models. This determining act may optionally involve indexing or mapping the IQS based on an operating point that may be selected by a user where the operating point is a point on the ROC curve that corresponds to the selected image quality predictive model and then assigning a discrete value based on the comparison. For example, an operating point of 0.3 may map IQS values of less than or equal to 0.3 to 'Fail' or 'No' and values of greater than 0.3 to 'Pass' or 'Yes'. The operating point may be user configurable.

At act 410, at least one of the predicted image quality score and the plurality of image quality parameter scores are output. The output can be displayed on a graphical user interface which is used to view the image. Examples of such graphical user interfaces are provided below.

In at least one embodiment, two or more medical images may be received at the processor unit 204, and acts 302-308 and/or acts 402-410 may be repeated for the second image. The two or more medical images may be of the same view or laterality, and may be displayed concurrently using an image check interface shown in FIG. 37. The concurrent display may include a combined output in the user interface showing image quality feature parameters and/or image quality parameter scores, image quality scores, or other determined data associated with the two or more medical images.

Figure 40:
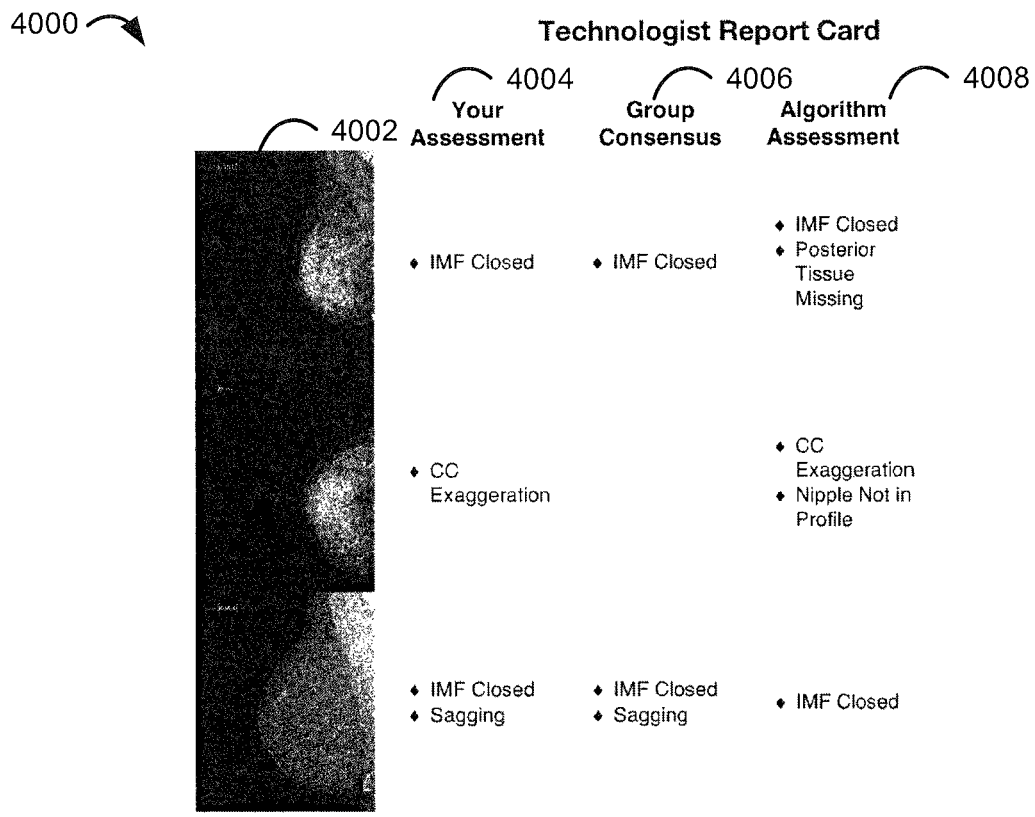
Figure 41:
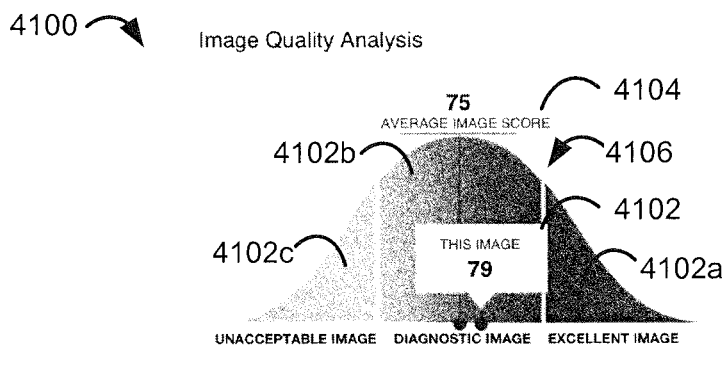

In at least one embodiment, two or more medical images may be received at the processor unit 204, and acts 302-308 and/or acts 402-410 may be repeated for the second image. The two or more medical images, and associated image quality feature parameters and/or image quality parameter scores, image quality scores, or other determined data associated with the two or more medical images may be used to determine a report card interface as shown in FIGS. 38, 39, and 40. The report card interface may further include a graph indicating the relative quality of the medical image based on a measure of other medical images, such as shown in FIG. 41.

Figure 36:
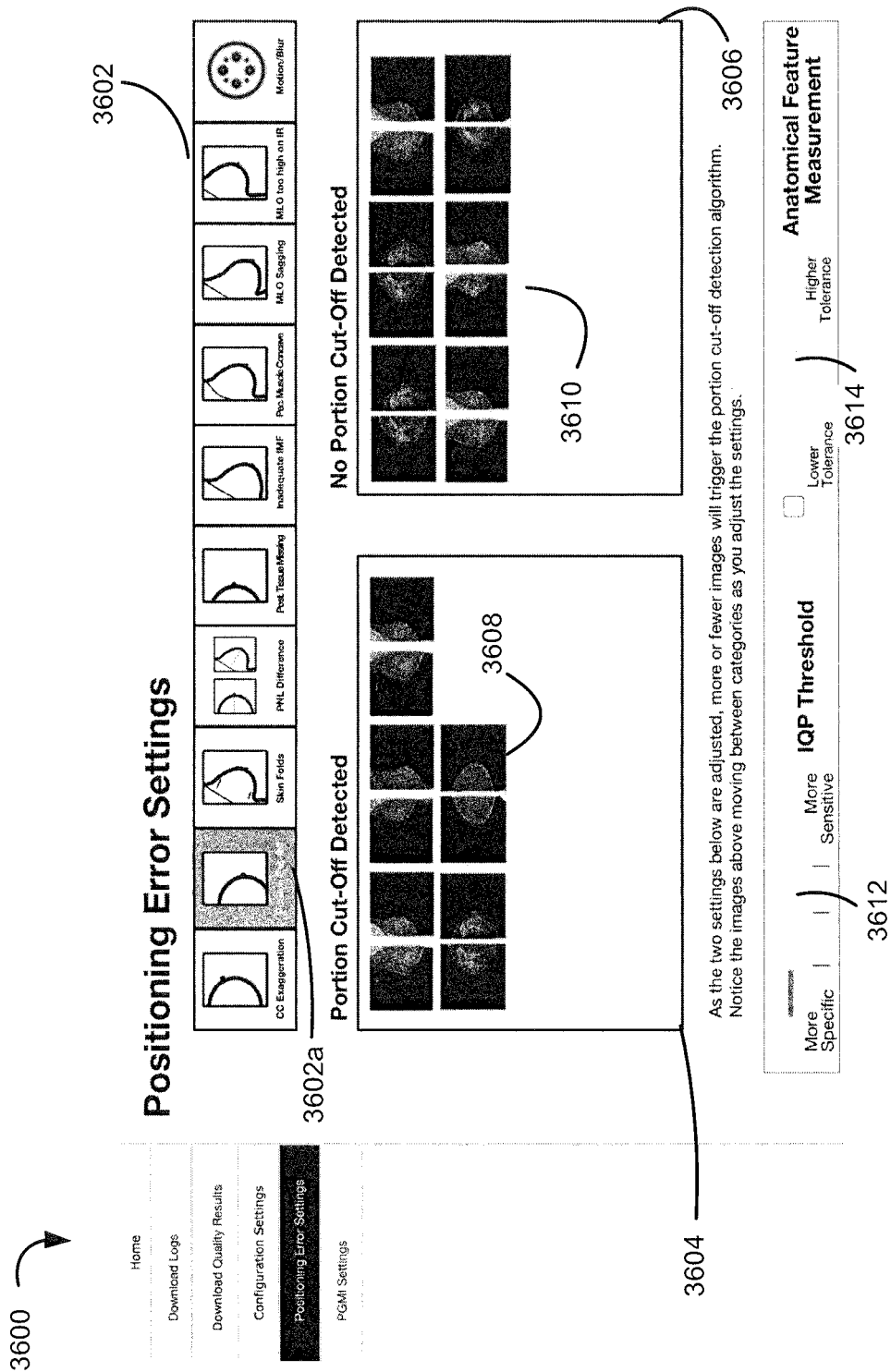

In at least one embodiment, a user configurable operating point of an ROC curve may be displayed for a user, and the user may enter a user input corresponding to an adjusted operating point. The embodiment may further include an interface with two or more medical images, and the adjustment of the operating point may adjust the display of the two or more medical images into a positive set which has images that are predicted to have a particular image quality feature, and a negative set which has images that are predicted not to have a particular image quality feature, as shown in FIG. 36.

In at least one embodiment, one or more configurable predicted image quality parameter feature thresholds may be shown on a user interface, and may be adjusted by the user based on user input. The embodiment may further include an interface with two or more medical images, and the adjustment of the configurable predicted image quality parameter feature thresholds may adjust the display of the two or more medical images into a positive set where an image is predicted to have a particular image quality feature, and a negative set where an image is predicted not to have a particular image quality feature, as shown in FIG. 36.

Figure 5:
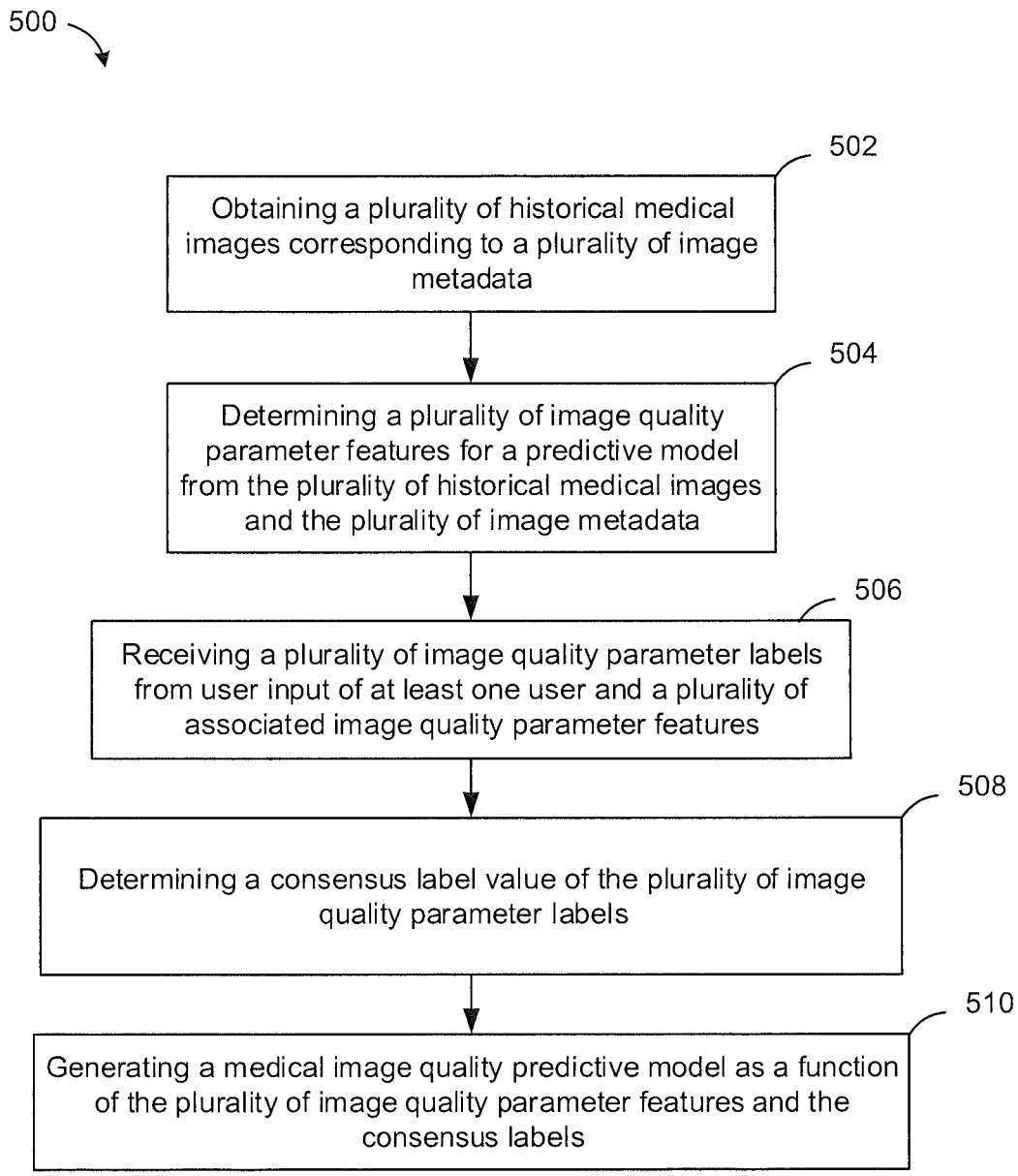
FIG. 5 is an example embodiment of a method for determining a predictive model that may be used by the medical image quality system of FIGS. 1 and 43.

Referring now to FIG. 5, shown therein is an example embodiment of a method 500 for generating (i.e. training) a predictive model for determining a predicted IQPS. At act 502, a plurality of historical medical images are obtained along with a plurality of image metadata that is associated with the medical images, and a plurality of patient-specific clinical factors. The plurality of image metadata corresponding to the plurality of historical medical images may include patient data, device data, institution data and MRT data. The historical medical images may be stored in the database 230, or on a file system of the PACS 104.

At act 504, a plurality of image quality parameter features is determined from the plurality of historical medical images and, in some cases the plurality of image metadata depending on the image quality parameter feature. The image quality parameter features and the plurality of historical medical images in addition to the plurality of patient-specific clinical factors may be referred to as a training data set. The image quality parameter features of the training data set may be automatically determined from an image analysis of a particular mammographic image. Examples of these image quality parameter features are listed in Table 2. Each image quality parameter feature is a measurable property or characteristic of the mammographic image, from the image metadata or from both the image metadata and the mammographic image that has been observed. The image quality parameter features are generally numeric in nature, but may also be associated with an indexed scale such a 'Perfect', 'Good', 'Moderate', or 'Inacceptable' as was explained previous with respect to the method 400.

At act 506, a plurality of image quality parameter labels may be received from at least one user. For example, each of the labels may correspond to an input submitted by each different user in a plurality of users. The inputs may generally be numeric in nature, but may also be associated with an indexed scale such a 'Perfect', 'Good', 'Moderate', or 'Inadequate'.

At act 508, a consensus label is determined from the plurality of image quality parameter inputs. This consensus may be mathematically determined, for example by using the mean, median, mode, max, min, or majority vote of the plurality of image quality parameter labels.

At act 510, a predictive model is generated in which a function is determined using the plurality of image quality parameter features so that the difference between the output of the function and the consensus input label is minimized. As described previously, the inventors have determined that the parameter of quality for which a score is being generated by the predictive model is related to certain features that have been derived from the medical images and for some features the image metadata since these features have a certain relationship in terms of what they measure on the medical image. Additionally, the inventors have determined that image/study quality is also related to patient-specific factors. The inventors have determined that the image quality parameter features, image metadata, and patient-specific factors are generally inter-related and interact in terms of their impact on the ability to acquire a conformant image. The determined function may be a multivariate parametric or non-parametric regression function, a deep learning model, a machine learning or statistical learning model, or any combination thereof.

This process involves determining which features should be used as inputs by the function to get the most accurate predicted value. This may be determined by generating different predictive models, applying them to the same training data, generating a ROC for each predictive model and then selecting the predictive model that has the highest ROC area as being the predictive model that is used in practice for determining the score for that particular image quality parameter.

Alternatively, recursive feature elimination may be used to select the features that are applied as inputs to the predictive model. Recursive feature elimination may apply weights (i.e. regression coefficients) to eliminate features that have small weights and thus do not provide any useful data to help the predictive model generate a more accurate prediction. In another alternative, feature importance may be ranked using tree-based estimators in order to select the features that provide the most useful data to help the predictive model generate a more accurate prediction.

Optionally, the plurality of historical medical images provided to the method 500 may be user determined. For example, as described herein, an administrative user may select a plurality of medical images to be labeled on a multiplicity of image/study quality parameter features and overall image/study quality. These medical images and their input labels can be used to continuously augment the data set used to build the models, to improve model performance. Alternatively, the data provided to augment the model building data set may be limited to the image quality parameter features and the input labels, where the models use only image quality parameter features as inputs. This may be referred to as a continuous retraining even though this retraining may be performed on a regular basis such as every day, every week, every month and/or every year.

The plurality of image quality parameter labels may be received from users who are accessing the image quality feedback tool in FIG. 24 as is described herein.

Figure 6:
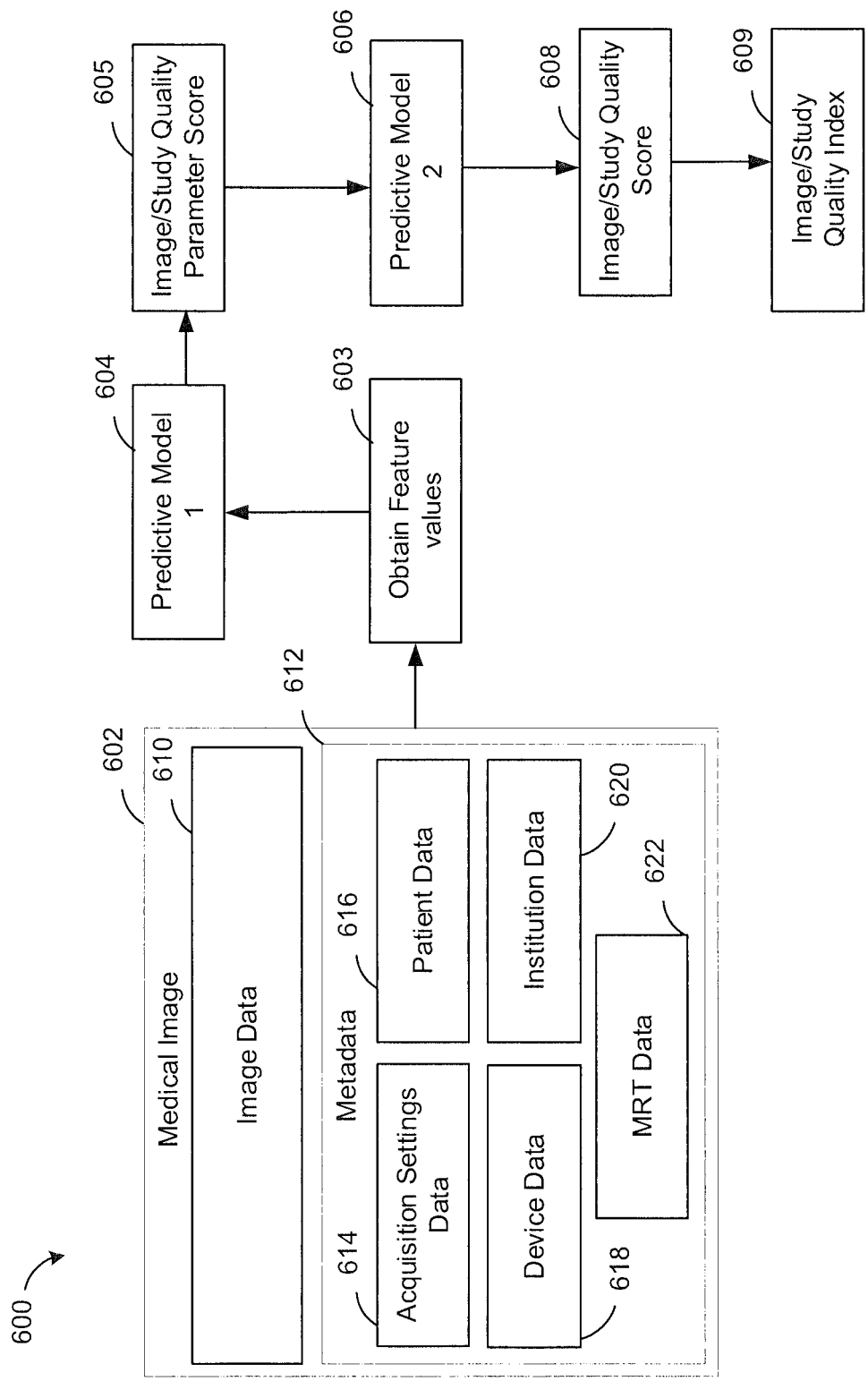
FIG. 6 is a block diagram of a predictive model and associated inputs and outputs that may be used by the medical image quality system of FIGS. 1 and 43.

Referring now to FIG. 6, shown therein is an example embodiment of a data flow diagram showing data that is used as input for a predictive model 604 and output provided by the predictive model 604. As previously described, there are a plurality of predictive models 604 in the medical imaging system. Each predictive model 604 may correspond to an individual image quality parameter, and each predictive model 604 may function to determine a predicted image parameter score for the corresponding image quality parameter. The predictive model 604 accepts as inputs features that are determined from a medical image 602 that includes both a mammographic image and metadata 612 and patient-specific clinical data. An "overall" predictive model 606 may receive the image quality parameter score and determine as output an overall image quality score 608. An image quality index 609 may then be determined from the image quality score 608 using a variety of methods as described herein. This framework also applies to predictive models that are used to predict study quality parameter scores, and an overall study quality score from which a study quality index can be derived.

Medical image 602 includes image data 610 and a corresponding plurality of metadata 612. The image data 610 may be in any format known in the art, such as DICOM, JPEG, TIFF, or PNG. The corresponding plurality of metadata 612 may include acquisition settings data 614, patient data 616, device data 618, institution data 620, and MRT data 622.

Acquisition settings data 614 may refer to data collected contemporaneously at the time the medical image is taken and includes, but is not limited to, at least one of, the compression force applied, the timestamp of the acquisition (i.e. of the exposure for X-ray imaging modality), metadata of the digital sensor collecting the image, and metadata of the x-ray source, for example.

The patient data 616 may be an identifier to the patient's medical record in PACS, or another database. The patient data may also be data collected at the medical imaging system at the time the image is collected, other health related data including, but not limited to, at least one of age, body mass index (BMI), height, and weight, for example. It will be understood that there are many potential patient data points that may be used by a predictive engine. The patient data may be stored in an electronic medical record system or other database.

The device data 618 includes, but is not limited to, at least one of identifiers, serial numbers, model numbers, device configuration data for the device, and other operating characteristics of the medical imaging device, for example. The device data may also include maintenance information about the device, such as the length of time since it's last inspect, length of time since it's last service, frequency of inspect, etc.

The institution data 620 may correspond to a particular clinic location, an identifier for a particular clinic location, or another identifier of the clinic within a larger organization. The institution data may similarly include more granular identification of the physical location or room of the medical imaging device 102 within a larger facility.

The MRT data 622 may correspond to the operator of the medical imaging system 102, and may be an identifier of the MRT associated with a particular collected image.

The plurality of metadata 612 associated with the medical image may be in a standard format such as the Digital Imaging and Communications in Medicine (DICOM), or another format. The plurality of metadata 612 may be in a standard image metadata format, such as the Exchangeable Image File Format (EXIF).

The predictive model 604 is used to map the predicted image quality parameter score or a predicted study quality parameter score to discrete values. This may be accomplished by comparing the image quality parameter score to a fixed operating point that is associated with the ROC curve for the predictive model 604. The operating point may be user configurable.

In accordance with the teachings herein, in at least one embodiment, one or more patient-specific actionable image quality parameter scores (IQPS), study quality parameter scores (SQPS), Image quality parameter indices (IQPI), study quality parameter indices (SQPI), IQS, study quality scores (SQSs), IQIs, and study quality indices (SQI) may be generated that may enable identification of root causes of variation in image quality at one or more of the MRT level, the medical imaging device level, and the clinic level, and may be operable to make such identifications on current and prior mammograms.

In accordance with the teachings herein, in at least one embodiment, patient-level actionable quality metrics and indices may be automatically derived using certain tools described herein to alleviate the time-consuming and impossible task of manually cleansing, and analyzing every mammogram from multiple sources when performing regular QC and for purposes of mammography accreditation.

In accordance with the teachings herein, in at least one embodiment, individual and overall image and study quality scores may be linked with clinical outcomes to develop algorithms that drive clinical workflow on the basis of impact on clinical outcomes.

The predicted image quality score 608 may be a discrete numerical value, or it may be indexed, similar to the image quality parameter scores, to form the image quality index 609. In one example, a predicted image quality score that is numerical having a value in the range of 0 to 100 may be indexed as follows: values in the range of 0 to 20 are mapped to the index value "Great", values in the range of 20 to 50 are mapped to the index value "Good", values in the range of 50 to 80 are mapped to the index value "Acceptable", and values in the range of 80 to 100 are mapped to the index value "Bad".

The medical image 602 and the metadata 612 may be pre-processed prior to use by the predictive model 604. Pre-processing of the medical image may include image filtering to remove noise, sharpening edges or subsampling. Another example of pre-processing may be the conversion of a raw 'For Processing' mammogram image, into a form that closely resembles a 'For Presentation' mammogram image. The pre-processing may also be performed to select the best features based on statistical tests.

The predicted image quality score 608 is a predicted probability that is used to provide the image quality assessment for the particular medical image being assessed. As part of the prediction, a user may configure an operating point for decision making. The operating point is related to the ROC curve for the predictive model and the user may vary the operating point which is then used to apply a threshold value to the predicted probability to index or map the predicted probability into an ordinal, continuous, or discrete indexed value.

Depending on the requirements of a particular institution, an administrator may adjust the operating point that is used with a given predictive model in determining a particular score as described below. The variation of the operating point adjusts the TPR and FPR of the predictive model that is used to determine the particular score. An administrator may want to adjust the operating point for certain image quality and/or study quality parameters so that particular types of non-conformities are being found using the image analysis system 112 with a higher level of sensitivity. This can save the administrator a great amount of time and resources rather than having to view each medical image separately for the presence of certain non-conformities.

Figure 7A:
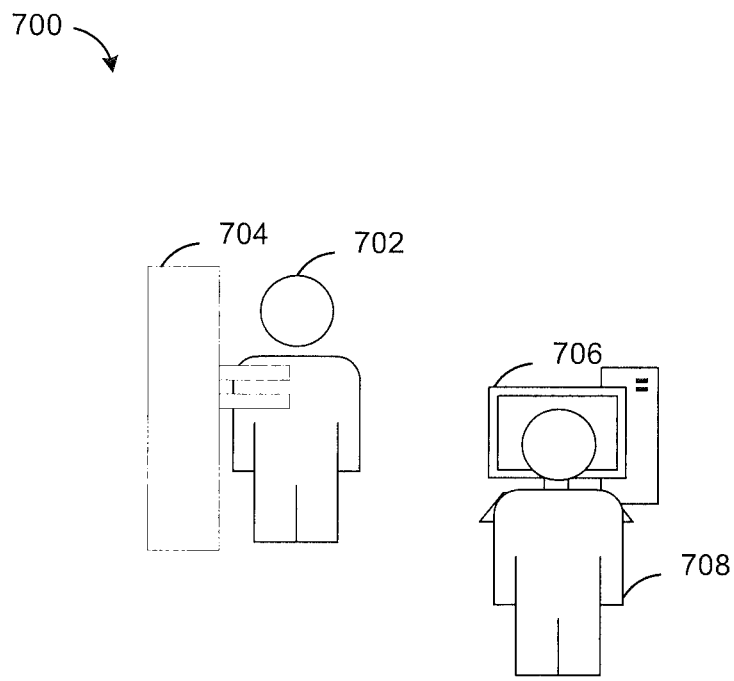
FIG. 7A is a use-case diagram showing a Medical Radiation Technologist (MRT) using the medical image quality system of FIGS. 1 and 43.

Referring now to FIG. 7A, shown therein is an example embodiment of a use-case diagram 700 showing an MRT 708 who collects medical imaging data including mammographic image data from a patient 702 using a medical imaging machine 704. An MRT 708 may perform medical imaging of a patient using a computer system 706 (i.e. MRT workstation 106) at the point-of-imaging and the computer system 706 may provide near real-time assessment information on the image quality.

This assessment information may include IQPS and/or IQPI, or SQPS and/or SQPI depending on whether an individual image or a study is being assessed. As previously discussed, these scores are derived for image quality parameters or study quality parameters determined from the image data, and at least one of the metadata information and the clinical patient data. These parameters may also include the positioning parameters of the patient based upon their location at the medical imaging machine 704 during image collection/acquisition, physical parameters of the patient, and image quality parameter features. The parameters may correspond to known deficient conditions or non-conformity in the mammographic images. The predicted image quality parameter scores may correspond to the probability that the non-conforming conditions that correspond to those parameters exist in a given mammographic image. Likewise, the predicted study quality parameter scores may correspond to the probability that the non-conforming conditions that correspond to those parameters exist in the study (e.g. set of images).

The assessment information may further include determining a predicted image quality score (as described in more detail below). The predicted image quality score reflects an estimated quality of the medical image, and may be continuous, categorical or ordinal.

The assessment information may be used to provide the MRT 708 with near real-time feedback based on the medical image data, including QC of the medical image data for medical imaging deficiencies. Advantageously, with this assessment information, the identified medical imaging deficiencies may be corrected by the MRT 708 during the original patient imaging appointment, without requiring the patient 702 to return at another time to acquire the medical images properly.

Figure 7B:
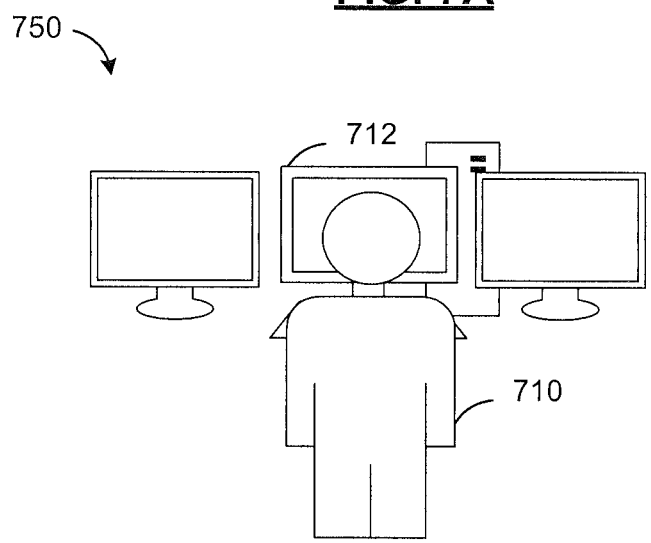
FIG. 7B shows an example use case showing an imaging administrator using the medical image quality system of FIGS. 1 and 43.

Referring to FIG. 7B, shown therein is an example of a use case 750 for an imaging administrator 710. In accordance with the teachings herein, in at least one example embodiment, a data analytics solution may be provided to an administrator workstation 712 (similar to workstation 108 in FIG. 1) that may enable identification of root causes of variation in image quality and therefore generate actionable information from which radiologists and MRTs may isolate and address problems in the realm of mammography image quality for the examples described herein. However, it should be understood that this methodology can be extended to other types of medical imaging of other body parts as previously discussed.

In the context of the imaging administrator, the prediction of image quality scores can be defined to include the prediction of individual image quality parameter scores across at least one of a plurality of medical imaging devices, a plurality of medical imaging MRTs, and a plurality of patients. The displayed scores can be aggregated along multiple dimensions including, but not limited to, technologist, time period, imaging device, and facility. By performing image quality analysis along many different dimensions, the administrator 710 in FIG. 7B may receive an alert via a data analytics solution provided administrator workstation 712 as described in FIG. 8 below.

Figure 8:
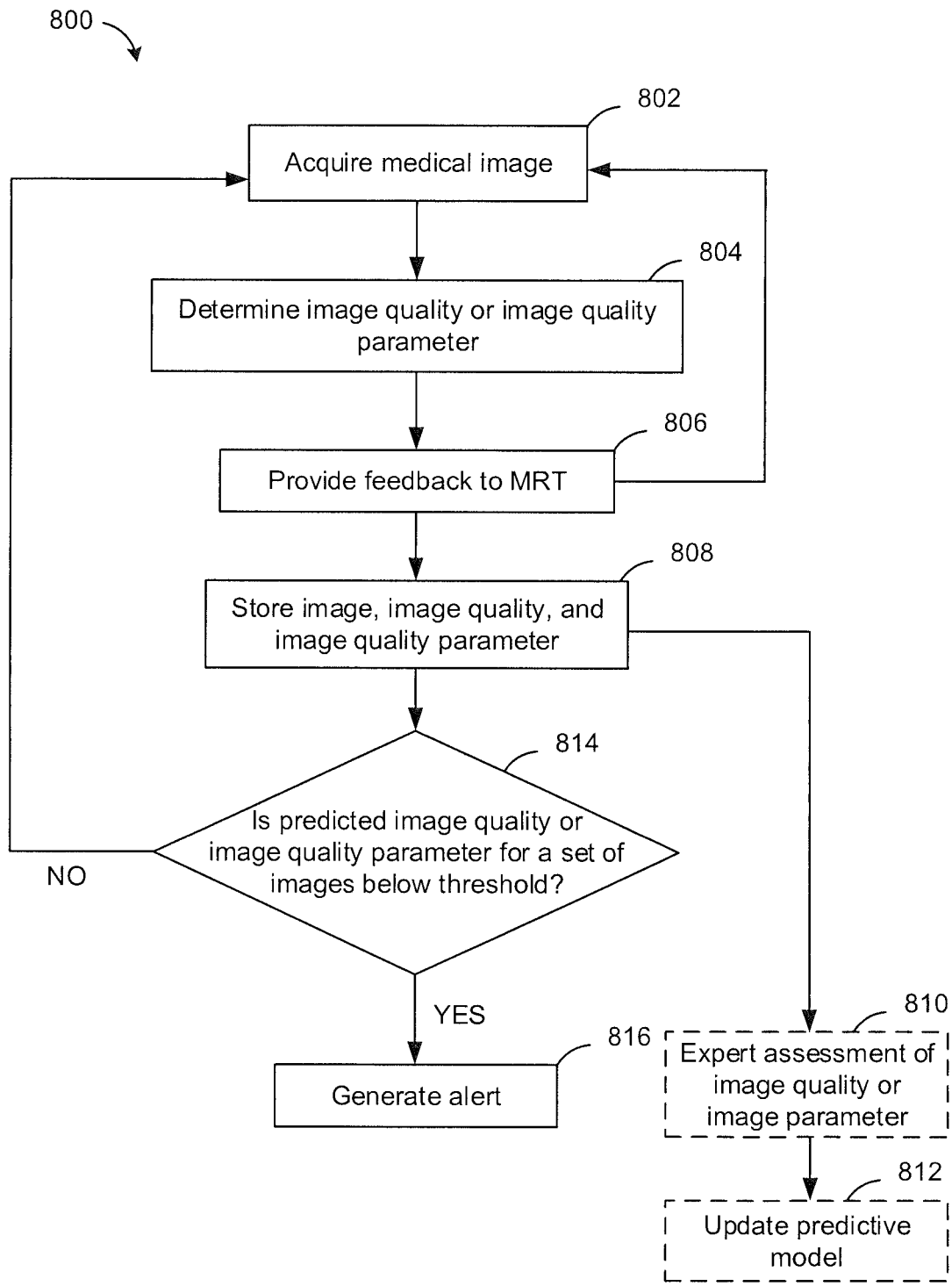
FIG. 8 shows an example embodiment of a method for alert generation that may be used by the medical image quality system of FIGS. 1 and 43.

Referring now to FIG. 8, shown therein is an example embodiment of a method 800 for alert generation based on a predicted image quality and corresponding image quality score. The method 800 can be performed by the processor unit 204 of the system 100. The method 800 can also be used for periodic model retraining as described below.

At act 802, a medical image is acquired such as a mammographic image by a medical image quality system, such as medical image quality system 100.

At act 804, the medical image quality system may determine a predicted image quality and image quality parameter score.

At act 806, the medical image quality system may provide feedback to the MRT at the MRT workstation 106. A predicted plurality of image and study quality parameter scores and indices (IQPS/SQPS, IQPI/SQPI, IQS/SQS, IQI/SQI) may also be provided as feedback to the MRT at the MRT workstation 106. Based on the feedback, the MRT may re-acquire the medical image and return to act 802. In this manner, a patient may have non-conforming medical images corrected at the same visit instead of having to return to the clinic for a follow-up imaging appointment.

At act 808, the medical image may be stored along with the image analysis results IQPF/SQPF and the results from the predictive models which includes one or more of IQPS, IQPI, SQPS, SQPI, IQS and SQS. The plurality of image/study quality parameter features and image/study quality scores may also be stored and associated with the medical image. Examples of IQPFs are listed in Table 3. Examples of SQPFs are listed in Table 2.

At act 810, which is optional, the plurality of image quality parameter features and image quality scores may be used along with the mammographic image in order to determine an expert assessment, perhaps by the system administrator. The plurality of image quality parameter features and the image quality scores along with the expert assessment may then be used a new training data for model retraining to periodically update the predictive model at act 812 by following the training method of FIG. 5 using the new training data. The expert assessment are labelled images which have been accurately labelled by qualified radiologists or radiological technologists to identify any errors associated with the various IQPs described herein. Alternatively, another form of continuous learning may be performed using the originally deployed algorithms to label images (instead of expert assessment) to generate new training data that is used for model re-training as is described with respect to the system 4300 shown in FIG. 43.

At act 814, the method 800 may determine if the predicted image quality score or image quality parameter score for a medical image or medical study falls below a predicted acceptable quality score value. The predicted acceptable quality score value may be a predicted probability of an "inadequate" image parameter, study parameter, image or study. The alerts may be configurable and rule based, including a configurable operating point for providing alerts. The alerting may occur generally in real-time based on the predicted image/study quality score and plurality of image/study quality parameter scores received from ongoing imaging of patients at a medical facility.

Alerts may also be created to provide notification to medical administrators for quality control concerns including machine maintenance.

At act 816, based on the determination in 814, an alert is sent to an administrator. This alert may be sent by email, SMS, an application on the administrator's mobile device, and/or by an automated telephone call to a phone number associated with an administrator.

For example, an alert may be triggered and a notification sent to an administrator when a number of low-quality scores are determined in certain circumstances such as, but not limited to, for a particular time period, for a particular MRT, or fora particular imaging device.

Figure 9:
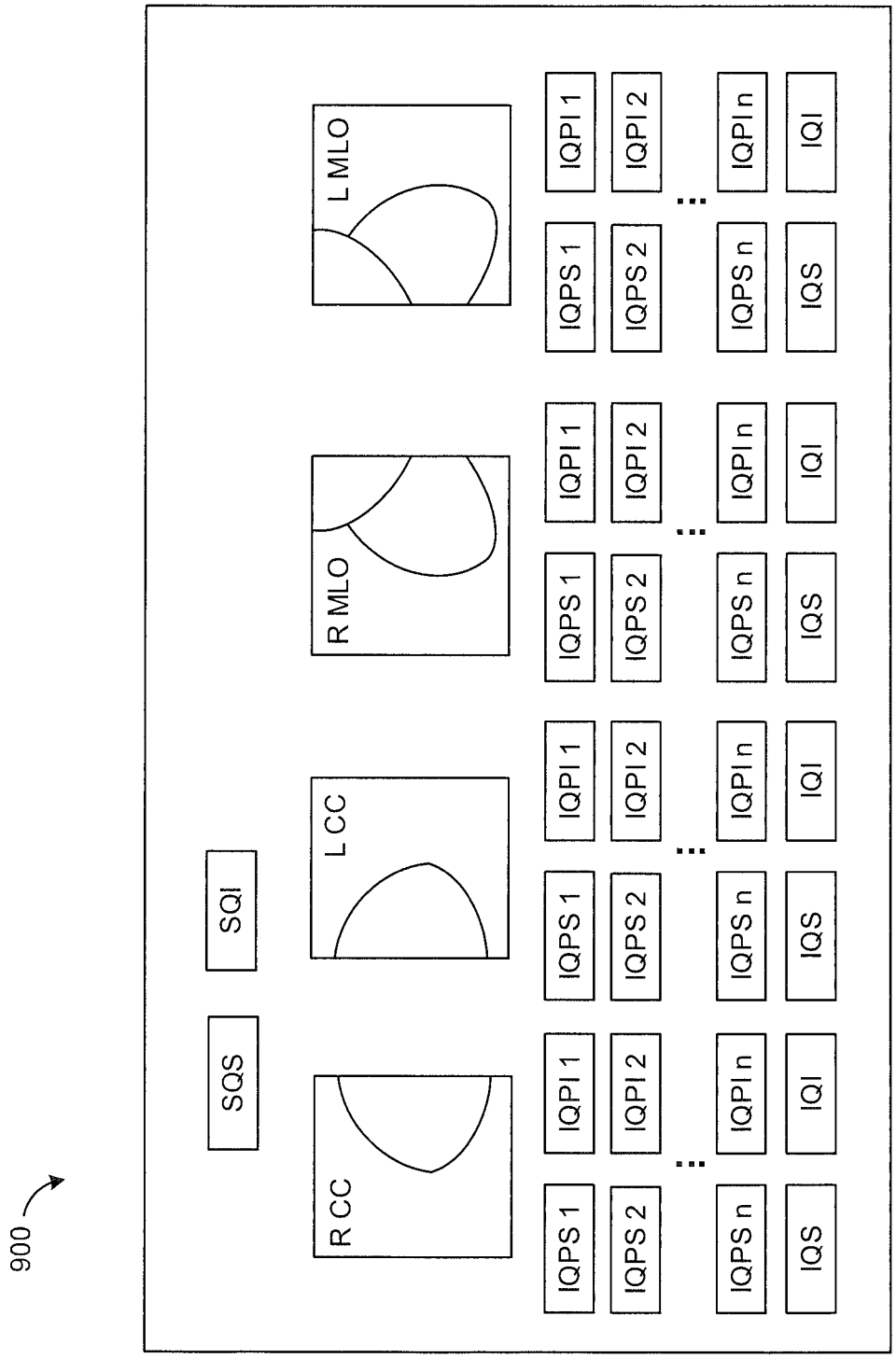
FIG. 9 shows an example embodiment of a user interface for a medical study that may be used by the medical image quality system of FIGS. 1 and 43.

Referring now to FIG. 9, shown therein is an example embodiment of a user interface 900 showing the overall study quality index (SQI) and study quality score (SQS), along with predicted image quality parameter scores (IQPSs) and associated image quality parameter indices (IQPs) for each image in the study. In some embodiments, an overall IQS and associated IQI may be shown per image in the study. The user interface 900 may be shown to the MRT at the MRT workstation 106/706, a radiologist, or an administrator at the administrator workstation 108/712.

The user interface 900 may show CC and MLO images for a study of a patient's left and right breasts as indicated. In the user interface 900, the predicted SQS may be determined from the IQS of each of the images in the study, or from the IQPS of each of the images in the study depending on whether the predictive model that is used to determine the SQS uses IQSs or IQPSs as inputs.

Accordingly, the study level analysis may include a plurality of medical images where subsets of the images include the images for a particular study, a plurality of study quality parameter scores (SQPSs) for each study, a predicted SQS for each study and optionally a SQI for each study. The process for computing an SQS and an SQI is generally an extension of the process for computing an IQS and an IQI, respectively.

For each image in the study, image quality parameter features (IQPFs) are measured by applying the image assessment described in FIGS. 1-6 to each image in the set of images that compose the study.

The study quality parameter features (SQPFs) may be measured as a function of two or more IQPFs. One such example in the mammography image quality domain is based on the 'PNL length', that is, the distance from the nipple to the pectoralis muscle. For a given breast (left or right), the PNL lengths must be equal (or within 1 cm of one another) when measured in the CC and MLO views. The resulting difference in PNL length measured in these two views, is the PNL length difference SQPF. Another such example in the mammography image quality domain, is that of the 'MLO tissue cutoff' consideration, where two or more MLO views of the same breast are taken, because the patient's breast is too large to fit on the image receptor for a single image. The first of those views may be cut-off by the superior (top) edge of the image, while the second of those MLO views may be cut off by the inferior (bottom) edge of the image. In this case, one IQPF may be used to measure the MLO cut-off at the superior edge, and another IQPF may be used to measure the MLO cut-off at the inferior edge, so that a SQPF based on the two IQPF measures from each of the two MLO views, may be used to indicate whether there is an overall non-conformity concerning tissue cutoff. In another example, the CC and MLO images for a breast may provide some level of redundancy. Tissue that is not visible in the CC view may be properly visible in the MLO view, so that at a study level, posterior tissues have not been missed, even though the individual CC image does have posterior tissues missing. This may be assessed using the Posterior Tissues Missing Overall SQP (see Table 1). Examples of SQPFs are listed in Table 2. It is understood that the SQPFs in Table 2 are examples, and there may be many more than the ones listed.

TABLE 2

Study Quality Parameter Features (SQPFs)

| SQPF ID | Feature Name | Description |
| --- | --- | --- |
| SF1 | PNL length difference | Difference in the length of the PNL as measured in the CC and MLO views for one breast. |
| SF2 | Tissue cutoff over all MLOs per side | Test if a study that includes multiple MLO images for a single side, has tissue cutoff on either the superior (top) or inferior (bottom) edges |
| SF3 | Tissue cutoff over all CCs per side | Test if a study that includes multiple CC images for a single side, has tissue cutoff on either the medial (bottom) or lateral (top) edges. |
| SF4 | Posterior tissues missing in both CC and MLO per side | Test if a study has posterior tissue missing in both the CC and MLO images for a single side. |

An individual study quality parameter score (SQPS) may be derived from a multivariate predictive model built on the multiplicity of IQPFs and the multiplicity of SQPFs computed over the component images of a study. This may be done by applying the very same steps used to derive an IQPS from the set of IQPFs associated with single images.

A class for a study quality parameter index (SQPI) may be derived by a comparison of two or more IQPFs, without the use of a machine learning model. For example, the SQPI may be a classification of whether the PNL length difference SQPF exceeds 1 cm, and if so, this aspect of the study may be considered non-conformant. Additionally, the PNL length difference SQPF may be included with the plurality of IQPFs in a predictive model to generate a SQPS.

Additionally, a SQPI may be derived from the SQPS, by the selection of an operating point on the ROC curve associated with the predictive model that was used to predict the SQPS, such that all studies with SQPS values greater than the operating point are classified as non-conformant and those with SQPS values less than or equal to the operating point as conformant. Alternatively, all studies with SQPS values greater than the operating point can be classified as conformant and those with SQPS values less than or equal to the operating point as non-conformant depending on the particular parameter that is being assessed.

Additionally, the overall study quality score (SQS) can be derived from a multivariate predictive model built on the set of IQPFs computed over all the component images of the study. In the example of mammographic screening, a study's standard component images are MLO and CC views of the left and right breast, forming a set of 4 images. The study quality index (SQI) may be derived from the SQS by the selection of an operating point on the ROC curve for the predictive model that was used to predict the SQS in the same way that is described for the derivation of the SQPI from the SQPS above.

In one example, the SQS may indicate the estimated probability that the study is suitable for diagnostic interpretation, in which case, the SQS presents the probability of the study being rated above the 'Inadequate' quality level on the PGMI scale.

In another example, the SQS may indicate the estimated probability that the study is suitable for accreditation purposes, where the SQS present the probability of the study being of at the 'Perfect' quality level on the PGMI scale.

Referring now to FIG. 10, shown therein is an example embodiment of a user interface diagram 1000 showing the predicted overall IQS and associated IQI along with the predicted plurality of image quality parameter scores and indices for an image. The IQPS for each associated image quality parameter may be shown along with the associated IQPI for the single image, which in this case is an MLO image of the patient's left breast.

The user interface 1000 may be shown to the MRT at the MRT workstation 106/706, a radiologist, or an administrator at the administrator workstation 108/712. The user interface 1000 may show other mammographic images such as a CC image or an MLO image of a patient's left or right breast.

Referring now to FIG. 11A, shown therein is an example embodiment of a slider user interface 1100. The slider interface 1100 may be provided to the administrator at the administrator workstation 108 or 712. The slider functionality may also be provided by another input control such as a field, a text entry box or other applicable input. The slider 1102 enables an administrator to configure the operating point for given IQPS, IQS, SAPS or SQS. A plurality of sliders or other user controls may enable an administrator to configure the IQP operating point for each of a plurality of scores. The operating point may be used to map the predicted probability of a given score, as listed above, into a discrete binary form, such as 'Yes' or 'No', and 'true' or 'false'. A second slider 1104 may be provided to allow the administrator to configure an operating point for a different score. There may be a plurality of sliders provided to map the predicted probability of a plurality of scores to a discrete binary value such as 'Yes' or 'No', and 'true' or 'false'.

Referring now to FIG. 11B, an example truth table 1150 is shown which indicates the types of prediction errors that may exist in a medical imaging prediction system. A true positive exists when a condition is correctly predicted as being present. A true negative exists when a condition is correctly predicted as not being present. A false positive error exists when a condition is not present but is incorrectly predicted as being present. A false negative error exists when a condition is present but is incorrectly predicted as not being present. Each of the two types of errors, false positive and false negative carry associated costs. An administrator may wish to adjust the risk of false positives and false negatives, and may do so using the user interface 1100. The administrator may modify the behavior of the predictive model to increase or decrease the image/study quality parameter score operating point, or the image/study quality operating point in this manner.

Referring now to FIG. 12, shown therein is an example of a ROC curve 1200 that is associated with a given predictive model. The ROC curve 1200 may be created by plotting the rate of true positive predictions (TPR) against the rate of false positive predictions (FPR) for the given predictive model. The TPR and FPR may be generated by comparing the predictive model's predictions against expert consensus data. The ROC curve 1200 may be displayed to the administrator to allow the administrator to perform decision making based on the performance of the predictive model. For example, the AUC for the ROC curve may assist in determining the predictive model's accuracy and whether the selected input features for the predictive model are providing useful information. For example, if the AUC of the ROC curve 1200 is close to 0.5 then the accuracy of the predictions being made by the predictive model is only slightly better than chance. In contrast, if the AUC for the ROC curve is closer to 1 then the predictive model is quite accurate in making predictions. The ROC curve interface is discussed in more detail in FIG. 28.

A slider 1202, or other input element, may be used to allow the administrator, or another user, to select an operating point for the predictive model that predicts a given score or an image/study quality estimate. The administrator may be able to change the operating point using the slider interface (or another interface) for one, some, or all of the image/study quality parameter scores. The selection of an operating point affects the TPR and the FPR for the values being predicted by the predictive model. An optimal operating point may be one that minimizes the distance from the operating point location on the ROC curve to the coordinate (0.0, 1.0) which represents perfect detection, with 100% TPR and 0% FPR. Alternatively, any selected operating point can be used to generate an index from an image/study quality parameter score. The index is used to map a given score to a first category or a second category such that the TPR of the mapping corresponds to the TPR of the operating point on the ROC curve and the FPR of the mapping corresponds to the FPR of the operating point on the ROC curve. For some scores, it may be very important to minimize the FPR and the operating point can be selected to be closer to the y axis. Likewise for other scores, the TPR is more important and the operating point can be selected to be further away from the y axis.

In the case where a predicted probability is indexed (or mapped) to more than two categories, then another suitable interface may be used to allow the administrative user to decide the individual cut points. This may, for example, support the indexing or mapping of image quality parameters into categories such as "Perfect", "Good", "Moderate", or "Inadequate".

While a slider is used for visualization of the selection of operating point, it is understood that any user input element/method may be used to allow the administrative user to select the one or more operating points.

Figure 13:
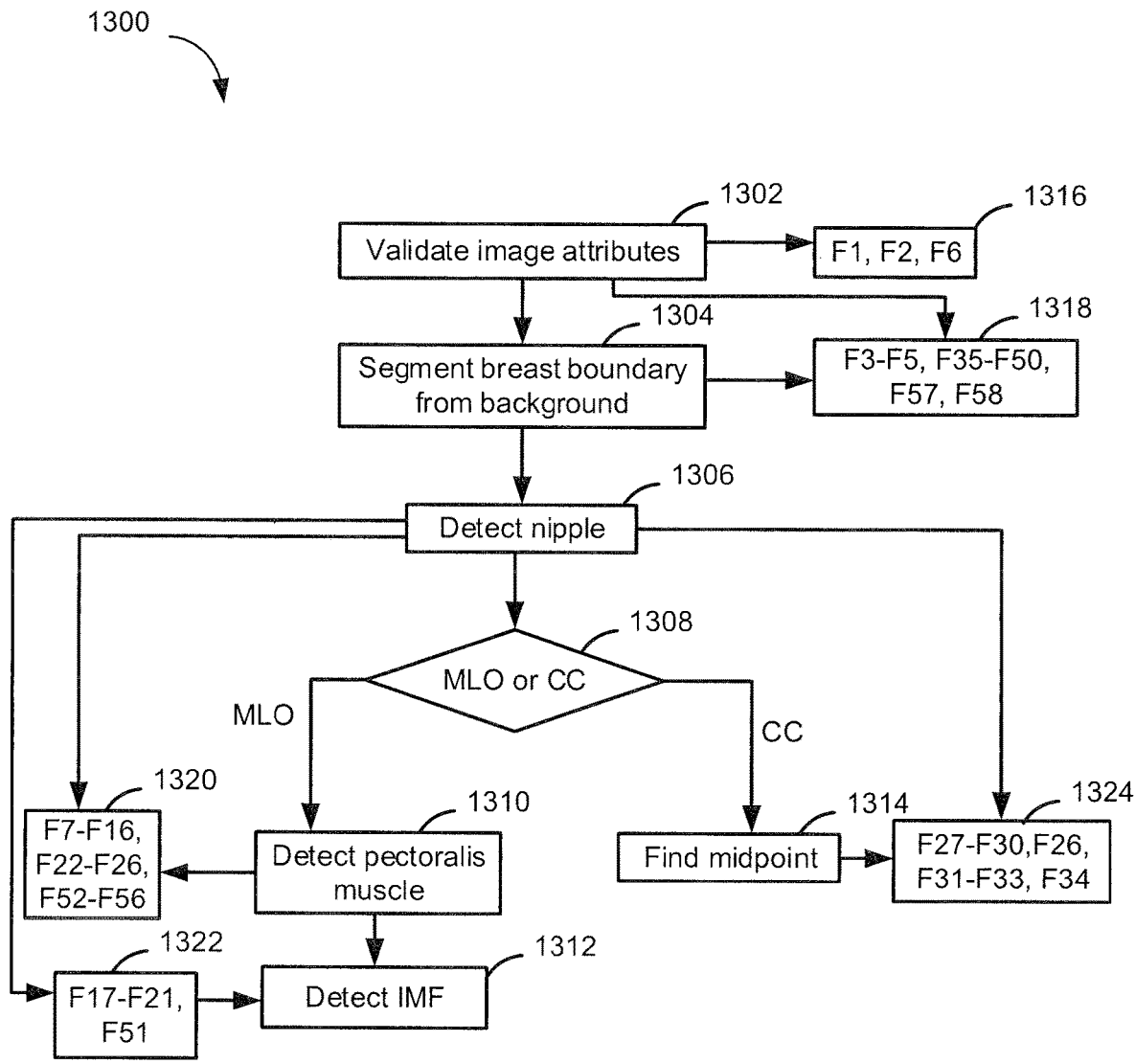
FIG. 13 shows an example embodiment of a method of preparing image features that may be used by the medical image quality system of FIGS. 1 and 43.

Referring now to FIG. 13, shown therein is an example embodiment of a method 1300 of processing the medical images to obtain various image quality parameter features. Various combinations of these features are used by the predictive models in generating various scores as described above.

TABLE 3

Image Quality Parameter Features (IQPFs)

| IQPF ID | Feature Name | Description |
| --- | --- | --- |
| F1 | Compression Force | DICOM meta data: Compression force applied by imaging device (reported) |
| F2 | Compressed Breast Thickness | DICOM meta data: Thickness of breast reported by imaging device (reported) |
| F3 | Breast Area | Area of breast visible in the image (computed) |
| F4 | Compression Pressure | Compression pressure applied by imaging device = compression force/breast area (computed) |
| F5 | Breast Volume | Computed (volume = thickness * area) Volume of breast (computed) |
| F6 | Patient Age at Mammography Exam | DICOM meta data: Age |
| F7 | PNL_Angle | MLO - Angle of PNL Angle of PNL line (indicated as segment 2962 in FIG. 29C from the horizontal reference) |
| F8 | PNL | MLO - Length of PNL (indicated as segment 2962 in FIG. 29C) |
| F9 | PNL_C | MLO - the horizontal distance from intersection point to image edge (indicated as segment 2968 in FIG. 29C) |
| F10 | PNL_D | MLO - the distance from intersection point to image edge on the extension of the PNL (indicated as segment 2964 in FIG. 29C) |
| F11 | PNL_E | MLO - the distance along image edge, between the points where the PNL intersection's horizontal and PNL extension line (indicated as segment 2966 in FIG. 29C) |
| F12 | PNL_F | MLO - PNL does not intersect the pectoralis muscle, and the distance of the end of the pectoralis muscle and the PNL (indicated as segment 3002 in FIG. 30A) |
| F13 | saggingPnlAngle | MLO - an angle of the nipple location to midpoint of posterior breast (indicated as segment 3502 in FIG. 35) |
| F14 | saggingTissue Angle | MLO - an angle of the line formed from the nipple to the mid-point of posterior breast (indicated as segment 3504 in FIG. 35) |

TABLE 3-continued

Image Quality Parameter Features (IQPFs)

Figure 32:
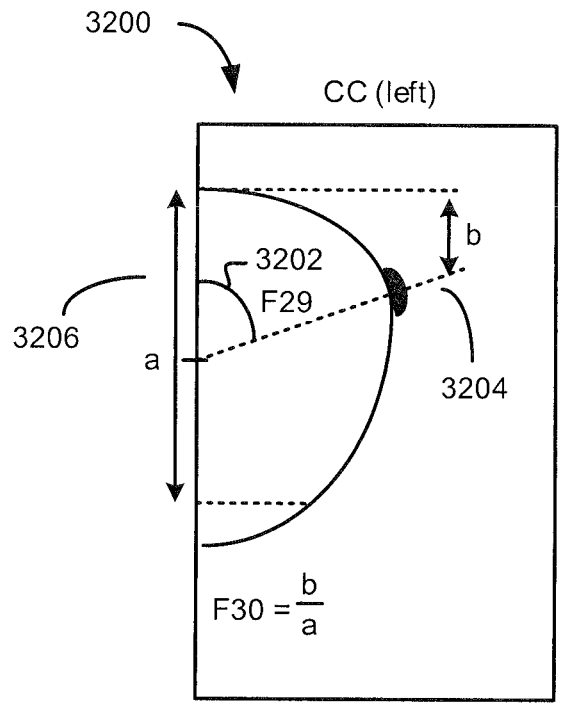
FIGS. 32-35 medical images that illustrate various image quality parameter features that may be used by a medical image quality system.
Figure 33:
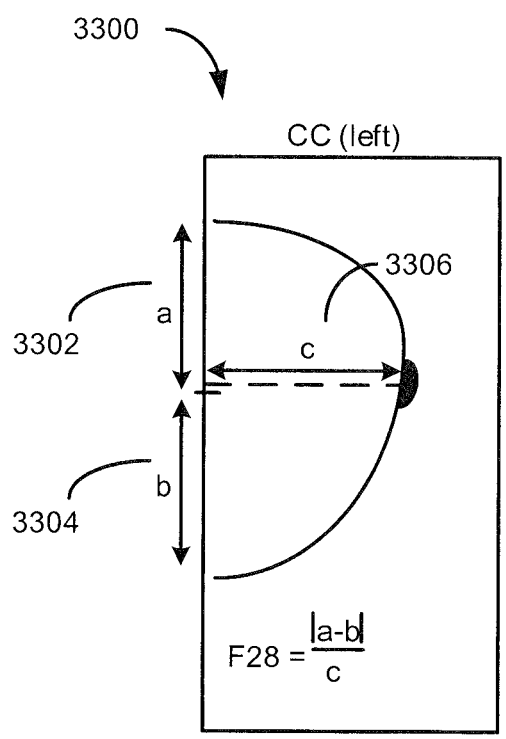

| IQPF ID | Feature Name | Description |
|---|---|---|
| F15 | pecWidth | MLO - Width in mm of the pectoralis muscle at top edge of MLO view (indicated as segment 3054 in FIG. 30B) |
| F16 | concavePecAngleDiff | MLO - a Difference between angles from the line segment aligned with the first superior one-third of the pec muscle, and the line segment aligned with the second superior one-third of the pec muscle (see FIG. 29A) |
| F17 | inadequateIMFCurve | MLO - Maximum curvature of skin line that forms the IMF (see FIG. 29B) |
| F18 | inadequateIMFHeight | MLO - Vertical distance of IMF location from bottom edge of image (see FIG. 29B) |
| F19 | inadequateIMFWidth | MLO - Horizontal distance of IMF location from the posterior edge of the image (see FIG. 29B) |
| F20 | tooHighOnIRImfRatio | MLO - Ratio of the IMF to whole vertical size of the breast (i.e. Ratio of distance from IMF to superior image edge, to the vertical length of the breast area (see FIG. 29B)) |
| F21 | tooHighOnIRNippleRatio | MLO - Ratio of the nipple to the whole vertical size of the breast (i.e. ratio of nipple distance to inferior image edge, to the vertical length of the breast area (see FIG. 29B)) |
| F22 | skinFoldsNumber | MLO - Number of bright blobs in the region near the IMF and the breast axillary tail where the axilla is closest to the topmost part of the breast in the MLO view |
| F23 | skinFoldsSize | MLO - Total size (i.e. sum of area) of bright blobs found in regions near IMF and breast axillary tail |
| F24 | posteriorTissuesTissueDensity | MLO - Statistics of the pixel intensity from dense tissue Statistics of the pixel intensity from dense tissue |
| F25 | posteriorTissuesTargetDensity | MLO - Statistics of pixel intensity are calculated from rectangle target region inside the breast region, below pectoralis muscle and close to chest wall (see FIG. 34) |
| F26 | cutOff | CC/MLO Test if breast area touches edges of image |
| F27 | PNL | CC - Length of PNL Horizontal distance from nipple to pec muscle in CC view (indicated as 3306 (length c) in FIG. 33) |
| F28 | CCExaggerationSymmetry | CC - Dividing by PNL, the symmetry measurement of medial and lateral portion of breast (i.e. difference between length of breast area on medial and lateral sides of the PNL, normalized by PNL length (see FIG. 33)) |
| F29 | CCExaggerationAngle | CC - Angle of midpoint of the posterior breast to the nipple (indicated as 3202 in FIG. 32) |
| F30 | CCExaggerationNipple | CC - Ratio of the nipple location to the whole vertical breast length (see FIG. 32) |
| F31 | posteriorTissuesTissueDensity | CC - Statistics of the pixel intensity from dense tissue |
| F32 | posteriorTissuesTargetDensity | CC - Statistics of pixel intensity are calculated from rectangle target region inside breast region and close to chest wall (see FIG. 34) |
| F33 | skinFoldsNumber | CC - Number of bright blobs found in regions near medial and lateral end of the breast |
| F34 | skinFoldsSize | CC - Total size of bright blobs found in regions near medial and lateral end of breast |
| F35 | imageHeight_MLO | MLO - Total vertical length of MLO image (see 4702 in FIG. 47A) |
| F36 | imageHeight_CC | CC - Total vertical length of CC image (see 4902 in FIG. 49A) |
| F37 | imageWidth_MLO | MLO - Total horizontal length of MLO image (see 4704 in FIG. 47A) |
| F38 | imageWidth_CC | CC - Total horizontal length of CC image (see 4904 in FIG. 49A) |
| F39 | breastWidth_MLO | MLO - distance from most anterior point on breast contour to anterior edge of MLO image (see 4712 in FIG. 47B) |
| F40 | breastWidth_CC | CC - distance from most anterior point on breast contour to anterior edge of CC image (see 4912 in FIG. 49B) |
| F41 | oppositeBreastWidth_CC | CC - imageWidth (F38) subtract breastwidth (F40) which is farthest anterior point of skin line to the anterior edge of the CC image (see 4914 in FIG. 49B) |
| F42 | oppositeBreastWidth_MLO | MLO - imageWidth (F37) subtract breastWidth (F39) which is farthest anterior point of skin line to the anterior edge of the MLO image (see 4714 in FIG. 47B) |
| F43 | lengthFromBottom_CC | CC - Length from most medial point on breast contour to medial edge of CC image (see 4908 in FIG. 49A) |
| F44 | lengthFromBottom_MLO | MLO - Length from most inferior point on breast contour (excluding IMF) to inferior edge of MLO image (see 4706 in FIG. 47A) |
| F45 | cutOffLength_A_CC | CC - Length of intersection between breast and image edge, when cut off is detected on anterior edge of CC image (see 5006 in FIG. 50B) |

TABLE 3-continued

Image Quality Parameter Features (IQPFs)

| IQPF ID | Feature Name | Description |
|---|---|---|
| F46 | cutOffLength_M_CC | CC - Length of intersection between breast and image edge, when cut off is detected on medial edge of CC image (see 5002 in FIG. 50A) |
| F47 | cutOffLength_L_CC | CC - Length of the intersection between breast and image edge, when cut off is detected on lateral edge of CC image (see 4916 in FIG. 49B) |
| F48 | cutOffLength_A_MLO | MLO - Length of intersection between breast and image edge, when cut off is detected on anterior edge of MLO image (see 4802 in FIG. 48A) |
| F49 | cutOffLength_I_MLO | MLO - Length of intersection between breast and image edge, when cut off is detected on inferior edge of MLO image (see 4718 in FIG. 47C) |
| F50 | lengthFromTop_CC | CC - Length from most lateral point on breast contour to lateral edge of CC image (see 4906 in FIG. 49A) |
| F51 | inadequateIMFWidth_I_MLO | MLO - Horizontal distance of most inferior portion of IMF to posterior edge of MLO image (see 3058 to 4708 in FIG. 47A) |
| F52 | nipplePosition_A | MLO - Length from nipple (3052) to anterior edge of MLO image (see 4806 in FIG. 48B) |
| F53 | nipplePosition_P | MLO - Length from the nipple to posterior edge of MLO image (see 3052 to 4810 in FIG. 48B) |
| F54 | nipplePosition_I | MLO - Length from nipple to inferior edge of MLO image (see 4808 in FIG. 48B) |
| F56 | fromBottomNippleRatio | MLO - Ratio of lengthFromBottom (F44) to nipplePosition_l (F54) (calculated) |
| F57 | pecBreastWidth | MLO - Length of intersection between breast and superior edge of MLO image (see 4812 in FIG. 48B) |
| F58 | thicknessRatio | MLO - Ratio of the breastWidth (F39) to pecBreastWidth (F57) (calculated) |

The IQPFs F1, F2, and F6 may be grouped as IQPFs based on DICOM metadata. The IQPFs F7 to F54, and F57 may be grouped as IQPFs based on anatomical measurements. The IQPFs F3, F4, F5, F56, and F58 may be groups as IQPFs based on determined values from other IQPFs in the DICOM metadata group and the anatomical measurement group.

Any one of acts 1302, 1304 and 1306 are performed before determining the various image quality parameter features of the medical image that is being assessed. Examples of various image quality parameter features are shown in Table 3. In other embodiments, other parameter features may be used for medical images of other anatomy.

At act 1302, the method 1300 performs validation which is applied to the image attributes which represent individual metadata elements that are associated with the medical image. Validation involves determining whether image attributes are present for the image examination, otherwise, the images may be judged unsuitable for analysis. For example, dose, compression force and thickness attributes are typically provided for the medical image, and if these attributes are not present the validation may prevent the assessment of the image. The validation may also determine if the attribute values are readable and identifiable, including compliance with the DICOM format.

At act 1316, after the image attributes have been validated, image parameter quality features F1, F2 and F6, listed in Table 3 are determined so that they may be provided as input to certain predictive models that determine certain scores such as the example IQPs in Table 1.

At act 1304, the image may undergo image processing so that other image quality parameter features may be more accurately determined. For example, the image may be processed to have the breast boundary segmented from the background.

At act 1318, the validated image attributes from act 1302 and the segmented breast boundary from act 1304 may then be further processed to determine values for the image quality parameter features F3-F5, F35-F50, F57 and F58 listed in Table 3.

At act 1306, the medical image is further processed in order to detect the nipple. Once the nipple is detected certain image quality parameter features may be determined while for others further image processing is performed to detect certain landmarks.

For example, at act 1308, the view for the medical image is determined, which, for example, in the case of a mammographic image, involves determining whether the medical image is the MLO or CC view. For DICOM images this can be determined from the metadata elements, but in many other modalities the view may need to be interpreted from the image data.

If the view at act 1308 is determined to be the CC view, then the method 1300 proceeds to at act 1314, where the CC image has its midpoint determined.

After act 1314, the method 1300 proceeds to act 1324, where the midpoint from act 1314 and the detected nipple from act 1306 are used to obtain a variety of image quality parameter features including F26-F34, which are described in further detail in Table 3.

Otherwise, if the method 1300 determines that the view of the medical is the MLO at act 1308 then the method 1300 proceeds to at act 1310, where the MLO image is further processed to detect the pectoralis muscle location.

Once the pectoralis muscle location is detected, the method 1300 can proceed to acts 1320 and 1312. At act 1320, the location of the pectoralis muscle from act 1310 and the nipple location from act 1306 may be used to determine image quality parameter features F7-F16, F22-F26 and F52-F56, which are described in further detail in Table 3.

At act 1312, the location of the intra-mammary fold (IMF) is detected after which the method 1300 proceeds to act 1322 where the location of the IMF from act 1312 and the nipple location from act 1306 may be used to determine the image quality parameter features F17-F21 and F51, which are described in further detail in Table 3.

Figure 29A:
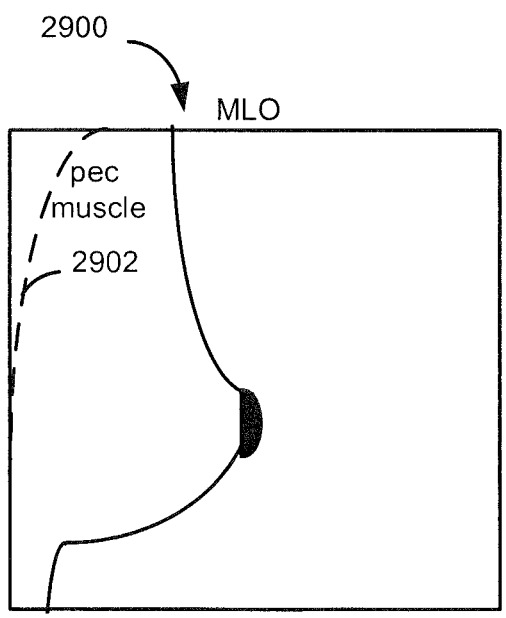
FIGS. 29A-30B show examples of medical images showing various anatomical breast features that may be used to determine an image quality parameter feature by a medical image quality system.

Referring now to FIG. 29A, shown therein is a medical image (MLO view) 2900 that shows an example of the location of the pectoral muscle line 2902.

Figure 29B:
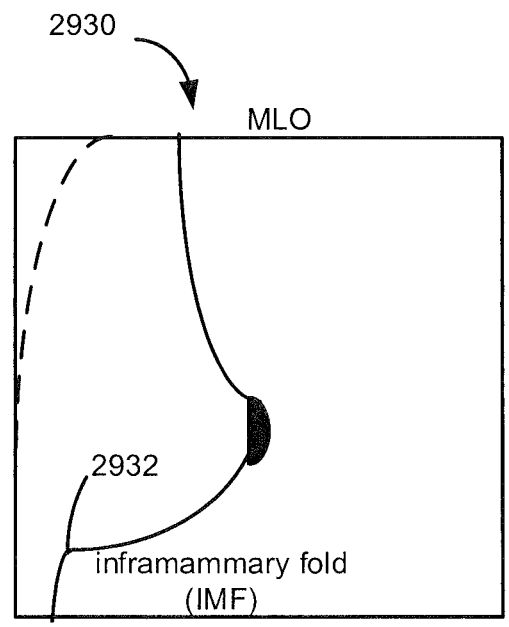

Referring now to FIG. 29B, shown therein is an infra-mammory fold (IMF) for medical image 2930 that may be used by a medical image quality system as described herein for determining certain image quality parameter features. For example, the IMF 2932 is used for determining the IQPFs F17-F20 that are shown in Table 3.

Figure 29C:
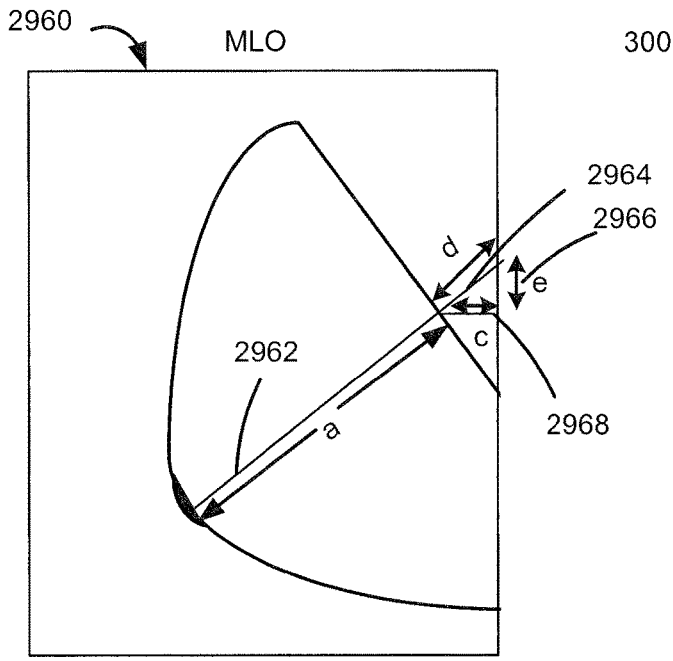

Referring now to FIG. 29C, shown therein is a pectoral nipple line (PNL) shown for a medical image 2960, which is an MLO view mammogram, that may be used by a medical image quality system as described herein for determining certain image quality parameter features. The image 2960 has a PNL line 2962, PNL C 2968, PNL D 2964 and PNL E 2966. The angle between the horizontal reference and the pectoral nipple line 2962 may be referred to as IQPF F7. The length of the PNL A line 2962 may be referred to as IQPF F8. The length of the PNL C line 2968 may be referred to as IQPF F9. The length of the PNL D line 2964 may be referred to as IQPF F10. The length of the PNL E line 2966 may be referred to as IQPF F11. The image quality parameter features F7-F11 are also shown in Table 3.

Figure 30A:
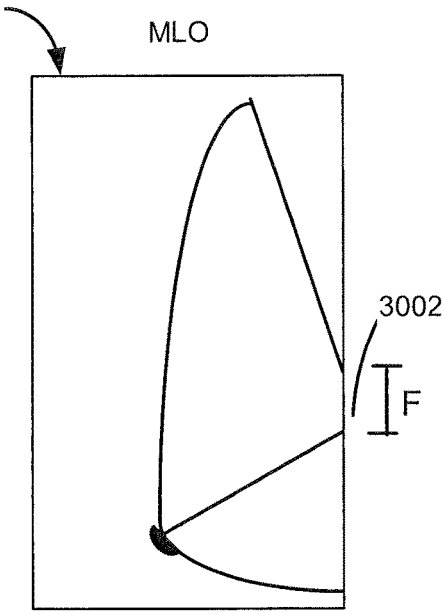

Referring now to FIG. 30A, shown therein is a PNL F line in a medical image 3000, which is an MLO view mammogram, that may be used by a medical image quality system as described herein for determining certain image quality parameter features. The PNL F line 3002 corresponds to IQPF F12 in Table 3.

Figure 30B:
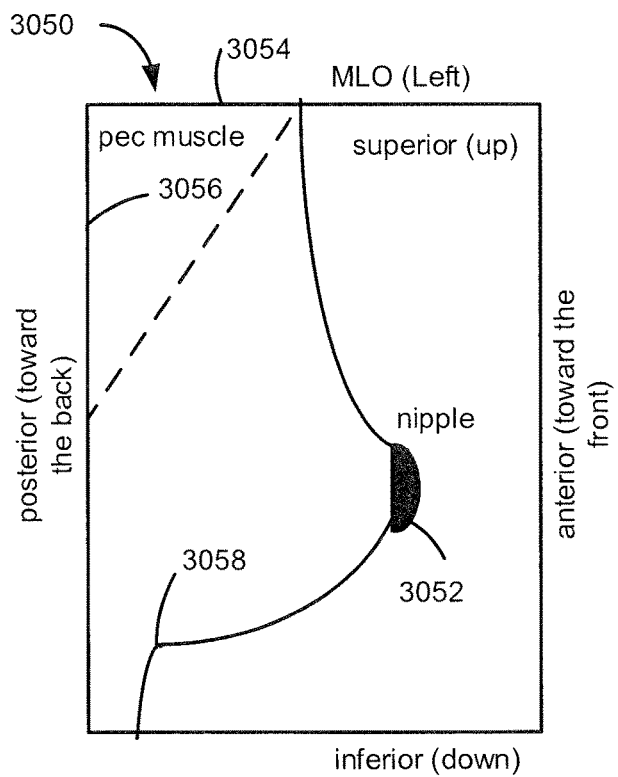

Referring now to FIG. 30B, shown therein is an MLO view of a medical image 3050 that illustrates the pec width that may be used by the medical image quality system as described herein for determining certain image quality parameter features. The image 3050 has pec muscle width 3054, a posterior section 3056, an IMF 3058, and a nipple 3052. The pec muscle width line 3054 corresponds to IQPF F15 in Table 3.

Figure 31:
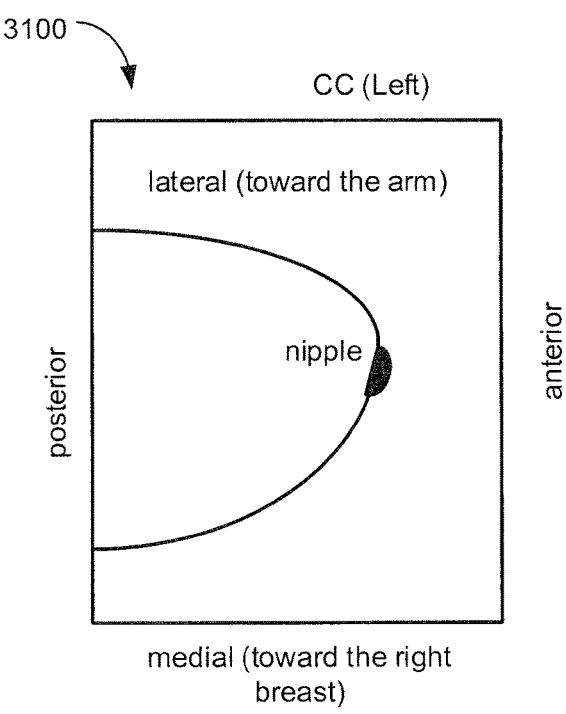
FIG. 31 shows an example of a medical image view with labels illustrating lateral, medial, anterior, posterior locations that may be used to determine an image quality parameter feature by a medical image quality system.

Referring now to FIG. 31, shown therein is a CC (left) view of a medical image 3100 showing certain labels illustrating the lateral, medial, anterior, posterior locations, which may be used to determine certain features by the medical image quality system as described herein.

Referring now to FIG. 32, shown therein is a CC view of a medical image 3200 of certain elements that may be used by the medical image quality system as described herein for determining at least one IQPF. For example, the angle 3202 (from the midpoint of the posterior breast to the nipple) corresponds to IQPF F29 in Table 3. The ratio of the distance 3204 (nipple location) and the distance 3206 (whole vertical breast length) corresponds to IQPF F30 in Table 3.

Referring now to FIG. 33, shown therein is a CC view of a medical image 3300 of certain elements that may be used by the medical image quality system as described herein for determining at least one IQPF. For example, the difference between the distance 3302 (length of breast area on the medial side of the PNL) and the distance 3304 (length of breast area on the lateral side of the PNL) divided by the distance 3306 (PNL length) corresponds to IQPF F28 in Table 3.

Figure 34:
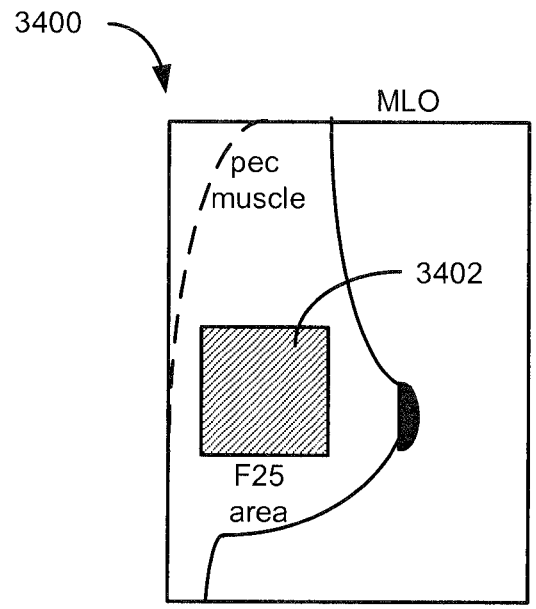

Referring now to FIG. 34, shown therein is an MLO view of a medical image 3400 showing certain elements that may be used by the medical image quality system as described herein for determining certain image quality parameter features. For example, area 3402 may be used to calculate IQPFs F25 and F32 in Table 3.

Figure 35:
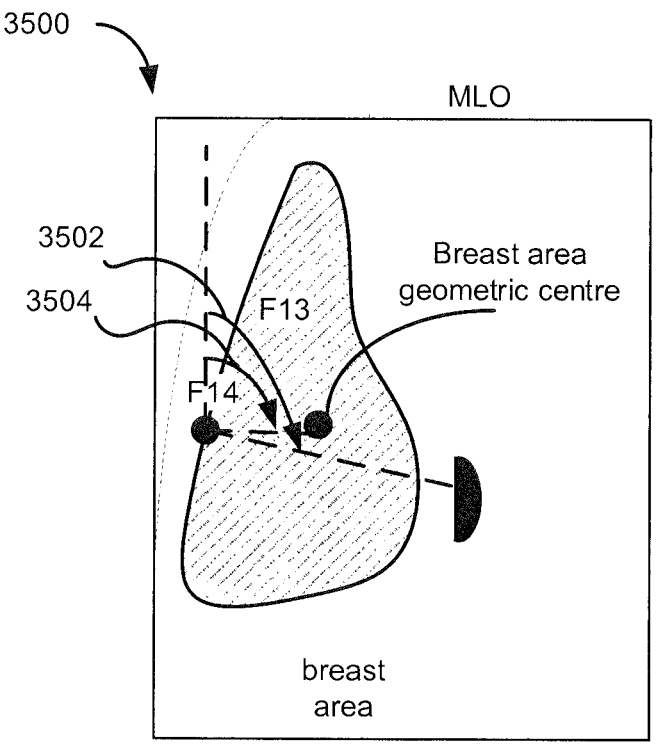

Referring now to FIG. 35, shown therein is an MLO view of a medical image 3500 showing certain elements that may be used by the medical image quality system as described herein for determining certain image quality parameter features. For example, angles 3502 and 3504 correspond to IQPF F13 and IQPF F14, respectively, in Table 3.

Referring now together to FIGS. 47A, 47B, 47C, and 48A, shown therein are Left MLO views of medical images 4700, 4710, 4716, and 4800, respectively, of certain elements that may be used by the medical image quality systems described herein for determining at least one IQPF as described in Table 3.

Referring now to FIG. 48B, shown therein is a RMLO view of medical image 4804, respectively of certain elements that may be used by the medical image quality systems described herein for determining at least one IQPF as described in Table 3.

Referring now together to FIGS. 49A, and 50A, shown therein are Right CC views of medical images 4900 and 5000, respectively, of certain elements that may be used by the medical image quality systems described herein for determining at least one IQPF as described in Table 3.

Referring now together to FIGS. 49B, and 50B, shown therein are Left CC views of medical images 4910 and 5004, respectively, of certain elements that may be used by the medical image quality systems described herein for determining at least one IQPF as described in Table 3.

Figure 14:
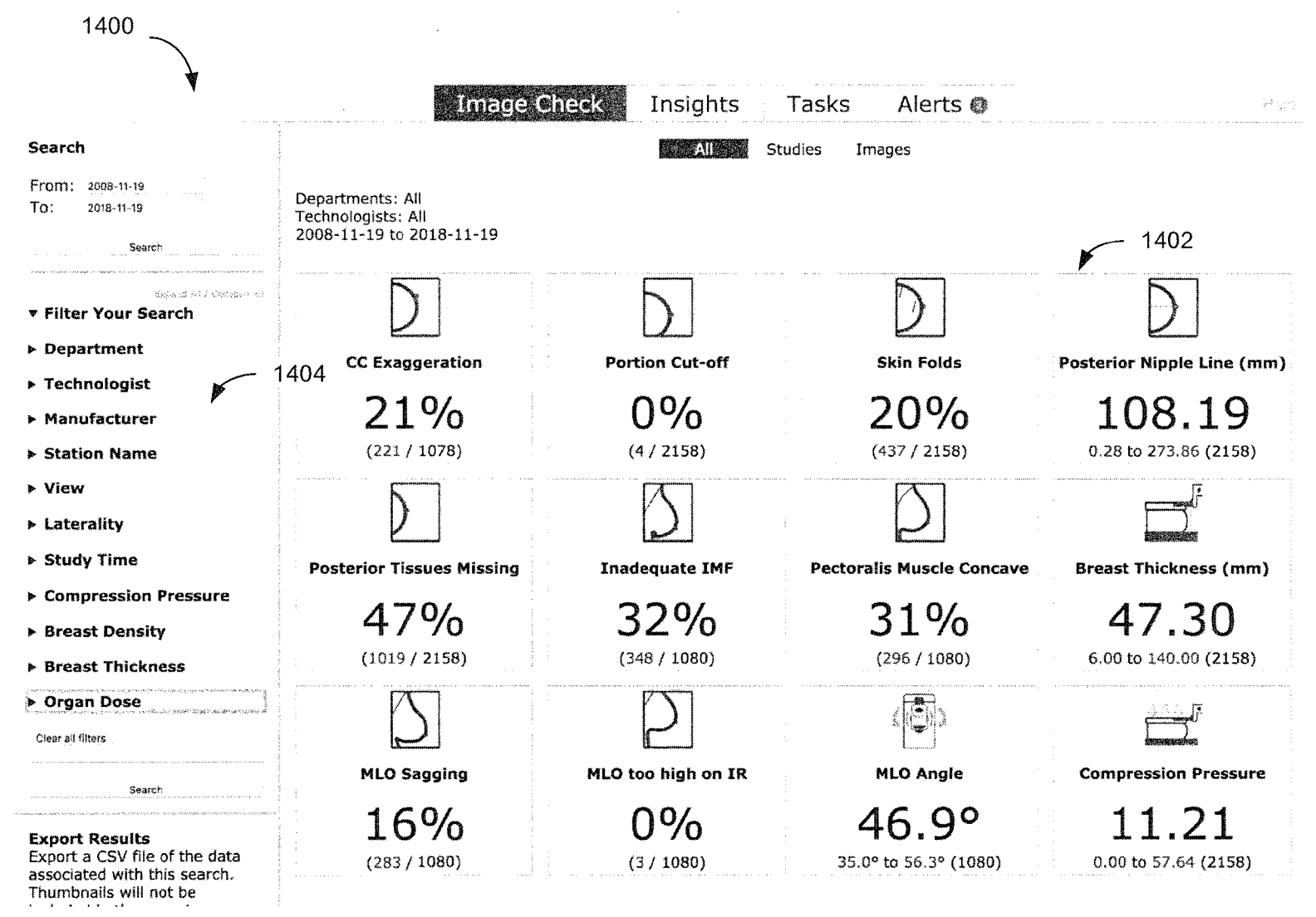

Referring now to FIG. 14, shown therein is an example embodiment of a user interface 1400. The GUI engine 233 generates the user interface 1400 to show several IQPs 1402 and the percentage of images in an image set that satisfy a particular operating point for a given IQP. For example, for the IQP "CC Exaggeration", an operating point was selected by the administrator (using the slider discussed previously) and it was found that 21% of the images in the image set had an image score that was larger than the operating point. As another example, for the IQP "portion cut-off", the score for each image is a "Yes" or "No" binary value where a value of "Yes" indicates that a portion of the breast is cutoff in an image in the image set. In this case there are 4 images out of 2158 images that have portions of the breast cutoff.

User interface 1400 may be referred to as an aggregate level view and may be used to quickly find images with IQPSs that are larger than the corresponding operating point across an entire organization, or part of that organization based on filtering. Accordingly, the GUI engine 233 provides a set of filters 1404 that the user may use to vary the images that are analyzed by filtering on a certain characteristic such as, but not limited to, at least one of: a particular department in the organization, an MRT in the organization, images acquired by machines made by a certain manufacturer, acquisition station, image view (left side or right side), laterality (MLO or CC for mammographic images), by time, compression pressure, breast density, and organ dose. When the user provides settings for one or more of the filters 1404, the GUI engine 233 receives the settings and determines which of the images in the image set satisfy the filter settings. Once the images that satisfy the filter settings have been determined, the GUI 233 adjusts the number of images that satisfy the operating points for each of the IQPs 1402.

A user may select one of the IQPs shown in the user interface 1402 to drill down and view the images that have satisfied the operating point for the selected IQP. In this case, once the GUI engine 233 receives a user input for selecting one of the IQPs by, for example, receiving an indication that the user has clicked or otherwise selected the icon shown for a particular IQP, then the GUI engine 233 generates another user interface that allows the user to review the images that have scores for that selected IQP that satisfy the operating point for that image quality parameter. This allows the user to view an individual image of a particular image study, such as in the example shown in FIG. 15, or allows the user to see various image studies and then pick an individual study for further analysis, such as in the example shown in FIG. 16.

Figure 15:
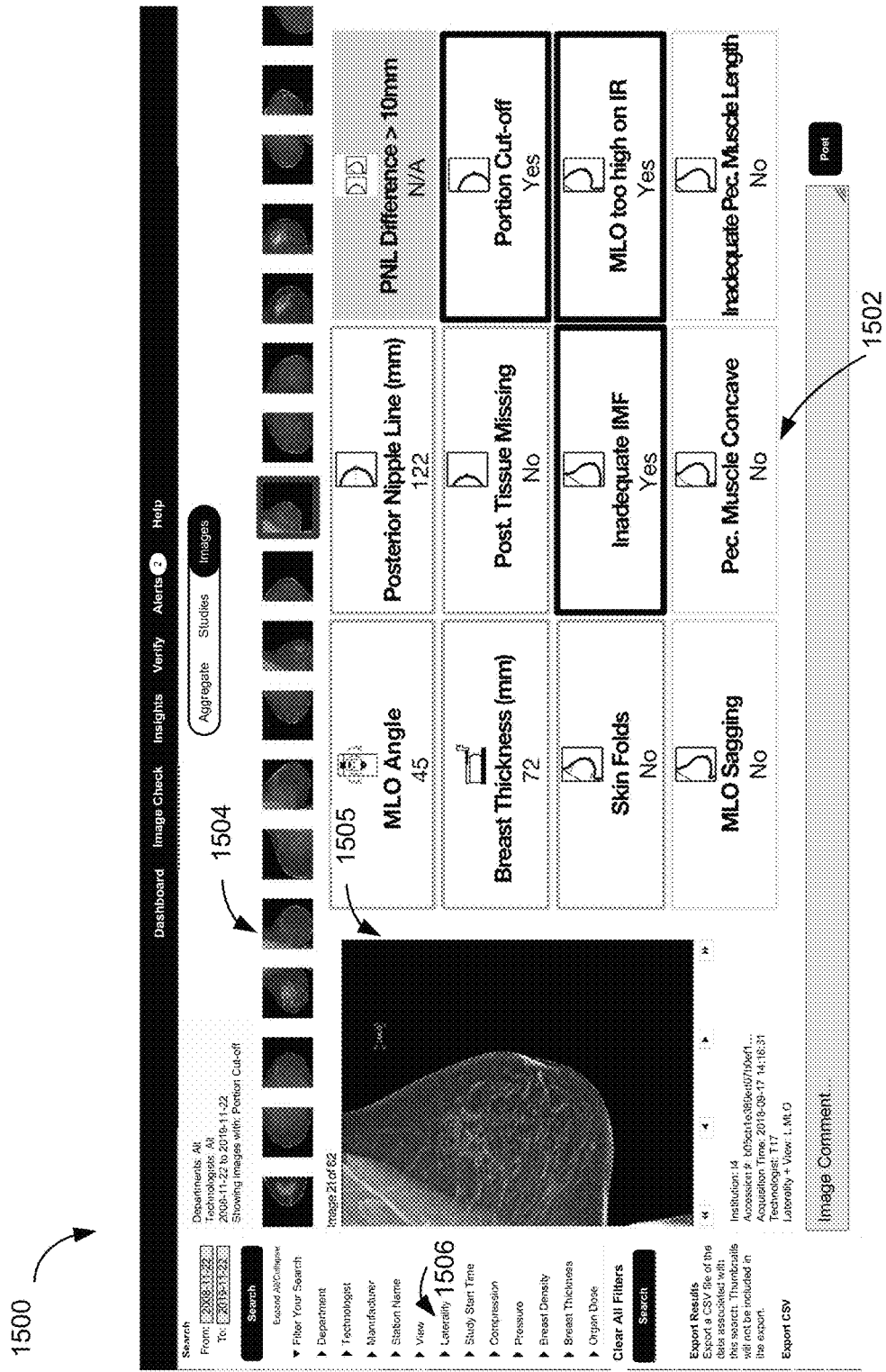

Referring now to FIG. 15, shown therein is an example embodiment of a user interface 1500 showing image quality parameter scores for image quality parameters 1502 for an individual image. User interface 1500 may be referred to as an image level view and may be generated by the GUI engine 233. A user may select one of the images from those in a study by selecting one of the thumbnail images 1504. Each thumbnail image represents a different mammographic view for a study on one patient taken at a particular time. When the GUI engine 233 receives a user input for selecting one of the thumbnail images, the GUI engine 233 displays a larger version of the selected image such as image 1505. The GUI engine 233 also then displays the scores for a plurality of IQPs 1502. If any of the scores indicate the likelihood of a non-conformity when compared to the operating point (on the ROC curve of the predictive model) for a given IQP then the GUI engine 233 may highlight the icons for the non-conforming IQPs. This may be done by shading the icon differently or using a different color for the box around the icon, for example. This provides a quick visual indicator to the user that this particular medical image has an IQP that is non-conforming with acceptable standards for that particular parameter. The interface 1500 may be available to an administrator at the administrator workstation 108 or 712. To drill down into a particular study, filtering may be used, as was described for FIG. 14, using various filter fields shown at the left of FIG. 15.

Figure 16:
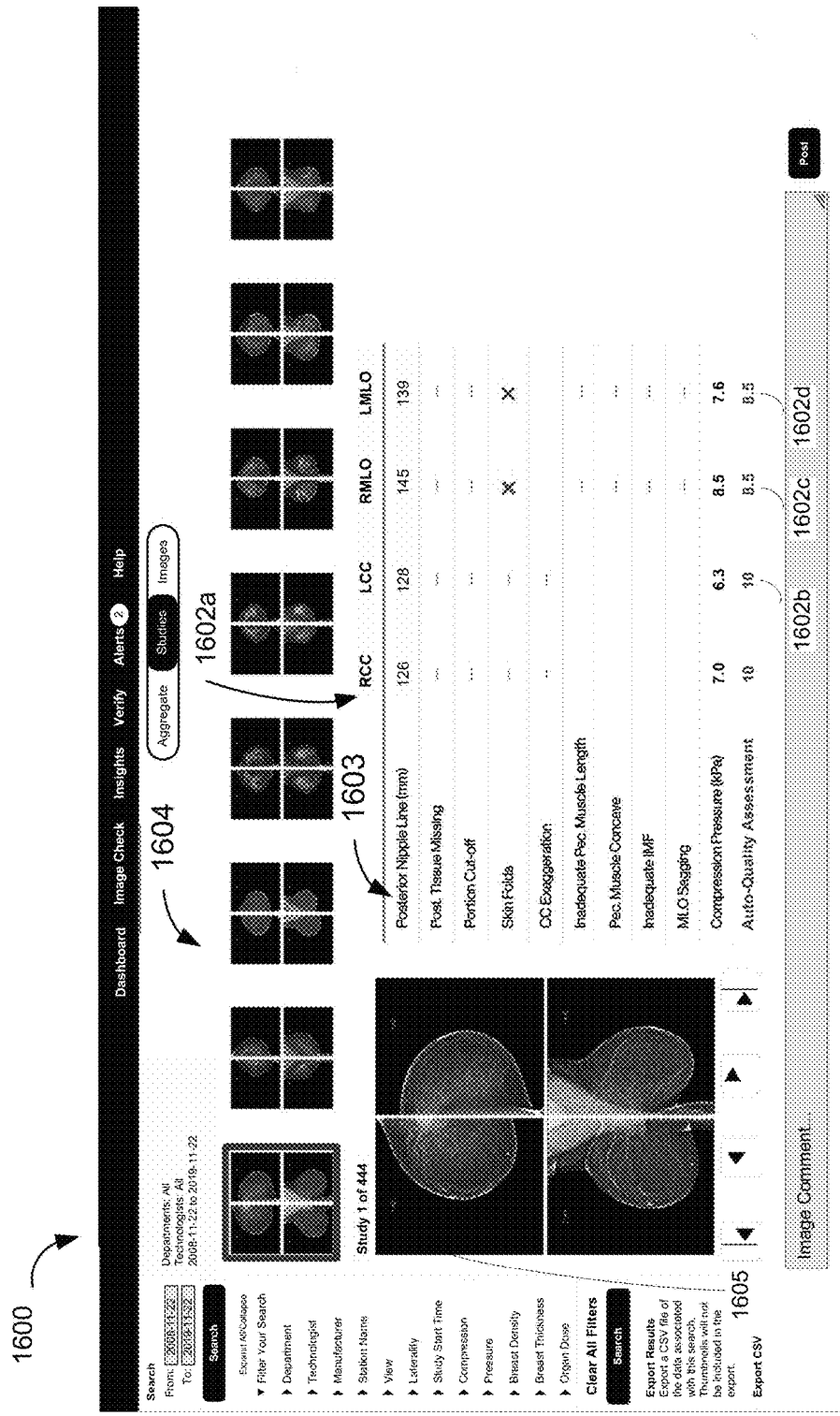

Referring now to FIG. 16, shown therein is an example embodiment of a user interface 1600 showing IQPSs 1602a, 1602b, 1602c and 1602d for IQPs 1603 for a study 1605. User interface 1600 may be referred to as a study level view. For example, a user may have performed filtering to obtain a set of studies which the GUI engine 233 displays as a series of grouped thumbnail images 1604 where east set of grouped thumbnails, in this example 4 thumbnails, correspond to a study. A user may then select one of the studies by selecting a set of four thumbnails from the grouped thumbnail images 1604. Once the GUI engine 233 receives the user selection of one study from the grouped thumbnail images 1604, the GUI engine 233 then displays a larger view of the four images of the selected study as images 1605. The GUI engine 233 also accesses the database 230 to retrieve each of the IQPSs for each of the images of the selected study and displays these scores as 1602a, 1602b, 1602c and 1602d. It should be noted that an image quality value for each image of the selected study may also be generated (as described previously) and displayed. An example of this is shown in the last row of the IQPSs.

A user may also select one of the images 1605 to further drill down in that particular image to determine if any of the IQPSs for that image are non-conforming. For example, when the GUI engine 233 receives a user selection of one of the images 1605, the GUI engine 233 can then display the user interface 1500 to show the selected individual image in greater detail along with the corresponding IQPSs, such as is shown in the example in FIG. 15. It should be noted that the GUI 1600 can also have a section (not shown) where a user can input settings for various filters as was described for the GUIs 1400 and 1500 in FIGS. 14 and 15, respectively.

Figure 17A:
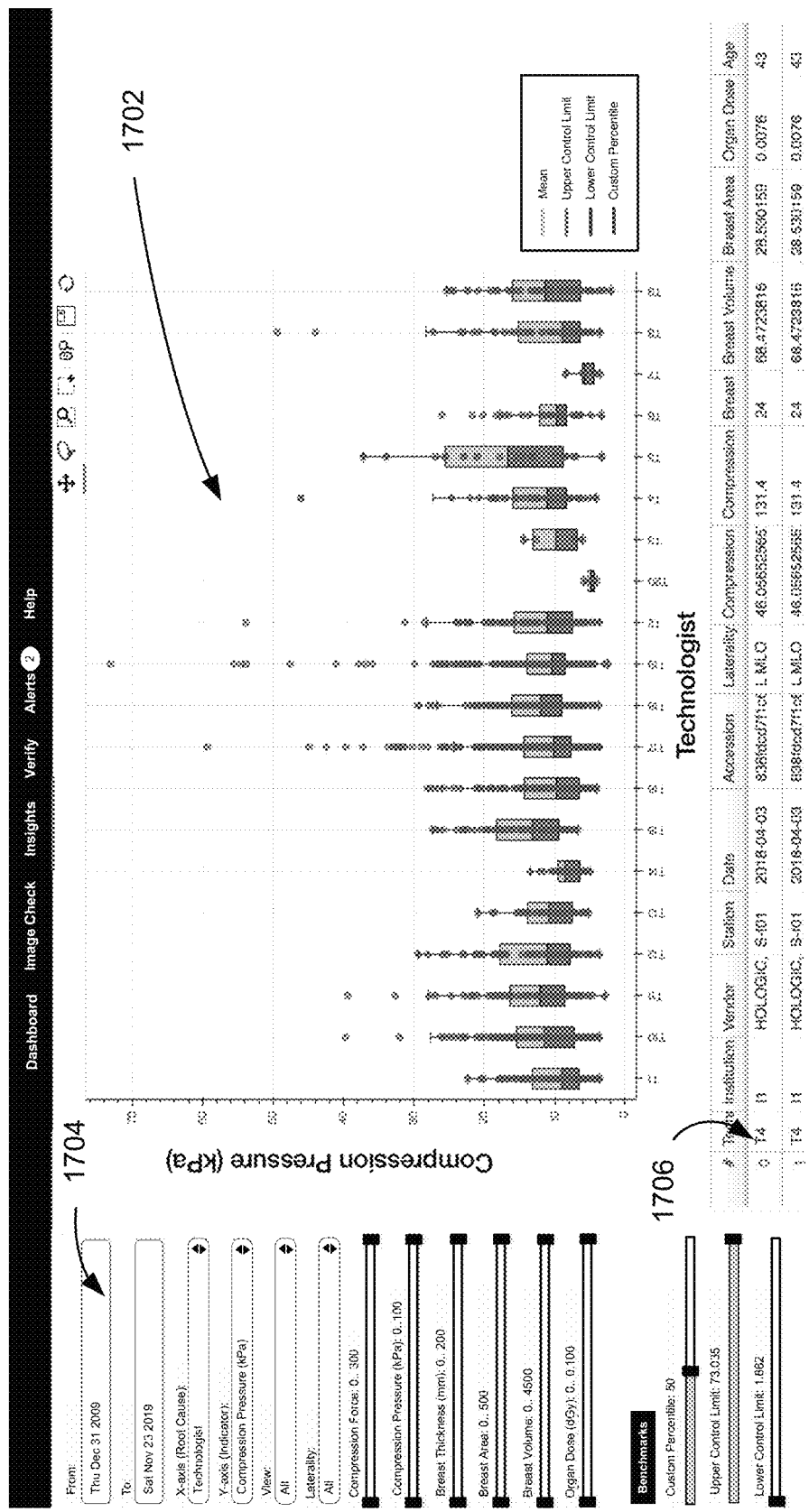

Referring now to FIG. 17A, shown therein is an example embodiment of a user interface 1700 that can be generated by the GUI engine 233 to show a plot 1702 that displays various IQPSs and IQPFs for a selected variable, which in this example is imaging technologist. The IQPSs and IQPFs may be selected when the user provides filter settings for the filters 1704. The user interface 1700 also includes a listing 1706 of data points corresponding to images that are identified as outliers or as points of interest. The listing 1706 can include various data such as, but not limited to, at least one of MRT, medical institution, imaging machine vendor, acquisition station, date, accession, age, laterality/view, breast thickness, breast area, breast volume, compression, organ dose and age, for example.

The data visualization provided by the user interface 1700 may allow an administrator to view predicted IQPSs (or IQSs) across MRTs to observe issues such as identifying certain MRTs which obtain images that have more errors than other MRTs. It should be noted that the GUI 1700 can provide more filters (not shown) as was described for the GUIs 1400 and 1500 in FIGS. 14 and 15, respectively. For FIG. 17A, the data is shown for different MRTs allowing the user to view the difference in performance for each MRT and to find certain MRTs which may have a large variation in a particular aspect (shown on the y-axis) of the acquired images. The amount of variation is indicated by the size of the bars and the lines which extend from the top and bottom ends of the bars. In the example of FIG. 17A, the particular aspect is the compression used when acquiring mammographic images.

Figure 17B:
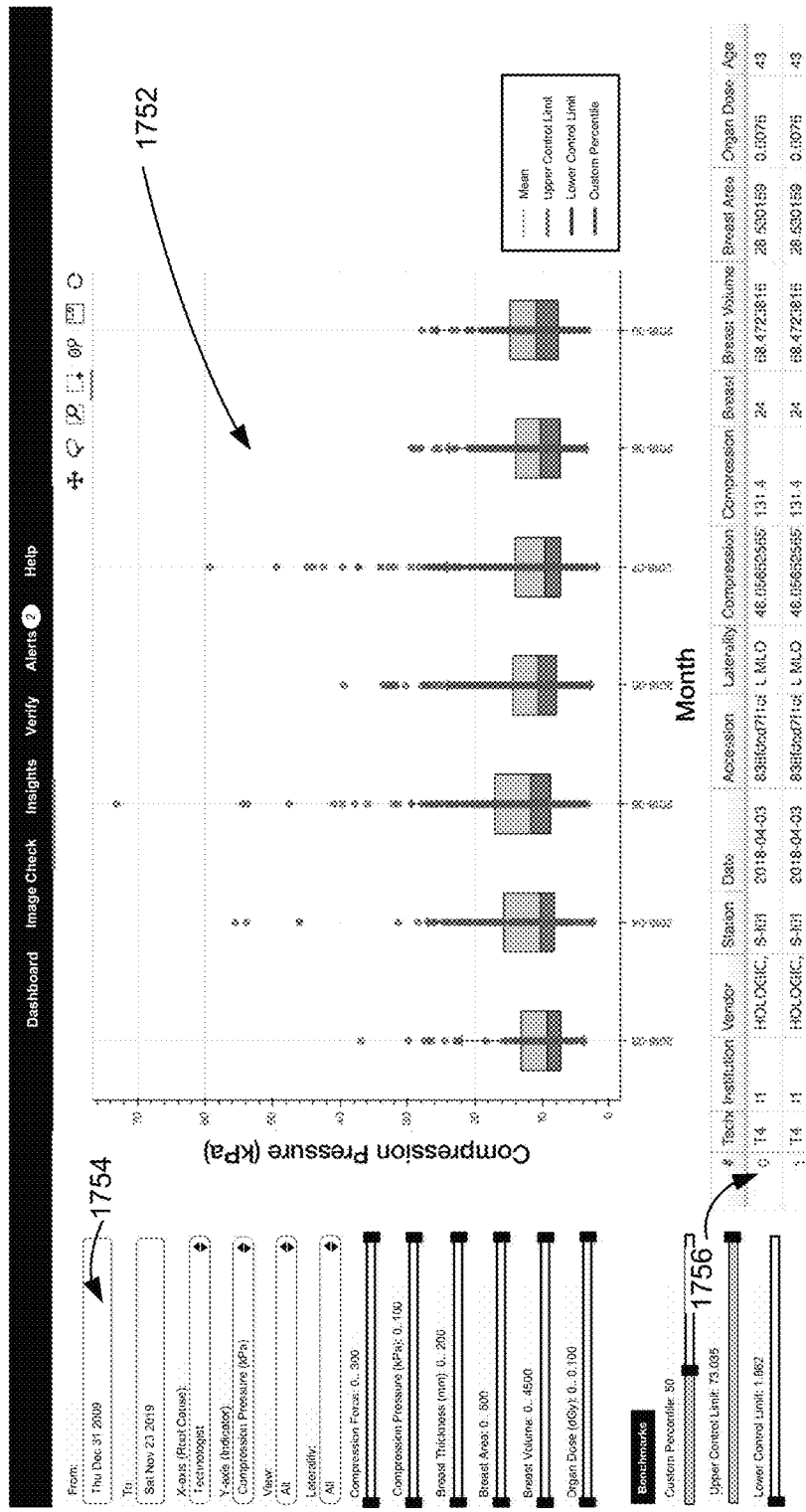

Referring now to FIG. 17B, shown therein is an example embodiment of a user interface 1750 that can be generated by the GUI engine 233 to show a plot 1752 that displays various IQPSs and IQPFs for another selected variable, which in this case is month. The IQPSs and IQPFs may be selected when the user provides filter settings for the filters 1754. The listing 1756 is analogous to the listing 1706 and can include a display of the same general parameters described above for listing 1705. The data visualization provided by the user interface 1750 allows an administrator to view predicted IQPSs (or IQSs) along a time axis to observe trends. It should be noted that the GUI 1750 can provide more filters (not shown) as was described for the GUIs 1400 and 1500 in FIGS. 14 and 15, respectively.

The interfaces 1700 or 1750 may be an exploratory analytics tool that allows a user to retrospectively review measurements and quantities for a set of images in various graph formats. For example, the interface 1700 allows a user to view trends in behavior for relevant quantities, and to see outliers, i.e. data points that do not fall within the historically 'typical' range of values.

In the interface 1700 or 1750, the user may select a data point in the graph to 'drill-down' to see the full set of reported results for that data point in an 'image check' graphical user tool, an example of which is shown in FIGS. 15 and 16.

In the interface 1700 or 1750, a data point in a graph may represent either an image, or a study, depending on the selected x- and y-axis components.

Figure 18:
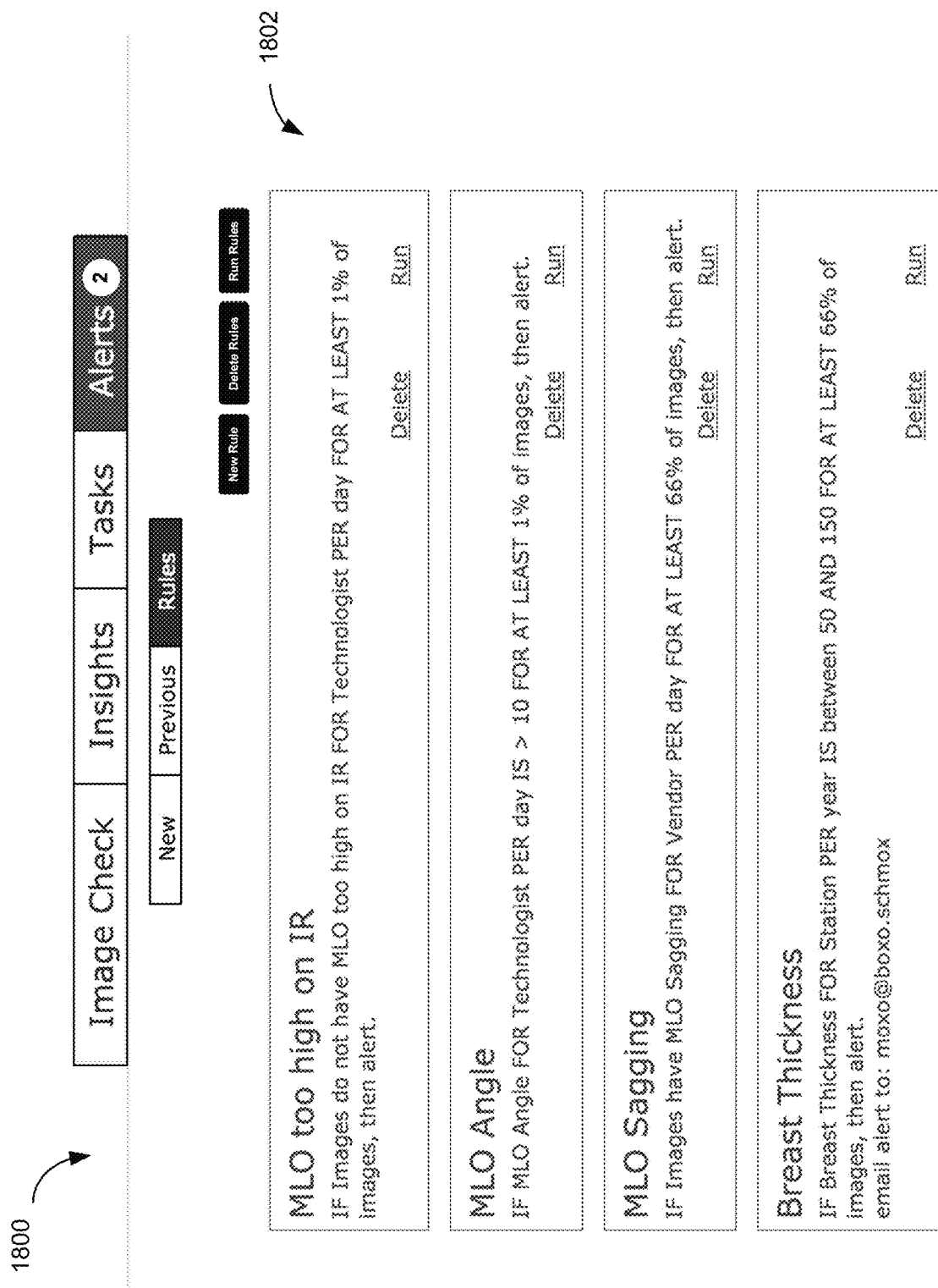

Referring now to FIG. 18, shown therein is an example embodiment of a user interface 1800 that can be generated by the GUI engine 233 to show alert rules 1802. A user may configure the alert rules 1802 based on various IQPSs or SQPSs predicted generally in real time as the medical clinic or institution acquires medical images from patients. This interface may be available to the administrator at the administrator workstation 108 or 712. For example, the GUI engine 1802 may receive a name for a rule, and input data that specifies which IQPS, or another item, is to be compared to an threshold point in order to generate an alert. Accordingly, the user may configure the alert rules 1802 by setting different values for the one or more threshold points for one or more IQPSs. A user may also configure the alert rules 1802 using one or more logical operators. Each alert may be received by one or more administrators, as specified by the user when they create an alert rule using the user interface 1800. The alerts may be delivered via at least one of email, telephone call, SMS, or by a mobile application notification.

Referring now to FIG. 19, shown therein is an example embodiment of a user interface 1900 that is generated by the GUI engine 233 to show the occurrence of a new alert 1902. Alert 1902 is displayed to the user via the user interface 1900 and includes the alert rule that was triggered, i.e. for the alert that occurred, and the date the alert took place. If the user selects the alert 1902, then the GUI engine 233 receives the user selection and accesses the database 230 or another data store to obtain the data associated with the alert 1902 and display this data to the user or otherwise allows the user to access the data. The user interface 1900 may also allow the user to add comments in a text boxes 1904 and 1906 for the different IQPSs that had triggered the alert 1902. The user interface 1900 may allow the user to dismiss the alert 1902, thereby changing its status from "new" to "previous".

Referring now to FIG. 20, shown therein is an example embodiment of a user interface 2000 that is generated by the GUI engine 233 to show a previous alert 2002 that occurred. The alert 2002 displays to the user the alert rule, the date that the alert took place, comments that were added for the alert, the date the alert was dismissed, and the user who dismissed the alert. The user interface 2000 may allow the user to view data associated with the alert 2002.

Figure 21:
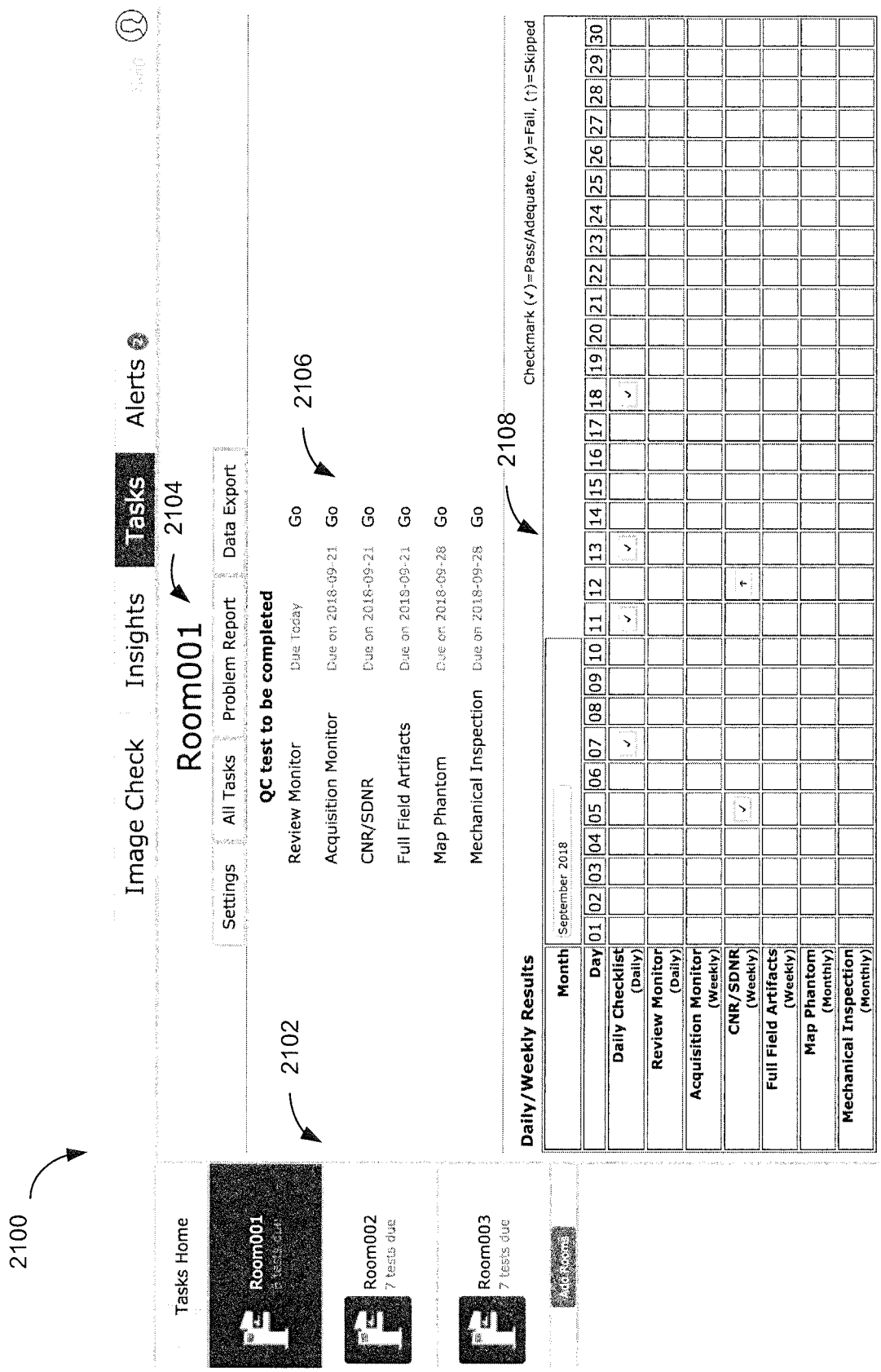

Referring now to FIG. 21, shown therein is an example embodiment of a user interface 2100 that is generated by the GUI engine 233 to show one or more tasks to be completed. For example, the tasks may be quality control tests for testing imaging equipment in particular locations 2102 (e.g. Room001, Room002 and Room003) which can be selected by a user at the left of the user interface 2100. The selected location then appears at the top header 2104 for the user interface 2100. The user interface 2100 may be used by a user to schedule tests in input list 2104 and/or to view test results that were performed on certain days of the month (bottom panel 2106). For example, the input list 2104 can be used to indicate particular QC tests to be performed and when these tests are due. In the bottom panel 2106 an indicator, like a check mark, may be shown to indicate which tests have been completed and on which days the tests were completed. The bottom panel 2106 can also indicate which tests are still to be completed by not including an indicator on any of the days for a particular test such as Review monitor, acquisition monitor, and mechanical inspection in this particular example. The user interface 2100 may be referred to as a tasks landing page.

Figure 22:
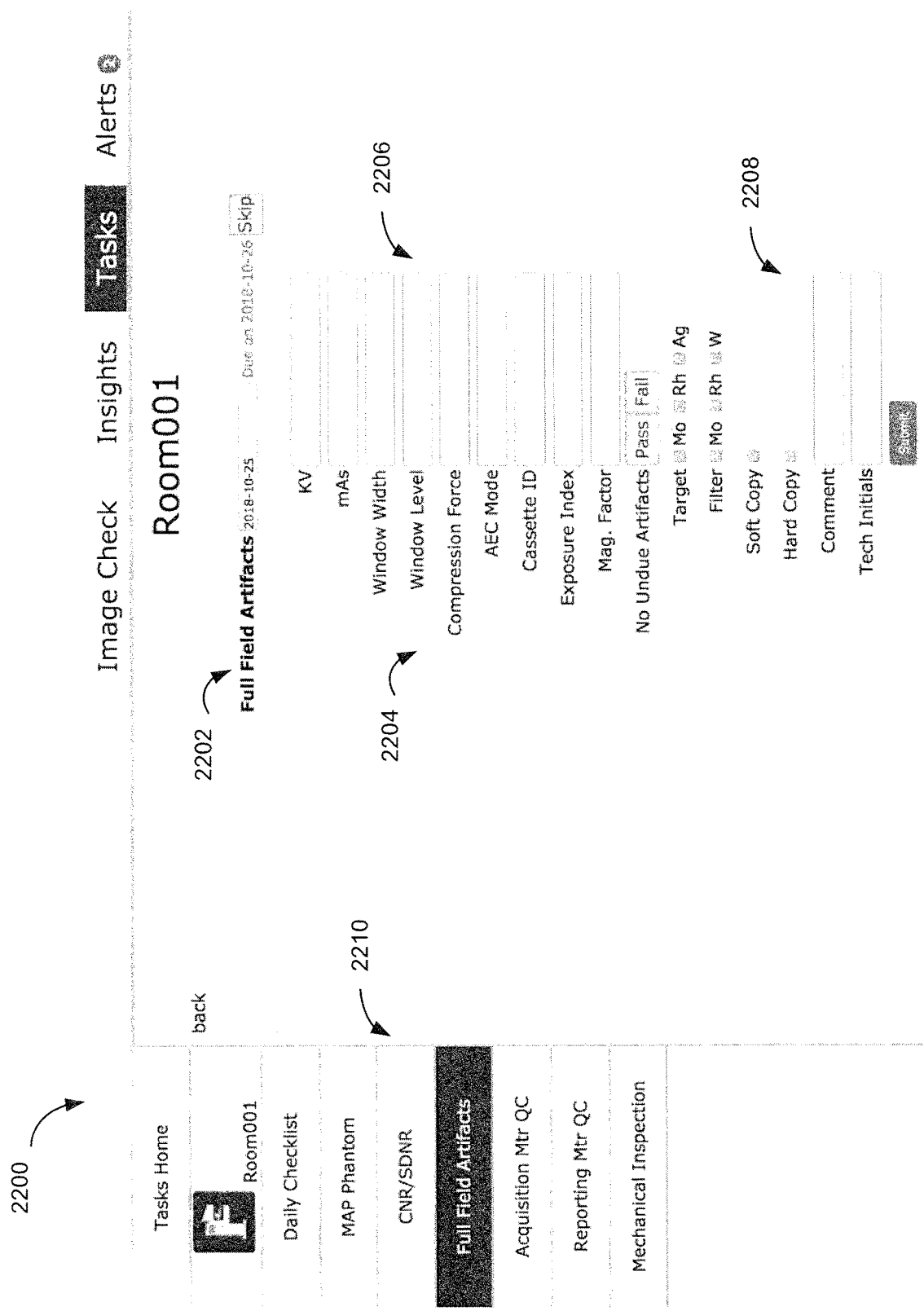

Referring now to FIG. 22, shown therein is an example embodiment of a user interface 2200 that is generated by the GUI engine 233 to show a particular test 2202 that is performed for a particular location and a list 2204 of parameters that are to be tested as part of the test. User interface 2200 may also allow a user to view test results in the various fields 2206 for the parameters that were tested.

The user 2208 may also view other information for the test including any comments that may have been entered by the technician who performed the test via a text input box and also the technician identification (e.g. signature or technician number). Other tests can be selected for viewing by the user by selecting from a test menu 2210.

Figure 23:

Referring now to FIG. 23, shown therein is an example embodiment of a user interface 2300 that is generated by the GUI 233 to allow a user to view data regarding a particular problem in a problem report. A technician that worked on the device performs at least some of the data entry for the data shown in the problem report. Accordingly, the user interface 2300 may be used by a user (e.g. the technician or a lead technician who is responsible for QC for the imaging department) to view problems that have been reported with the imaging equipment that has been malfunctioning or has failed a QA test. The user interface 2300 includes date data 2302 for when the error was found and when the report was made (which should be on the date that the error was investigated by a service company). The user interface 2300 also includes problem data 2304 describing the nature of the problem and service company data 2306 describing the service company that was called, the time of the call, the arrival of the service company, and the individual that performed the service. The user interface 2300 also includes diagnosis data 2308 indicating the diagnosis of the problem and service data 2310 indicating the service action that was taken.

Referring now to FIG. 24, shown therein is an example embodiment of another user interface 2400 that may be generated by the GUI engine 233. A user may use the user interface 2400 to input one or more quality parameter instruction values for one or more medical images. The one or more medical images may be a plurality of historical medical images. The user interface 2400 may be displayed at the administrator workstation 108 or 712. For example, an administrator may use the user interface 2400 to produce training data for one or more predictive models. For example, the user interface 2400 may be accessed by a radiologist who manually evaluates a medical image for one of the IQPs, and enters input data identifying the IQPs for which there is an error that is present or absent. This user input may be referred to as a quality parameter instruction label, and it may be associated with the medical image. The association of the quality parameter instruction labels for the plurality of IQPs may be referred to as a training data set.

Alternatively, the user interface 2400 may be used for training purposes in terms of the analysis of medical images by someone who is learning or retraining to properly assess IQPs within the medical images. For example a person can access a test image 2402 from a training data set and select a feature input function which is indicated at the top of the image. For example, if the GUI engine 233 receives a user input for selecting the Draw posterior nipple line, the GUI engine 233 may provide a cursor that the user can use to draw the posterior nipple line or otherwise insert annotations into the image 2402. The user can also make annotations on the image 2404. The interface 2400 presents both images 2402 and 2404 since these are the CC and MLO images of a particular breast and the reviewer can more effectively review a mammogram for IQPs since they can see both the CC and MLO images 2402 and 2404 of a particular breast. In addition, the user can select a drop down menu in the panel 2404 where the selections for the menu can correspond to various IQPs and the user may enter notes for each of those IQPs upon viewing the test medical image 2402, for example. The GUI engine 233 can then store the annotated information and the notes so that they can be accessed at a later time for assessing the performance of the user who is being trained. Results for the user may then be stored in the database and may later be rendered as an automatically generated report, as shown in FIG. 39. The 'Hide all symbols' input can be selected by the user to toggle on/off any markups on the test image (2402 such as the dotted lines on the mammograms). The user may select the 'Error(s) Found' input to toggle on/off the drop down list (2404) of all possible errors for each image to allow for the user to make selections via the radio buttons.

Figure 25:
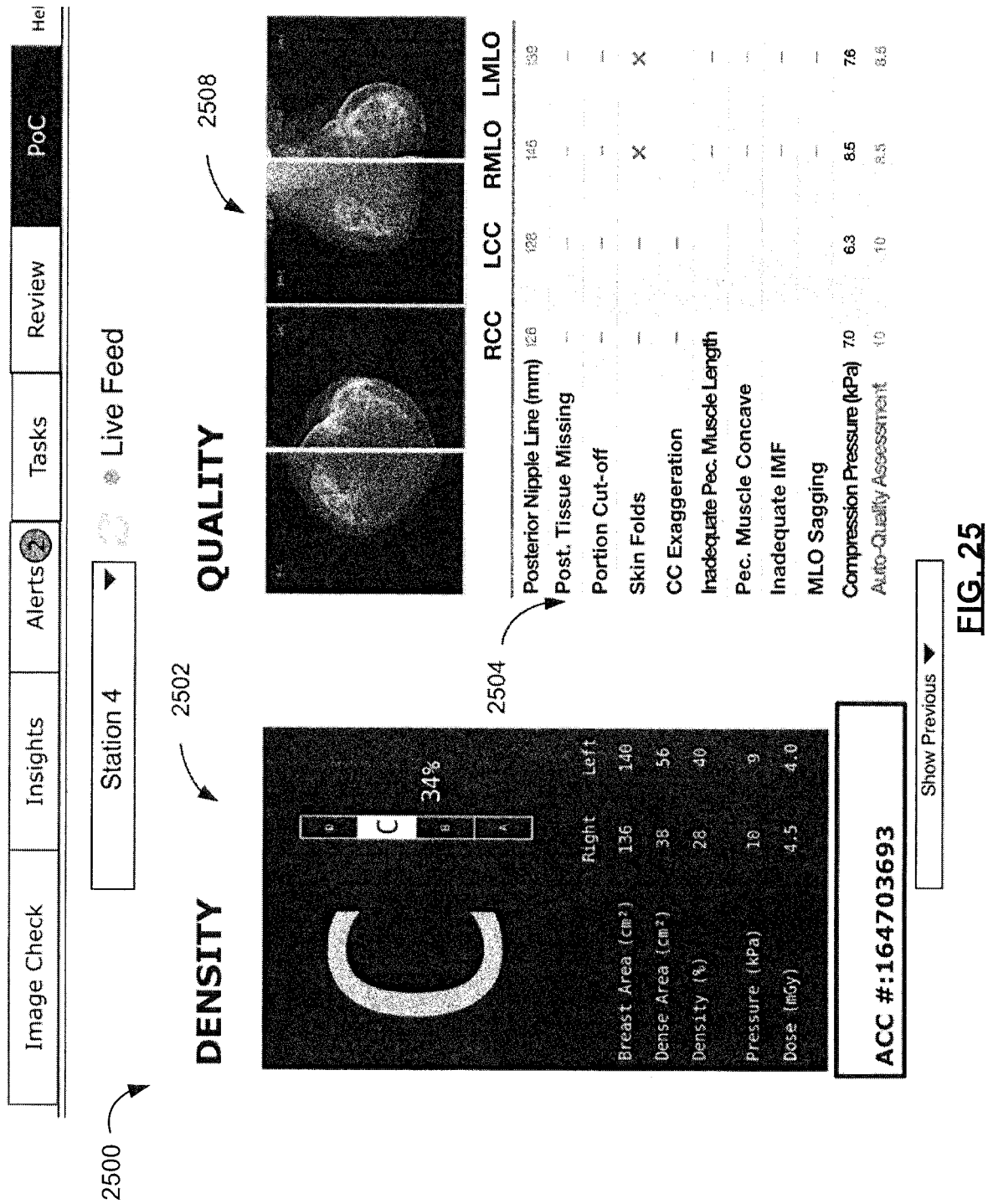

Referring now to FIG. 25, shown therein is an example embodiment of a user interface 2500 that can be generated by the GUI engine 233 to show images 2508 and IQPs and the associated IQPSs 2504. The user interface 2500 may also display other information, such as breast density data 2502 and diagnostic data 2506 for an anonymous patient. User interface 2500 may be displayed at the MRT workstation 106 or 706. For example, the user interface 2500 may provide feedback on the quality of images taken by the MRT at the point of care (i.e. PoC), such as missing parameters in the mammographic images. For example, FIG. 25 shows that the skin folds are not visible in the RMLO and the LMLO. The user interface 2500 can provide this feedback at the PoC within minutes of the image acquisition, so that the MRT may take steps to address any reported quality issues identified in the user interface 2500 and take further images before the patient leaves the image acquisition room. For example, an overall quality assessment may be generated and displayed for each of the medical image views (see bottom row for the example in FIG. 25) and if any of the images have a poor quality this can be indicated to the MRT so that the MRT can re-acquire the images that have unacceptable quality. The overall quality assessment values may be indicated along a numerical scale like 1 to 10, which is an example of just one of the scales that can be displayed to the user. For examples, a categorical scale like PGMI or EDU (both not shown) may be used.

Figure 26:
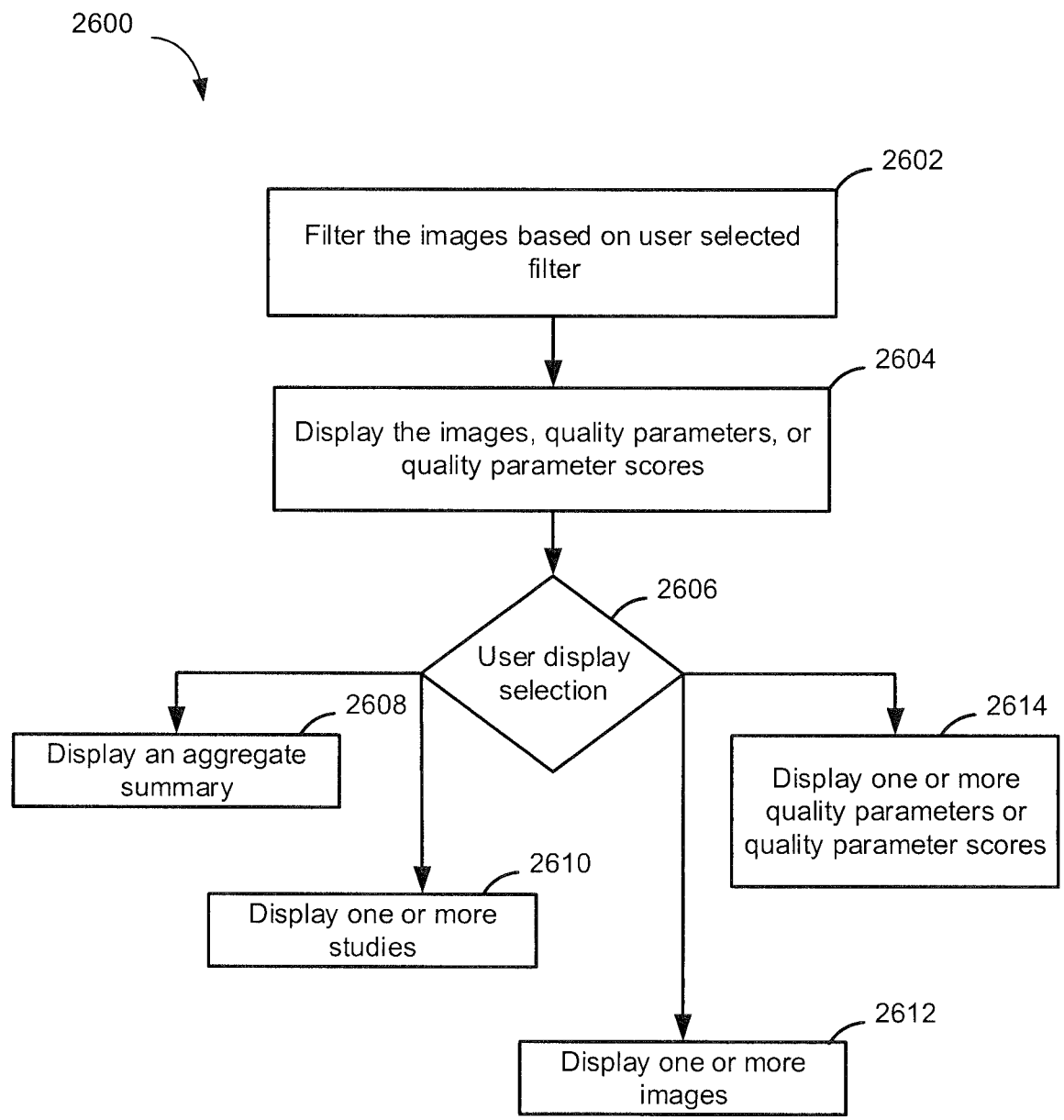
FIG. 26 shows an example embodiment of a method for performing filtering in order to efficiently review and navigate a subset of images in a repository using the medical image quality system of FIGS. 1 and 43.

Referring now to FIG. 26, shown therein is an example embodiment of a method 2600 for displaying images, IQPs, and IQPSs such as those shown in user interfaces 1400, 1500, 1600, and 1700 of FIGS. 14-17.

Figure 27:
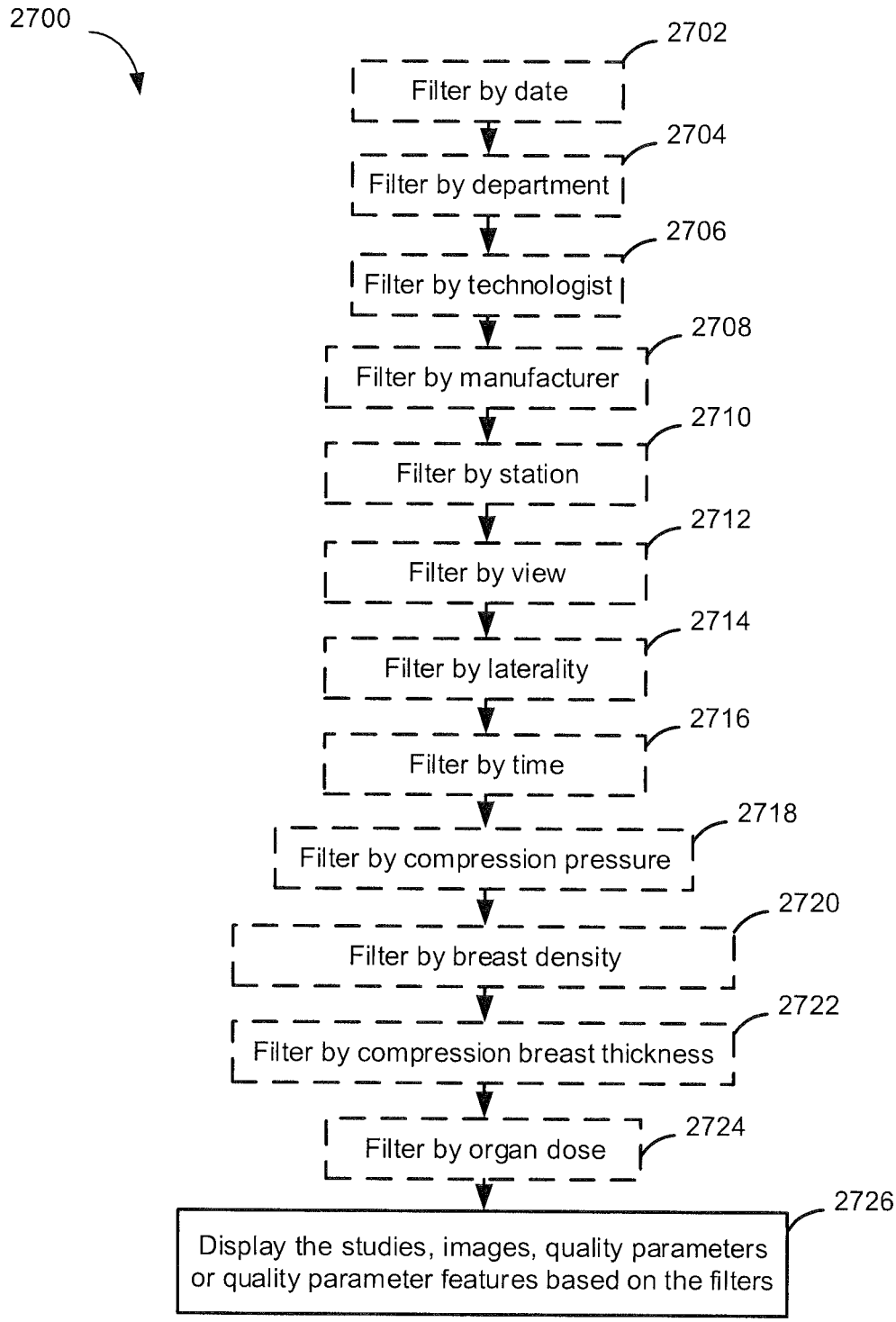
FIG. 27 shows an example embodiment of a method for analytics filtering that may be used by the medical image quality system of FIGS. 1 and 43.

At act 2602, the images are filtered based on user selected filtering criteria. For example, the images may be filtered accordingly to method 2700 which is shown in FIG. 27.

At act 2604, the images, IQPs, and/or IQPSs are displayed. The scores may be aggregated, and may represent different aspects of predicted IQPSs based on the plurality of medical images collected/acquired at a medical institution or clinic.

At act 2606, a user may make a display selection. Based on the display selection, different data may be displayed by the GUI engine 233.

For example, the user may wish to view an aggregate summary. In this case, the method 2600 proceeds to act 2608 where an aggregate summary is displayed by the GUI engine 233. For example, the user interface 1400 of FIG. 14 and the associated data and images may be displayed by the GUI engine 233 for the aggregate summary.

Alternatively, the user may select one or more studies for viewing. In this case, the method 2600 proceeds to act 2610 where the selected one or more studies are displayed by the GUI engine 233. For example, the user interface 1600 of FIG. 16 and the associated data and images may be displayed by the GUI engine 233 for the study viewing.

Alternatively, the user may select one or more images for viewing. In this case, the method 2600 proceeds to act 2612 where the selected one or more images are displayed by the GUI engine 233. For example, user interface 1500 and the associated data and images of FIG. 15 may be displayed for the image viewing.

Alternatively, the user may want one of more IQPs or IQPSs to be displayed. In this case, the method 2600 proceeds to act 2614, where one or more IQPs or IQPSs are displayed by the GUI engine 233. For example, user interface 1700 of FIG. 17 and the associated data may be displayed.

Referring now to FIG. 27, shown therein is an example embodiment of a method 2700 for filtering images based on various characteristics. This filtering method allows a user, such as an administrator, to perform facility wide image assessment and review the performance of certain departments, certain MRTs, certain imaging machines and other items based on the user input. It is to be noted that not all of the filter settings may be provided with filter settings input by the user which is why dashed boxes are shown for the various filtering actions.

It is noted that the order of the acts shown in FIG. 27 is just one example and the acts can be ordered differently in other embodiments. For example, some filter settings that provide a greater amount of filtering may be checked first to see if there has been a user filtering entry. For example, if the user provided a filtering entry based on MRT then this will result in more filtering then if the user provided a filtering entry based on department.

At act 2702, the user input is checked to determine if date filter settings have been entered. If the date filter settings have been entered then the images in a particular image repository or an initial set of images are filtered by the date that the images were acquired by an MRT.

At act 2704, the user input is checked to determine if department filter settings have been entered. If the department filter settings have been entered then the images are filtered by the selected department(s) to obtain images that were acquired at the selected department(s) of the medical facility.

At act 2706, the user input is checked to determine if MRT filter settings have been entered. If MRT filter settings have been entered then the images are filtered to obtain the images that were acquired by the MRT(s) specified in the MRT filter settings.

At act 2708, the user input is checked to determine if manufacturer filter settings have been entered. If the manufacturer filter settings have been entered then the images are filtered to obtain the images that were acquired using equipment that was made by the manufacturer specified in the manufacturer filter settings.

At act 2710, the user input is checked to determine if station filter settings have been entered. If the station filter settings have been entered then the images are filtered by station to obtain the images that were acquired at the station(s) (e.g. specific acquisition device) specified in the station filter settings.

At act 2712, the user input is checked to determine if view filter settings have been entered. If the view filter settings have been entered then the images are filtered to obtain the images that were obtained from the view(s) (e.g. images of MLO or CC view) specified in the view filter settings.

At act 2714, the user input is checked to determine if laterality filter settings have been entered. If the laterality filter settings have been entered then the images are filtered by laterality (e.g. whether the image is a for the left or right breast).

At act 2716, the user input is checked to determine if time filter settings have been entered. If the time filter settings have been entered then the images are filtered out if the time that they were acquired is not within the time filter settings.

At act 2718, the user input is checked to determine if compression filter settings have been entered. If the compression filter settings have been entered then the images are filtered to obtain images that are acquired at a compression pressure that is within the compression filter settings.

At act 2720, the user input is checked to determine if breast density filter settings have been entered. If breast density filter settings have been entered then the images are filtered based on the entered breast density filter settings. For example, breast density values can be determined according to the techniques discussed in U.S. Pat. No. 9,895,121, which is hereby incorporated by reference in its entirety. Alternatively, the breast density techniques may be determined using the CNN-based methods described herein.

At act 2722, the user input is checked to determine if breast thickness filter settings have been entered. If the breast thickness filter settings have been entered then the images are filtered to obtain images that have a breast thickness that is within the breast thickness filter settings.

At act 2724, the user input is checked to determine if organ dose settings have been entered. If the organ dose filter settings have been entered then the images are filtered to obtain the images that were acquired when the organ dose is within the organ dose filter settings.

At act 2726, the images that satisfy all of the each of the filter settings specified by the user are then displayed.

Figure 28:
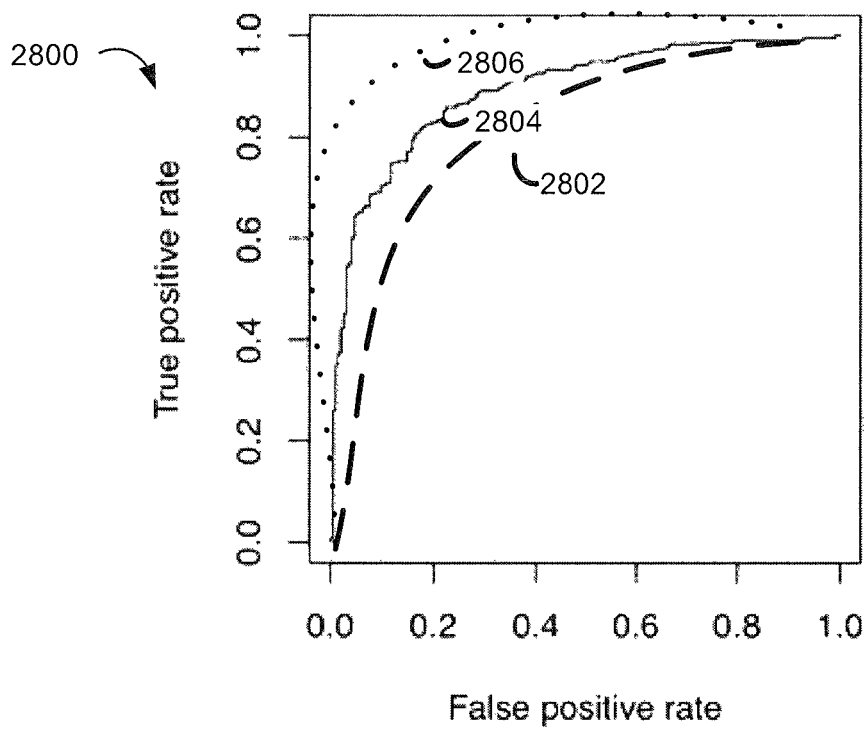
FIG. 28 shows an example of several receiver operating characteristic curves that may be used to determine additional input features for a predictive model that may be used by a medical image quality system.

Referring now to FIG. 28, shown therein is an example embodiment of a ROC curve user interface 2800. An ROC curve is created by plotting the true positive rate (TPR) against the false positive rate (FPR) at various operating points for a given predictive model. This curve may enable a user to determine based on, for example, the slider in FIG. 12 what operating point to set for a particular image quality parameter operating point. The FPR may be calculated as 1—specificity, where specificity measures the proportion of actual correctly identified negative results. The TPR is known as the sensitivity, which is the proportion of actual positive results that are correctly identified.

The selection of different image/study quality parameter features for use as inputs to a predictive model to predict image/study quality parameter scores is important for improving prediction accuracy. For a particular image/study quality parameter, different ROC curves may be plotted based on building different predictive models that use a different combination of input image parameter features and/or a different prediction methodology as explained in the description with reference to FIGS. 2 and 51. As shown, a candidate set of image quality parameter features that are used by a given predictive model may produce the ROC curve 2802. The addition of an additional candidate IQPF to the given predictive model may result in ROC curve 2804. The addition of a second additional candidate IQPF to the predictive model may result in ROC curve 2806. The AUC for the ROC curve 2806 may thus inform the decision making for selecting which combination of IQPFs can be used as inputs for the given predictive model to improve the accuracy of a predicted image quality parameter score for a specific image/study quality parameter. In this example, the addition of the second additional candidate IQPF as an input to the given predictive model resulted in better prediction accuracy and can thus be used in during actual operation of the medical image quality systems described herein. There may be individual ROC curve user interfaces for each IQP, and each may inform a decision about the operating point that can be used for the particular image/study parameter to operate at a certain TPR and FPR.

An ROC curve may be provided for the "overall" or "image quality" predictive model that generates an image quality score as a gestalt value for the entire image itself, based on the input IQPSs and/or the IQPFs that are provided as input to the image quality predictive model.

It should be understood that the teachings herein for ROC curves for IQPSs and IQSs also applies to each predictive model that is used to determine a study quality parameter score or an overall study quality score. Accordingly, predictive models and associated lookup tables that include the corresponding ROC curve data can be stored for determining various IQPSs, IQSs, SQPSs and SQSs.

Referring next to FIG. 36, shown therein is an example user interface 3600 for reviewing and changing positioning error settings that may be generated by the GUI engine 233. The user interface 3600 may allow a user to select one of the IQPs 3602 such as CC Exaggeration, Portion cutoff 3602a, Skin Folds, PNL Difference, Posterior Tissue Missing, Inadequate IMF, Pectoral Muscle Concave, MLO Sagging, MLO Too High on IR, and Motion/Blur to review the settings of various aspects of the predictive model for the particular IQP 3602 that is selected by the user. These aspects may include configuring an operating point of the ROC curve for the predictive model of the selected IQP, and one or more configurable predicted study quality parameter feature thresholds that correspond to the selected IQP.

In the example shown in user interface 3600, the selected IQP is Portion cut-off 3602a. The user interface 3600 has a first portion 3604 displaying one or more medical images 3608 that are predicted to have an error for the selected IQP, and a second portion 3606 displaying one or more medical images 3610 that are predicted not to have an error for the selected IQP.

In this example embodiment, the user interface 3600 may also have a user input 3612 (for example, a slider) for adjustment of the threshold on the predicted probability of the selected IQP. Selecting a different threshold has the effect of changing the selected operating point on the ROC curve for the predictive model for the selected IQP. The threshold selection can be varied to obtain a desired sensitivity (i.e. TPR) and specificity (1-FPR) for the IQP as an alternative to the default setting. In response to a change in the operating point of the ROC curve using the user input 3612, the user interface 3600 may be updated to show the change in the one or more medical images 3608 in the first portion 3604 and the one or more medical images 3610 in the second portion 3606. However, the user may wish to change the threshold for a particular IQP because the user may not be as concerned about errors for certain IQPs whereas for other IQPs the user may be more concerned with errors. By providing the user with the configurable threshold 3614 the user can vary this threshold and see the immediate partitioning effect in terms of the groups of images 3608 and 3610.

Accordingly, in this example embodiment, the user interface 3600 also has the user input 3614 that allows for a user configurable threshold on one or more anatomical feature measurement IQPFs used to assess the selected IQP. In response to a change in the configurable threshold for the selected anatomical feature measurement IQPF provided by the user via the user input 3614, the user interface 3600 may be updated to show the change in terms of the one or more medical images 3608 that are shown in the first portion 3604 and the one or more medical images 3610 that are shown in the second portion 3606. The user input 3612 is different than the user input 3614 since the user input 3614 is used to change the threshold applied to specific and visually recognizable anatomical feature measurements that are used as input to the IQP predictive model. Alternatively, the anatomical feature measurement threshold may be used to override the predictive model, for IQPs (such as portion cutoff detection) where the IQP may be considered to be directly related to an observable aspect of image appearance. Therefore, the user input 3614 allows the user to accept parameters as they are classified—or, disagree and be able to do fine tuning on certain metrics.

Figure 37:
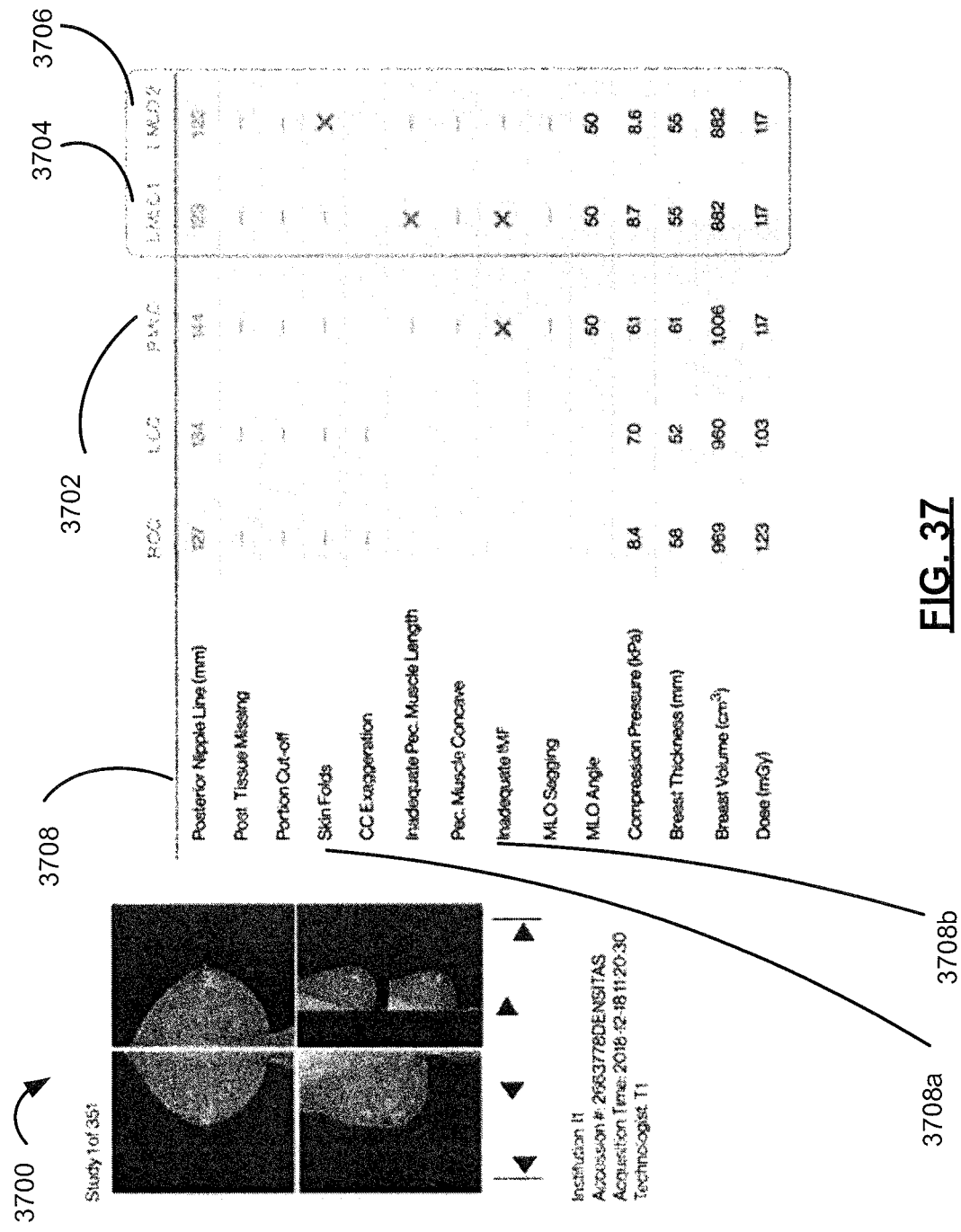

Referring next to FIG. 37, shown therein is an example user interface 3700 that may be generated by the GUI engine 233 for displaying a plurality of medical images of the same study view and laterality as well as various IQPs 3708, anatomical measurements and test acquisition data that are associated with the mammograms in the study. The anatomical measurements include at least one of breast thickness and breast volume and the test acquisition data include at least one of compression pressure and dose. The user interface 3700 may allow for a user to review the IQPs 3708 for multiple images in an study at the same time. This may allow for an overall study quality score that considers the IQPs from multiple images of the same view and laterality. For instance, in the example user interface 3700, the IQPs 3708 such as Skin Folds 3708*a* in the image LMLO2 3706 was deficient, but was properly displayed in the accompanying image LMLO1 3704. In a second example, in a particular image the IQPs Inadequate IMF 3708*b* may be missing in LMLO1 3704 but is visible in the extra LMLO2 3706 included in the study, thereby taking into account the IQP data from all available images in order to provide a more robust overall study score.

Referring next to FIGS. 38 to 41 together, shown therein are various user interfaces 3800, 3900, 4000, and 4100, respectively, showing technologist report cards that may be generated by the GUI engine 233. The IQPSs, the IQSs, the SQPs, and the SQSs may be used to determine a report card for various medical professionals, such as the technologists who operate the imaging machine to obtain the mammograms, a lead QC technologist or even a radiologist who assesses the images at a later time after acquisition, in order to identify systematic quality errors in the collection of medical images. This information may further be used in order to improve training for technologists and systematically reduce the incidence of image quality errors in medical images for certain medical technologists and for medical imaging centers. For example, the IQPs shown in the report cards in the user interfaces in FIGS. 38 to 40 may be determined based on an input from a technologist reviewing a medical image (for instance, user input from the Image Quality Feedback Tool in FIG. 24), a predicted IQP as determined based on the teachings herein, or an average IQP as determined based on averaging the IQPs for medical images obtained by a plurality of technologists.

Referring now to FIG. 38, shown therein is a report card interface 3800 having a plurality of IQP charts including an inadequate IMF chart 3802, a Pectoral Muscle Concave chart 3804, a CC Exaggeration chart 3806, and an MLO sagging chart 3808. In other embodiments, there may be different IQP charts or all of the IQP charts that are shown. The report card interface 3800 may be for comparing one or more technologists, such as "Judy Smith MRT" for example to other technologists T1 to T10 for a user-specified time interval indicated along the top of the chart while the percentage error is indicated along the x axis. The plurality of IQP charts 3802, 3804, 3806, and the 3808 may be colour coded, showing a first colour code for an improvement in the IQP over time. The plurality of IQP charts may show rows corresponding to a plurality of technologists in a medical organization who acquire medical images, and each row may show technologist improvement or regression for the IQP shown in the chart as it relates to the aggregate performance of all technologists in the last row and to organizational targets in terms of an acceptable level (not shown) of predicted error which may be set by the administrator. A colour coded increase range may show an improvement by a technologist from a first to a second value for a time period, and a different colour coded decrease range may show a regression in performance by a technologist from a first to a second value for a time period. For example, for technologist T5 there is an improvement in Inadequate IMF performance 3802 from 32% predicted error rate to 18% error rate over from time period 2019Q2 to time period 2019Q3. In another example using the Inadequate IMF chart, technologist T6 shows a decrease in performance with their fail rate going from 17% to 20% over the specified time period.

Referring now to FIG. 39, shown therein is shown another example embodiment of a user interface 3900 that provides a report card for a selected technologist, having a plurality of IQP metrics 3902 shown in rows, for a selected image set 3910 having a certain number of image studies. Each row showing an IQP metric may show an individualized metric for the IQP (e.g. in the "You" column 3904), a group metric 3906 for the IQP, and a predicted metric 3908 from an algorithm for the IQP when the technologist, the group of technologists and the algorithm assesses the same images from the image set 3910 to determine whether an error for each of the IQPs 3902 are in the images. The algorithm may be any of the predictive algorithms that have been defined herein, such as, but not limited to, the logistic regression, machine learning or deep learning algorithms, for example, that were discussed for generating the IQPs/SQPs. The value in a given row indicates the percentage of images that were identified as having an error for the IQP that corresponds to the given row. The report card 3900 may be individualized for a particular technologist, for example "Judy Smith". The IQP metrics may be colour coded to indicate IQPs for which the technologist performed better than the group and the predicted metric as well as IQPs for which the technologist performed worse than the group and the predicted metrics.

Referring now to FIG. 40, shown therein is another example user interface 4000 showing a report card for a selected technologist, having a plurality of medical images 4002 shown in rows. Each row showing a medical image also shows an individualized label 4004 of the selected technologist, a consensus label 4006 from a group of technologists to which the selected technologist is being compared, and a predicted label 4008 from an algorithm. The labels in each row are generally one or more IQPs which are believed to have an error in the corresponding image for that row. Alternatively, an entry in one of the columns 4004, 4006 and 4008 for a given medical image may be empty if no errors were determined for any IQPs for the given medical image.

Referring now to FIG. 41, shown therein is a portion of another user interface 4100 which includes a report card for a medical image obtained by a technologist using an imaging machine. The user interface 4100 displays the image quality score 4102 of a particular medical image, or a study quality score of a study on a distribution curve to see how its quality relates to other images or studies performed over a period of time. In this example, the average image quality score 4104 is displayed along with a distribution curve 4106 showing a distribution for the various image quality scores that have been obtained over the time period. The distribution curve 4106 may be segmented into different portions 4102a, 4102b and 4102c to show an alternate classification of medical images, for "E" for Excellent, "D" for Diagnostic, and "U" for Unacceptable, respectively.

Figure 42:
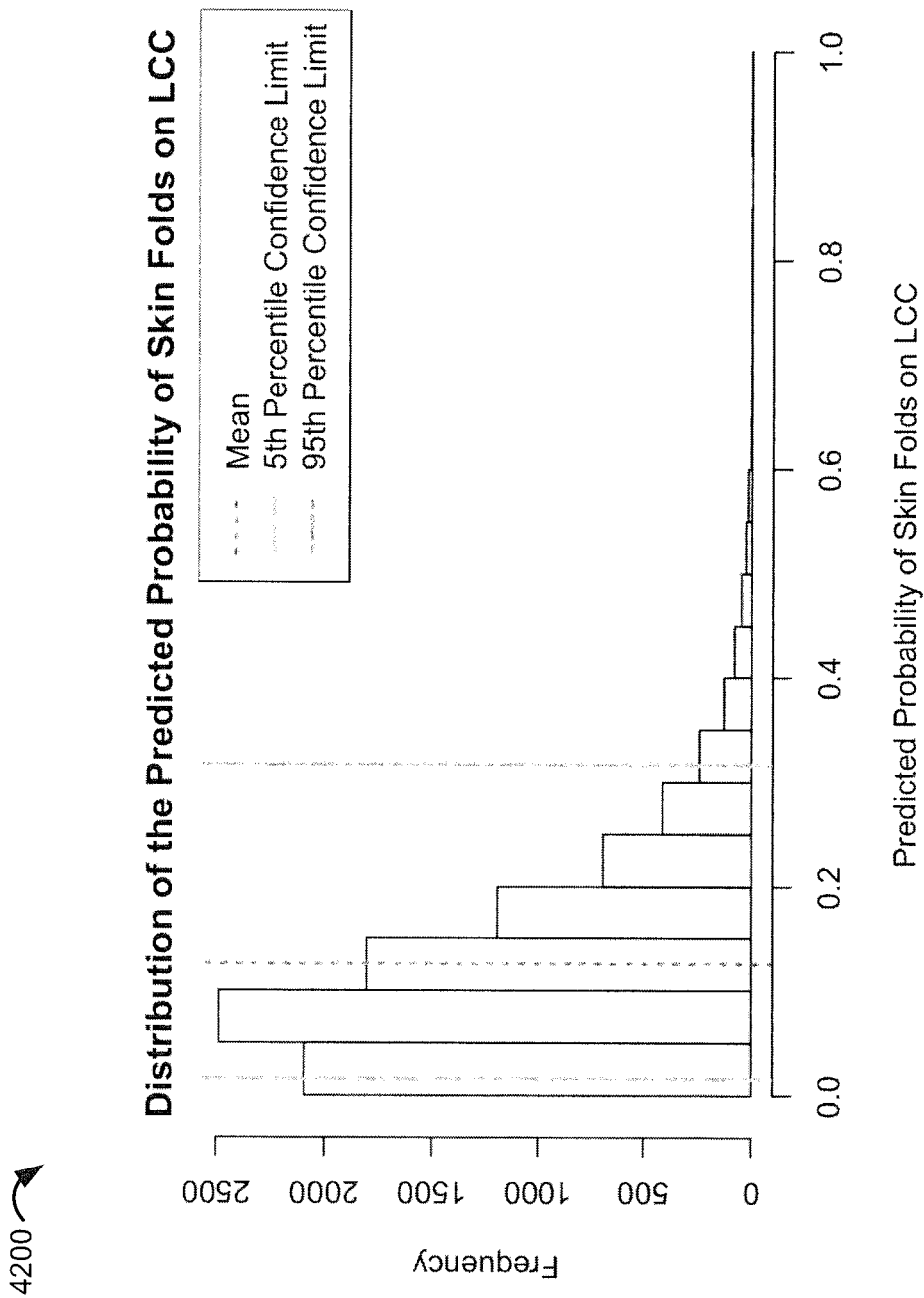
FIG. 42 shows an example embodiment of an interface showing example results for an IQP distribution.

In at least one embodiment in accordance with the teachings herein, another method of identifying poor, good and excellent image scores or study scores is to use a statistical determination of lower and upper confidence limits determined from a representative sample of historical medical images. For example, one may classify medical images or studies to the left of the 5th percentile as Poor quality, medical images within the $5^{th}$ and $95^{th}$ percentiles as Good quality, and medical images to the right of the 95th percentile as Excellent quality. Alternatively, other percentiles, such as the $10^{th}$ and $90^{th}$ percentiles, can be used instead of the $5^{th}$ and $95^{th}$ percentiles. Predicted probabilities of image quality errors may be determined from the distribution of a score across a large sample of routinely acquired screening mammograms. For example, FIG. 42 shows a diagram 4200 of frequency versus predicted probability of an IQP, which in this example is Skin Folds on LCC. This distribution may be used to determine the a $5^{th}$ percentile lower confidence limit and a $95^{th}$ percentile upper confidence limit.

Figure 43:
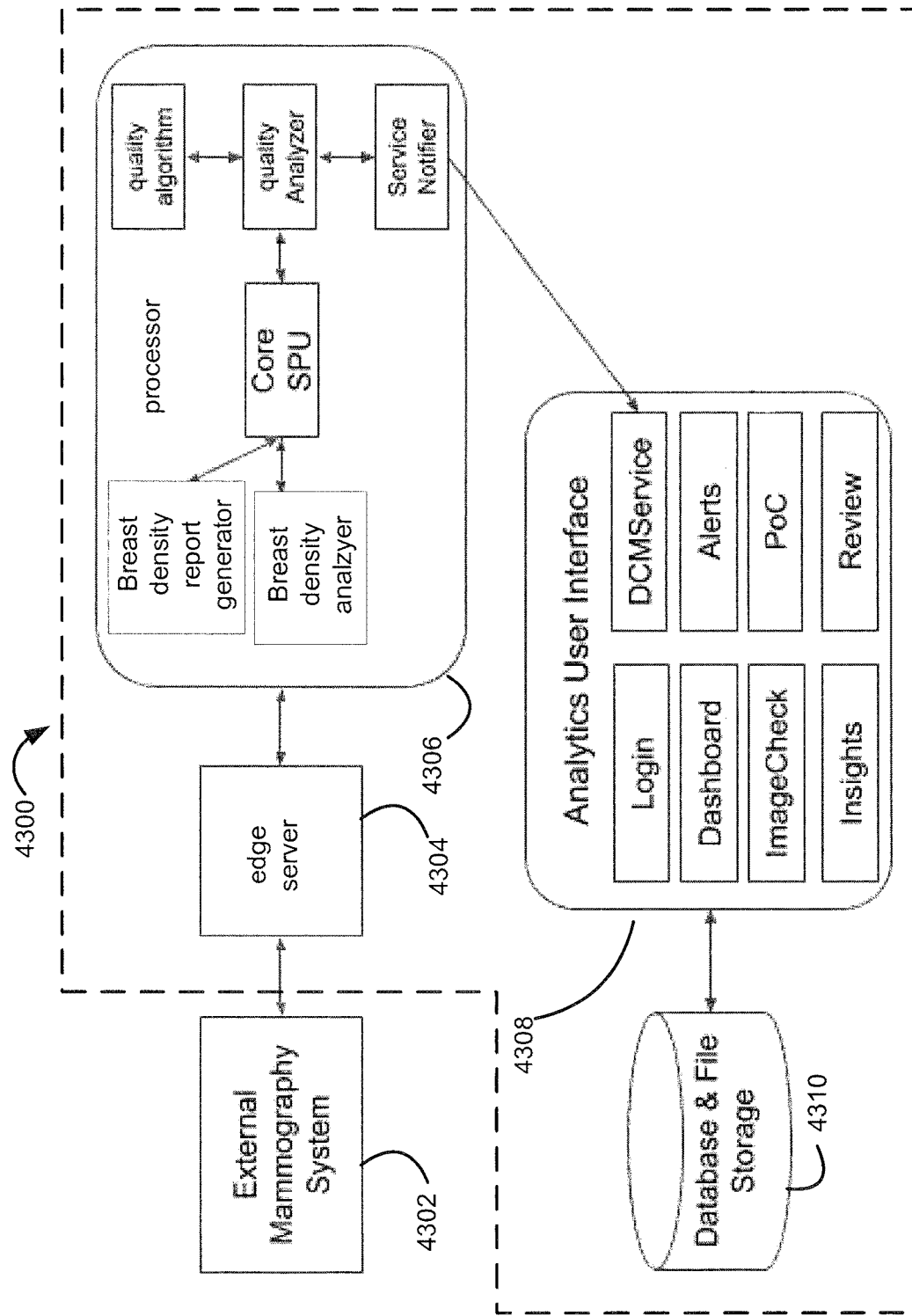
FIG. 43 shows another example embodiment of a system for use in assessing digital medical image quality.

Referring now to FIG. 43, shown therein is a block diagram of an example embodiment for another system 4300 for use in assessing digital medical image quality. The system 4300 is connected to an external medical image system 4302 that collects medical images and/or studies of patients. The system 4300 comprises an edge server 4304, a processor 4306, an analytics user interface 4308 and database & file storage 4310. In some cases, the database & file storage 4310 may be external to the system 4300 but is operatively connected to the system 4300. In this example embodiment the external medical image system 4302 is an external mammography system. While the system 4300 is described in terms of operating with mammographic images, it is understood that the system 4300 can be used for image/study quality analysis of medical images of other body parts as was explained for the medical image quality system 100.

The edge server 4304 is a server that is used to retrieve the medical images and/or studies. Accordingly, the edge server 4304 executes software instructions so that it is able to provide external communications services including DICOM metadata, Application Programming Interfaces (APIs) such as JSON or XML based APIs, and other data exchange services.

The edge server 4304 may send the retrieved medical images and/or studies to the image/study processor 4306. The image/study processor 4306 comprises memory or is operably connected to memory that has software instructions from causing the processor 4306 to implement a breast density analyzer, a breast density report generator, a quality analyzer, a quality algorithm and a service notifier. The quality analyzer is used to analyze the medical images/ studies.

The processor 4306 is configured to perform algorithm operations, data analysis and/or report generation for each study when corresponding software instructions for these operations are executed by the processor 4306 under the control of the CORE SPU. The Core SPU includes software instructions to allow the processor to send data between the relevant program modules that are executed by the processor 4306 for performing certain functions. For example, the software code for implementing the breast density report generator, when executed by the processor 4306, generates a medical image density report based on breast density data that was generated by the breast density analyzer. For example, the breast density analyzer may include software instructions for determining breast density from a mammogram according to various technique such as those described in U.S. Pat. No. 9,895,121, which is hereby incorporated by reference in its entirety. Alternatively, the breast density techniques may be determined using the CNN-based methods described herein. The quality analyzer includes software instructions for performing various image quality and/or study quality analysis on medical image data using various quality algorithms (i.e. predictive models which may include the CNN in FIG. 51) in accordance with the teachings herein. The service notifier includes software instructions that may be used to transmit study images, metadata, and processed image analysis results, including at least one of the various parameters, scores and indices described herein, to the analytics user interface 4308.

The analytics user interface application 4308 generally provides various image review tools to allow a user to access the medical images and medical studies and perform analytics on the images and studies via a collection of quality analytics application components, such as at least one of the user interfaces described previously in accordance with the teachings herein. The medical images and medical studies may be stored in the database & file storage 4310. The analytics user interface 4308 may further include at least one of a login page, a dashboard for high level presentation of key quality performance indicators, an image check interface for visual display of image quality algorithm results, an insights interface for graphical display of image quality algorithm results, an alerts interface for providing an automated image quality alert tool based on user defined image quality rules, a point-of-care interface (PoC) for display of various results to a technologist at time of medical image acquisition, and an image quality feedback interface, which may be implemented as described previously for FIGS. 3-6, and 8-42, in accordance with the teachings herein. The analytics user interface application 4308 also includes a DCM Service for saving medical images and metadata into the database & file storage 4310.

In at least one embodiment, the plurality of medical images, the image metadata, the study data, and the study metadata may be collected continuously as well as the plurality of quality parameters labels and the overall quality labels can be obtained continuously during the operation of the system 4300. The plurality of image and study quality parameter features, and the consensus quality label values from the plurality of image quality parameter labels may then be used to perform continuous training on the predictive models that are used such that the predictive models may be updated at a regular interval such as daily, weekly, monthly, quarterly and/or yearly or whenever a set number of new labelled mammograms, such as 100 mammograms, have been added to the training data set. For example, as a mammogram is labelled (either by a radiologist or radiological technologist, or by an originally trained model) it is added to the training data set and the updated training data set is then used to train the predictive models as described herein. For example, whether a logistic regression, a statistical learning technique or a machine learning technique or the CNN technique described herein are used to determine an initial predictive model, the initial predictive model can be retrained using the updated training data set so that the predictive models are up-to-date.

In at least one embodiment described herein, predictive models may generated based on historical medical image data sets that are distinct from the data in the databases that are accumulated from in-clinic deployments, and then may be applied as part of the system as a trained model.

Figure 45:
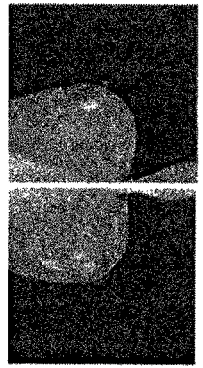

In an alternative embodiment, the system 100 or 4300 may dynamically evaluate the stored data on the database, and may build predictive models dynamically as the system 100 or 4300 receives new mammograms (or other medical images) continuously. In this embodiment, the system may either be deployed in a clinical setting or may be configured to receive batches of images Referring now to FIGS. 44 and 45, shown therein are example embodiments of various user interfaces 4400 and 4500 that may be used by the medical image quality system of FIG. 1 or 43 for continuous labelling of medical images and studies for continuous predictive model learning. The labelling shown in FIGS. 44 and 45 may enable a user to correct a predicted IQP for one or more images in a study in order to identify false negatives and false positives.

The user interface 4400 in FIG. 44 displays a set of predicted IQPs 4402 for an example study that contains a plurality of medical images 4403. As shown, the example LMLO image has a predicted IQP error for Inadequate Pectoral Muscle Length 4402e in the LMLO 4404d, and a predicted IQP error for Inadequate IMF 4402g in the RMLO 4404c and the LMLO 4404d.

The user interface 4500 in FIG. 45 displays a set of predicted IQPs 4502 for an example study containing a plurality of medical images. In the user interface 4500 a user has provided user input to correct the predicted IQPs. For example, in this study the reviewing user disagrees with the absence of predicted IQP error for skin folds, and has manually labelled 4502cc as having the error on RMLO 4504c. This is an example of a false negative.

In this example, the reviewing user also disagrees with the predicted IQP error for inadequate IMF, and has manually labelled 4502gc as not having the error on RMLO 4504c. This is an example of a false positive.

In this example, the reviewing user also disagrees with the predicted IQP error for inadequate IMF, and has manually labelled 4502gd as not having the error on LMLO 4504d. This is another example of a false positive.

With the user interfaces 4400 and 4500 shown in FIGS. 44 and 45, the reviewing user may provide labels to train and update the image quality models, and such training and updating may be done continuously. For example, the reviewing user may further update the overall positioning quality score (i.e. Excellent, Diagnostic, Unacceptable). The Comments portion shown in FIGS. 44 and 45 may allow for viewing of DICOM comments made at the time of image acquisition. It also allows for additional user comments to be associated with the study, or a particular image within a study. The application of study-based and image-specific comments may be used in training and updating the image quality predictive models. The comments may also allow for demonstration of image quality monitoring, corrective actions taken, and oversight by the lead interpreting physician as part of accreditation requirements.

Figure 46:
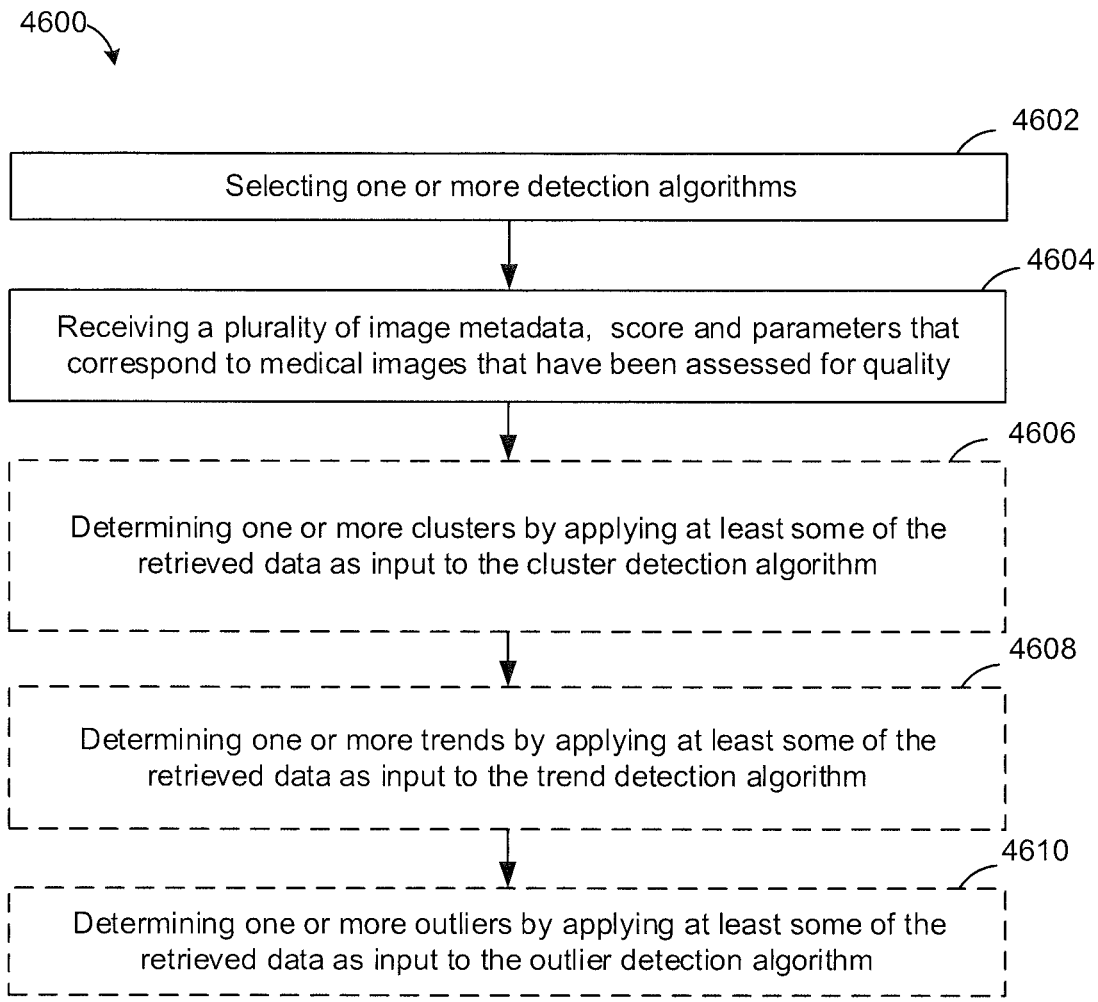
FIG. 46 shows another example embodiment of a medical image quality determination method that may be used by a medical image quality system of FIGS. 1 and 43.

Referring next to FIG. 46, shown therein is a of medical image quality determination method 4600 that may be used by the medical image quality system 100 or 4300 of FIGS. 1 and 43, respectively. The method 4600 allows a user to optionally automatically perform clustering, optionally automatically determine outliers, and optionally determine trends. The method 4600 may use pattern detection to enable a user to quickly and efficiently access to groupings of image quality errors identified using different dimensions such as by metadata field, image quality parameter, or other determined parameters that are described herein.

For example, a cluster of poor quality mammograms may be associated with a particular technologist during a particular period of time, or alternatively may occur at a particular department during a period of time, or alternatively may occur when a particular medical image device is used during a particular time frame.

Accordingly, the method 4600 may be used to identify emerging trends, clusters, or outliers using statistical process control methods or other statistical methods to isolate the errors and perform root cause analysis for processes that may not be under control and may lead to generally increasing error rates. The method 4600 may further determine where certain interventions such as the introduction of continuing medical education events and training efforts may be applied in order to improve overall medical image quality.

At 4602, one or more detection algorithms are selected for performing at least one of trend detection which may be used to detect emerging trends in the image quality parameters, cluster detection which may be used on image quality features to group together certain images having similar image quality features and outlier detection to detect scores that are outside of the expected distribution of scores for a group of technologists or for an organization, for example. These different algorithms may be implemented using various techniques such as statistical process control methods, parametric statistical models, Statistical Learning (SL), Machine Learning (ML), or Deep Learning (DL) algorithms. The particular algorithm that is selected at act 4602 is determined based on input received from the user for the type of analysis that the user wishes to perform as well as the nature of the data that is being analyzed, e.g. if this data is continuous, categorical, count, temporal, etc. For example, there are statistical principles for identifying models/algorithms that are suitable for analysing a particular set of data and the variables associated with the data set.

At 4604, a plurality of a plurality of image metadata and various score and parameters related to medical images that have been assessed using the image quality system 4300 are retrieved from the database 4310, each of the plurality of image metadata corresponding to a medical image in the plurality of medical images.

Optionally at 4606, when cluster analysis is selected by the user, one or more clusters are determined by applying a clustering algorithm to the plurality of image metadata, the IQPs, the SQPs and the various scores and indices. One example is where clustering algorithms may be used to identify clusters of Unacceptable, Diagnostic and Excellent quality images. This determination may be made periodically, or whenever a user logs into the system based on the most recently updated data in the database and file storage 4310. The clustering algorithm provides an output of separate classes for Unacceptable, Diagnostic and Excellent quality images that can be displayed to the user in the insights tab. The user can then select one of these clusters and further investigation of the images within the cluster can be performed. The image identifiers in the selected class are listed in the table below the insights plot, each image identifier shown in a row of the table. The image identifier is hyperlinked to the images displayed in the Image Check tab. For example, cluster detection may be used to identify a cluster of poor quality mammograms that can be associated with a particular technologist during a narrow period of time, or these mammograms may all occur at a particular clinic during a period of time, or these mammograms may all be related to a particular scanner during a specific time frame.

Optionally, at 4608, when trend detection analysis is selected by the user, one or more trends are determined by applying a trend detection algorithm to the plurality of image metadata, the IQPs, the SQPs and the various scores and indices. For example, trend analysis may be used to identify emerging trends for image quality errors. This may be done by applying either statistical process control methods, parametric statistical models or SL/ML methods to image quality errors. For example, emerging trends can be identified rapidly using automated statistical process control methods or other statistical methods to isolate the root cause for out of control processes (e.g. generally increasing error rates as the senior technologists retire) or processes altered by certain interventions such as the introduction of continuing medical education events and training efforts. This optional trend detection analysis may be performed periodically, or whenever a user logs into the system based on the most updated data in the database & file system 4310. The identified data points flagged by the trend detection analysis as out of control can be listed in the table below the insights plot in the Insights tab, with each image identifier being shown in a row of the table. The image identifier may be linked (e.g. hyperlinked) to the images displayed in the Image Check tab. Accordingly, the identified images can be easily accessed in this manner and reviewed to investigate the root cause of one or more variations.

Optionally, at 4610, when outlier analysis is selected by the user, one or more outliers are determined by applying a selected outlier algorithm to the plurality of image metadata, the IQPs, the SQPs and the various scores and indices. Automated outlier and pattern detection enables the user to rapidly and easily have access to algorithmically identified poor quality images from massive data sets that can be investigated further to identify extreme values of image quality indicators that may relate to a root cause of variation (e.g. technologists or time of day). The outlier detection algorithms can be triggered whenever the user logs into the system and can be applied to data in the database & file storage 4310, or when the user chooses to apply an outlier detection algorithm. The identified data points flagged by the outlier detection analysis as extreme points can be listed in the table below the insights plot in the Insights tab, with each image identifier being shown in a row of the table. The image identifier is linked (e.g. hyperlinked) to the images displayed in the Image Check tab. The identified images can be easily accessed in this manner and reviewed to investigate root cause of variation.

The outlier algorithm may be implemented using statistical outlier detection algorithms may include, but are not limited to, extreme value analysis (e.g. z-score, t-statistic), probabilistic and statistical modeling, linear regression analysis (e.g. principal component analysis and least mean squares), proximity based models (cluster analysis, density based analysis, nearest neighbor analysis), information theory models, and high dimensional outlier detection methods (e.g. binary recursive partitioning analysis, isolation forests).

The clustering, outlier determinations, patterns and trend determinations may be applied to medical images as labels, and may appear in the "Insights" tab of an analytics user interface such as the one in FIGS. 17A-17B. The clusters, outliers and trends may be displayed on the user interface highlighted with colours, text and lines. For example, colour coding of the data points according to the clusters they belong to as determined by the algorithms reveals outliers, patterns, including emerging trends. In one instance, the user may select or click on the plotted data points in the Insights tab in FIGS. 17A-17B and the user interface may then navigate the user to the Image Check tab (see e.g. FIG. 16, 37, etc.) where the image quality may be reviewed from the stored images.

While the applicant's teachings described herein are in conjunction with various embodiments for illustrative purposes, it is not intended that the applicant's teachings be limited to such embodiments as the embodiments described herein are intended to be examples. On the contrary, the applicant's teachings described and illustrated herein encompass various alternatives, modifications, and equivalents, without departing from the embodiments described herein, the general scope of which is defined in the appended claims.

The invention claimed is:

1. A system of determining medical image quality to determine errors in obtaining medical images, the system comprising:
   a memory unit, the memory unit storing: a) a plurality of predictive models that are deep learning models including Convolutional Neural Networks (CNNs) trained for different quality metrics, and b) a database for storing a plurality of predicted image quality scores;
   a display device;
   a processing unit in communication with the memory unit and the display device, the processor unit having a processor being configured to:
   receive a first medical image and an associated plurality of image metadata;
   determine a predicted image quality score based on the first medical image and one of the predictive models that receives at least two inputs based on parameters or parameter features, the predicted image quality score providing an indication of a probability of a particular non-conforming condition being present in the first medial image and/or extract a feature from the first medical image using the CNN to learn different quality metrics, wherein a predicted plurality of image quality parameter scores is determined with the parameters or parameter features;
   map a given predicted image quality parameter score to a predicted image parameter index based on: (a) applying a threshold to the given image quality parameter score, where the threshold is based on an operating point on a receiver operator characteristic curve for the predictive model that was used to generate the given predicted image quality parameter score or (b) applying a user configurable predicted image quality parameter feature threshold;
   generate a graphical user interface;
   provide an output to the display device, the output including the graphical user interface, the indexed image quality parameter score, and the predicted image quality score;
   store the predicted image quality score in the database; and
   perform statistical process control on the predicted image quality scores stored on the database to isolate errors and perform root case analysis for increase in error rates.

2. The system of claim 1, wherein the processor is further configured to:

determine a plurality of image quality parameter features based on the first medical image and optionally the plurality of metadata associated with the medical image;

determine the predicted plurality of image quality parameter scores by applying at least some of the plurality of image quality parameter features as inputs to a plurality of predictive models where each predictive model corresponds to one of the plurality of predicted image quality parameter scores;

determine a predicted image quality score by applying the predicted plurality of image quality parameter scores, and optionally the plurality of image quality parameter features, as inputs to an overall predictive model; and provide the output to the display device, the output including the graphical user interface and at least one of the predicted image quality score and the predicted plurality of image quality parameter scores.

3. The system of claim 2, wherein the processing unit is further configured to:

receive a second medical image at the processor, the second medical image associated with a second plurality of image metadata;

determine a second plurality of image quality parameter features based on the second medical image and optionally the second plurality of image metadata associated with the second medical image;

determine a second plurality of image quality parameter scores by applying at least some of the second plurality of image quality parameter features as inputs to the plurality of predictive models where each predictive model corresponds to one of the image quality parameter scores:

determine a second predicted image quality score by applying the second predicted plurality of image quality parameter scores, and optionally the second plurality of image quality parameter features, as second inputs to the overall predictive model:

provide the second output in the graphical user interface on the display device to indicate at least one of the second predicted image quality score and the second predicted plurality of predicted image quality parameter scores to the graphical user interface on the display device; and provide a combined output in the graphical user interface on the display device based on at least one of the predicted image quality score, the predicted plurality of predicted image quality parameter scores, the second predicted image quality score, and the second predicted plurality of predicted image quality parameter scores.

4. The system of claim 3, wherein the first medical image and the second medical image are based on a same view of a patient.

5. The system of claim 4, wherein the processing unit is further configured to display a report card in the graphical user interface on the display device based on the combined output, wherein the report card further comprises a graph comparing one of the image qualities of the first medical image and the second medical image to an average image quality.

6. The system of claim 1, wherein the processor is further configured to:

determine a plurality of image quality parameter features based on the first medical image and optionally the plurality of metadata associated with the first medical image;

determine a predicted image quality score by applying the predicted plurality of image quality parameter scores as inputs to an overall predictive model; and provide the output to the display device, the output including the graphical user interface and at least one of the predicted image quality score and the predicted plurality of image quality parameter scores.

7. The system of claim 1, wherein the processor is further configured to:

determine a plurality of image quality parameter features based on the first medical image and optionally the plurality of metadata associated with the first medical image;

determine a predicted image quality parameter score by applying at least some of the predicted image quality parameter features as inputs to a predictive model that corresponds with the image quality parameter score; and provide the output to the display device, the output including the graphical user interface on the display device to indicate the predicted image quality parameter score.

8. The system of claim 1, wherein the plurality of image metadata stored at the memory unit comprises at least one of:

acquisition settings data, patient data, device data, institution data, and MRT data.

9. The system of claim 1, wherein the processor is further configured to:

display a user configurable operating point on the graphical user interface for a Receiver Operating Characteristic (ROC) curve corresponding to the predictive model:

receive a first user input for the user configurable operating point to adjust the location of an operating point on the ROC curve; and adjust the operating point of the ROC curve according to the first user input to alter prediction accuracy for the predictive model.

10. The system of claim 1, wherein the processor is configured to identify one or more trends for image quality errors as part of the statistical process control by applying one or more statistical process control based trend-detection techniques to image metadata, image quality parameter score, and/or study quality parameter scores corresponding to obtained medical images and stored in the database, thereby detecting emerging trends or identify data points flagged as out of control.

11. The system of claim 1, wherein the processor is configured to identify clusters as part of the statistical process control by applying a clustering algorithm on image metadata, image quality parameter scores, and/or study quality parameter scores corresponding to obtained medical images stored in the database, so as to group images having similar image quality characteristics according to statistical principles.

12. The system of claim 11, wherein the clustering algorithm outputs separate classes for unacceptable, diagnostic and excellent quality images.

13. The system of claim 1, wherein the processor is configured to identify outliers as part of the statistical process control by applying one or more outlies detection methods to the image metadata, image quality parameter scores, and/or study quality parameter scores corresponding to obtained medical images stored in the database, thereby detecting image quality parameter scores that deviate beyond an expected distribution for a group of technologists or for an organization.

14. A computer-implemented method for determining digital medical image quality to determine errors in obtaining medical images, wherein the method comprises:
storing, in a memory unit, a) a plurality of predictive models that are deep learning models including Convolutional Neural Networks (CNNs) trained for different quality metrics, and b) a database for storing a plurality of predicted image quality scores;
receiving a first medical image at a processor, the first medical image being associated with a plurality of image metadata;
determining a predicted image quality score based on the first medical image and a first predictive model at the processor, wherein the first predictive model receives at least two inputs based on parameters or parameter features, the predicted image quality score providing an indication of a probability of a particular non-conforming condition being present in the first medial image and/or extract a feature from the first medical image using the CNN to learn different quality metrics, wherein a predicted plurality of image quality parameter scores is determined with the parameters or parameter features;
mapping a given predicted image quality parameter score to a predicted image parameter index based on: (a) applying a threshold to the given image quality parameter score, where the threshold is based on an operating point on a receiver operator characteristic curve for the predictive model that was used to generate the given predicted image quality parameter score or (b) applying a user configurable predicted image quality parameter feature threshold;
providing an output in a graphical user interface on a display device where the output indicates the predicted image quality score and the indexed image quality parameter score;
storing the predicted image quality score in the database; and
performing statistical process control on the predicted image quality scores stored on the database to isolate errors and perform root case analysis for increase in error rates.

15. The method of claim 14, further comprising:
determining a plurality of image quality parameter features based on the first medical image and optionally the plurality of metadata associated with the medical image;
determining the predicted plurality of image quality parameter scores by applying at least some of the plurality of image quality parameter features as inputs to a plurality of predictive models where each predictive model corresponds to one of the plurality of predicted image quality parameter scores;
determining a predicted image quality score by applying the predicted plurality of image quality parameter scores, and optionally the plurality of image quality parameter features, as inputs to an overall predictive model; and
providing the output in the graphical user interface on the display device to indicate at least one of the predicted image quality score and the predicted plurality of image quality parameter scores to the graphical user interface on the display.

16. The method of claim 15, further comprising:
receiving a second medical image at the processor, the second medical image associated with a second plurality of image metadata;
determining a second plurality of image quality parameter features based on the second medical image and optionally the second plurality of image metadata associated with the second medical image;
determining a second plurality of image quality parameter scores by applying at least some of the second plurality of image quality parameter features as inputs to the plurality of predictive models where each predictive model corresponds to one of the image quality parameter scores;
determining a second predicted image quality score by applying the second predicted plurality of image quality parameter scores, and optionally the second plurality of image quality parameter features, as second inputs to the overall predictive model:
providing a second output in the graphical user interface on the display device to indicate at least one of the second predicted image quality score and the second predicted plurality of predicted image quality parameter scores to the graphical user interface on the display device; and
providing a combined output in the graphical user interface on the display device based on at least one of the predicted image quality score, the predicted plurality of predicted image quality parameter scores, the second predicted image quality score, and the second predicted plurality of predicted image quality parameter scores.

17. The method of claim 16, wherein the first medical image and the second medical image are based on a same view of a patient.

18. The method of claim 17, further comprising:
displaying a report card interface on the display device based on the combined output, wherein the report card in the graphical user interface further comprises a graph comparing one of the image qualities of the first medical image and the second medical image to an average image quality.

19. The method of claim 17, wherein the plurality of image metadata comprises at least one of acquisition settings data, patient data, device data, institution data, and MRT data.

20. The method of claim 14, further comprising:
determining a plurality of image quality parameter features based on the first medical image and optionally the plurality of image metadata associated with the medical image;
determining a predicted image quality score by applying the predicted plurality of image quality parameter scores as inputs to an overall predictive model; and
providing the output in the graphical user interface on the display device to indicate at least one of the predicted image quality score and the predicted plurality of image quality parameter scores.

21. The method of claim 14, further comprising:
determining a plurality of image quality parameter features based on the first medical image and optionally the plurality of image metadata associated with the medical image;
determining a predicted image quality parameter score by applying at least some of the predicted image quality parameter features as inputs to a second predictive model that corresponds with the image quality parameter score; and providing the output in the graphical user interface on the display device to indicate the predicted image quality parameter score.

22. The method of claim 14, further comprising:

displaying a user configurable operating point on the graphical user interface for a Receiver Operating Characteristic (ROC) curve corresponding to the predictive model:

receiving a first user input for the user configurable operating point to adjust the location of an operating point on the ROC curve; and adjusting the operating point of the ROC curve according to the first user input to alter prediction accuracy for the predictive model.

23. The method of claim 14, wherein the method comprises identifying one or more trends for image quality errors as part of the statistical process control by applying one or more statistical process control based trend-detection techniques to image metadata, image quality parameter score, and/or study quality parameter scores corresponding to obtained medical images and stored in the database, thereby detecting emerging trends or identify data points flagged as out of control.

24. The method of claim 14, wherein the method comprises identifying clusters as part of the statistical process control by applying a clustering algorithm on image metadata, image quality parameter scores, and/or study quality parameter scores corresponding to obtained medical images stored in the database, so as to group images having similar image quality characteristics according to statistical principles.

25. The method of claim 24, wherein the clustering algorithm outputs separate classes for unacceptable, diagnostic and excellent quality images.

26. The method of claim 14, wherein the method comprises identifying outliers as part of the statistical process control by applying one or more outlies detection methods to the image metadata, image quality parameter scores, and/or study quality parameter scores corresponding to obtained medical images stored in the database, thereby detecting image quality parameter scores that deviate beyond an expected distribution for a group of technologists or for an organization.

* * * * *